United States Patent [19]
Deguchi

[11] Patent Number: 5,635,342
[45] Date of Patent: Jun. 3, 1997

[54] METHOD FOR MANUFACTURING SOLID PROCESSING COMPOSITION FOR SILVER HALIDE PHOTOGRAPHIC LIGHT-SENSITIVE MATERIALS

[75] Inventor: Takashi Deguchi, Hino, Japan

[73] Assignee: Konica Corporation, Japan

[21] Appl. No.: 681,597

[22] Filed: Jul. 29, 1996

Related U.S. Application Data

[63] Continuation of Ser. No. 420,498, Apr. 12, 1995, abandoned.

[30] Foreign Application Priority Data

Apr. 19, 1994 [JP] Japan .................................. 6-080692

[51] Int. Cl.$^6$ ........................................ G03C 5/30
[52] U.S. Cl. ................................... 430/458; 430/465
[58] Field of Search ............................ 430/458, 465

[56] References Cited

U.S. PATENT DOCUMENTS

| 3,377,286 | 4/1968 | Stricklin | 430/465 |
| 3,833,377 | 9/1974 | Emoto et al. | 430/465 |
| 3,981,732 | 9/1976 | Emoto et al. | |
| 4,923,786 | 5/1990 | Kuhnert et al. | 430/465 |
| 5,278,036 | 1/1994 | Kobayashi et al. | 430/465 |
| 5,336,588 | 8/1994 | Ueda | 430/465 |

FOREIGN PATENT DOCUMENTS

| 05477966 | 6/1993 | European Pat. Off. |
| 62-33108 | 2/1987 | Japan |
| 5009113 | 1/1993 | Japan |
| 5100370 | 4/1993 | Japan |

*Primary Examiner*—Hoa Van Le
*Attorney, Agent, or Firm*—Jordan B. Bierman; Bierman, Muserlian and Lucas LLP

[57] ABSTRACT

A method for manufacturing a granular solid processing composition for a silver halide photographic light-sensitive material is disclosed, which comprises the steps of:

granulating a composition comprising at least one photographic processing agent with stirring in the presence of a liquid to obtain granules; and dressing the granules.

3 Claims, 2 Drawing Sheets

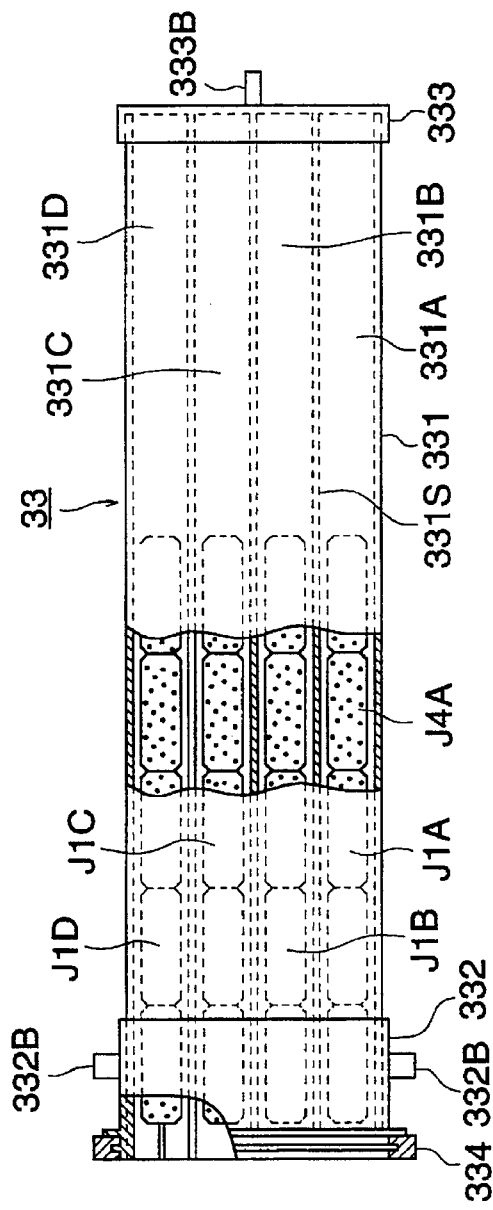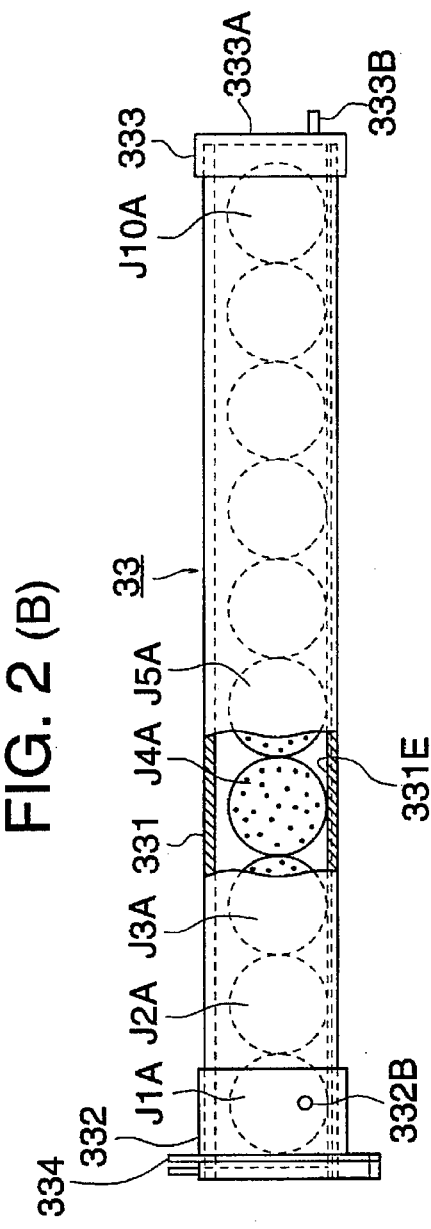

METHOD FOR MANUFACTURING SOLID PROCESSING COMPOSITION FOR SILVER HALIDE PHOTOGRAPHIC LIGHT-SENSITIVE MATERIALS

This application is a continuation of application Ser. No. 08/420,498, filed Apr. 12, 1995, now abandoned.

FIELD OF THE INVENTION

The invention relates to a solid developing composition in the form of powder, granules or tablets for a silver halide photographic light-sensitive material.

BACKGROUND OF THE INVENTION

A silver halide photographic light-sensitive material is usually processed using a color developer, a bleach, a bleach-fixer, a fixer and a stabilizer to obtain an imagewise image. The components of the processing solutions used herein are packaged in plastic bottles for easy use in the form of one or more concentrated solutions and are supplied as a processing solution kit to consumers. The consumers dilute the component solutions of the kit with water to prepare the processing solutions (as starter solutions or replenisher solutions) and use them.

Recently, in the photographic processing industry small-scaled developing store, so-called mini-labs, which process a photographic material using a small automatic processor, rapidly increased and the amount of the processing kits used also increased. The processing kit in concentrated solution form still requires much storage space. Further, the cost for transport is not low. The discarded plastic bottles increase year by year and should be recovered, however the recovering is difficult and therefore, development of a processing system in which waste plastics are reduced is demanded.

Powder photographic processing agents are considered in order to reduce storage space, transport cost and the amount of the plastic waste. However, the powder agents produce loose powder when it is dissolved in water, and operators breathe in loose powder particles, resulting in health hazard. Further, the present inventor has found that other photographic solutions may be contaminated with the components of the loose powder and there occurs the possibility of other trouble in developing process.

Japanese Patent O.P.I. Publication Nos. 5-119454/1993, 5-119450/1991 and 5-142708/1993 discloses granulated solid processing composition.

However, these are tablets obtained by compression molding granules in which the moisture content and average particle size are controlled in a fluid bed granulating dryer. These tablets are effective in view of the content of a developing agent or prevention of insoluble matter occurrence, however, strength of granules are not sufficient and has a defect that fine powder occurs during transport. It has been found that fine powder occurs during storage at not less than 50° C. in a ship and due to vibration in a car after storage.

Japanese Patent O.P.I. Publication No. 5-224361/1993 discloses granules obtained in a dry granulator and tablets obtained by compression molding. The solid processing agent produced by this method is effective for a uniform mixture of components in small amounts, however, the granule strength is not sufficient, since water or an aqueous solution is not used as a binder and has a defect that fine powder occurs due to vibration after storage.

Japanese Patent O.P.I. Publication No. 5-197090/1993 discloses tablets having a of 25 to 50% produced by compression molding granules obtained in a stirring granulator. The solid processing agent produced by this method is effective for prevention of insoluble matter occurrence and shortage of dissolving time and its strength is sufficient, however, the control of the grain size is difficult. It has been found that the granules have a defect that there occurs fluctuation of a supplying amount, since the granule size is not sieved and small or large granules are present in admixture.

Japanese Patent O.P.I. Publication Nos. 2-109042/1990 and 4-221951/1992 disclose a solid processing agent obtained in a fluid bed granulating dryer which reduces dust occurrence. The solid processing agent produced by this method is effective for prevention of fine powder immediately after the manufacture and has a predetermined particle size, however, it has been fount that the granules have a defect that fine powder occurs due to vibration after storage, since the strength is not sufficient.

SUMMARY OF THE INVENTION

A first object of the invention is to provide a method of manufacturing a solid developing composition for a silver halide color photographic light-sensitive material reducing fine powder occurrence due to vibration after storage. A second object of the invention is to provide a method of manufacturing a solid developing composition for a silver halide color photographic light-sensitive material capable of reducing fluctuation of a supplying amount.

BRIEF EXPLANATION OF THE DRAWINGS

FIG. 2 shows a plan view and a side view of a tablet supplying means.

DETAILED DESCRIPTION OF THE INVENTION

Figure 1:
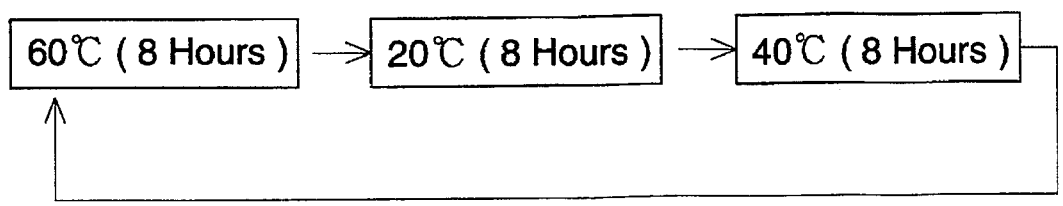
FIG. 1 shows temperature conditions in a thermostatted chamber.

The above objects of the invention can be attained by the following methods:

(1) A method for manufacturing a granular solid processing composition for a silver halide photographic light-sensitive material, the composition comprising at least one photographic processing agent, said method comprising the steps of:

granulating a photographic processing agent with stirring, water being added thereto, to obtain granules; and dressing the granules to obtain the granular solid processing composition.

(2) The method for manufacturing a granular solid processing composition for a silver halide photographic light-sensitive material of (1) above, wherein the photographic processing agent is an alkali agent.

(3) The method for manufacturing a granular solid processing composition for a silver halide photographic light-sensitive material of (1) above, wherein the photographic processing agent is a p-phenylenediamine compound.

(4) The method for manufacturing a granular solid processing composition for a silver halide photographic light-sensitive material of (1) above, wherein the photographic processing agent is hydroxylamine or its derivatives.

(5) The method for manufacturing a granular solid processing composition for a silver halide photographic light-sensitive material of (1) above, wherein the photographic processing agent is a ferric complex of an amino polycarboxylic acid.

(6) The method for manufacturing a granular solid processing composition for a silver halide photographic light-sensitive material of (1) above, wherein the photographic processing agent is a thiosulfate.

(7) The method for manufacturing a granular solid processing composition for a silver halide photographic light-sensitive material of (1), (2), (3), (4), (5) or (6) above, wherein the dressing is carried out during drying after the granulating.

(8) The method for manufacturing a granular solid processing composition for a silver halide photographic light-sensitive material of (1), (2), (3), (4), (5), (6) or (7) above, wherein the dressing is carried out using a 0.5 to 3.0 mm mesh screen.

(9) The method for manufacturing a granular solid processing composition for a silver halide photographic light-sensitive material of (1), (2), (3), (4), (5), (6), (7) or (8) above, wherein the granulating is carried out to obtain granules having a moisture content of not more than 10 wt %, except for crystal water.

(10) A method for manufacturing a tablet solid processing composition for a silver halide photographic light-sensitive material, said method comprising the step of: compression molding the granular solid processing composition of (1) above.

(11) The method for manufacturing a tablet solid processing composition for a silver halide photographic light-sensitive material of (10) above, wherein the photographic processing agent is an alkali agent.

(12) The method for manufacturing a tablet solid processing composition for a silver halide photographic light-sensitive material of (10) above, wherein the photographic processing agent is a p-phenylenediamine compound.

(13) The method for manufacturing a tablet solid processing composition for a silver halide photographic light-sensitive material of (10) above, wherein the photographic processing agent is hydroxylamine or its derivatives.

(14) The method for manufacturing a tablet solid processing composition for a silver halide photographic light-sensitive material of (10) above, wherein the photographic processing agent is a ferric complex of an amino polycarboxylic acid.

(15) The method for manufacturing a tablet solid processing composition for a silver halide photographic light-sensitive material of (10) above, wherein the photographic processing agent is a thiosulfate.

(16) The method for manufacturing a tablet solid processing composition for a silver halide photographic light-sensitive material of (10), (11), (12), (13), (14) or (15) above, wherein the dressing is carried out during drying after the granulating.

(17) The method for manufacturing a tablet solid processing composition for a silver halide photographic light-sensitive material of (10), (11), (12), (13), (14), (15) or (16) above, wherein the dressing is carried out using a 0.5 to 3.0 mm mesh screen.

(18) The method for manufacturing a tablet solid processing composition for a silver halide photographic light-sensitive material of (10), (11), (12), (13), (14), (15), (16) or (17) above, wherein the granulating is carried out to obtain granules having a moisture content, of not more than 10 wt % except for crystal water.

The invention will be detailed below.

The inventors have found the followings by experiments regarding a manufacturing method of a solidified developing processing composition for a silver halide photographic light-sensitive material.

In manufacturing a solid processing composition by granulating the amount of conventional additives such as an excipient and a binder is limited in view of photographic processing properties. The solid processing granules containing additives within a limited range prepared in a stirring granulator are those having a high density, and are superior in granule strength and prevention of fine powder occurrence after storage to those prepared in a fluid bed granulator.

When the granular solid processing composition produced in a stirring granulator is not dressed after granulating, a supplying amount of the granules fluctuates since granules of small and large particle size are present in admixture. Further, when mixed with other granules, the amount fluctuation among the granules occurs.

In the invention "supplying" of granules refers to supplying granules to, for example, receivers for compression-molding into tablets, packages or processing tanks.

Studies have been made based on the above information. The inventors have found that a method for manufacturing a solid developing composition for a silver halide color photographic light-sensitive material can be provided, which reduces fine powder occurrence due to vibration after storage and reduces fluctuation of a supplying amount, the method comprising dressing granules obtained by granulating with stirring.

It has been proved that when the solid processing composition produced by the above method is compression-molded into tablets, the tablets show less fine powder occurrence, markedly reduced fluctuation of tablet weight and increased tablet hardness. This is probably because quantitative supply is maintained, granules are easily crushed on compression-molding due to the surface scratches caused by dressing and a binding ability among particles is improved.

Dressing granules in the invention means a process for obtaining granules having not more than the desired granule size from granules having not less than the desired granule size crushing granules having about 2000 μm or more to less granule size, for example, with a breaking feather. The dressing is different from pulverization before granulating to not more than 100 μm. Simply sieving (so-called classifying) does not comprise crushing granules to less particle size and therefore, is different from the dressing. In classifying, components in small amounts are incorporated in large particles, resulting in fluctuation of the supplying amount. Therefore, the classifying is also different from the dressing of the invention. In dressing components in small amounts, granules may be dressed directly in a dressing apparatus, and may be dressed after sieving with a specific screen in order to prevent fine powder occurrence, however, granules are preferably dressed directly in a dressing apparatus in view of productivity. The invention encompasses dressing a part of granules during drying.

A hammer mill, roll mill or screen mill method can be used as a dressing method. For examole, there are apparatuses available on the market such as Comminutor (produced by Fuji Powder Co., Ltd.), OG-1 (produced by Kikusui Seisakusho Co., Ltd.) and New Speed Mill (produced by Okada Seiko Co., Ltd.).

In the invention dressing may be carried out after granulating, but is preferably carried out during drying in view of effective drying or moisture absorption of granules, and more preferably during and after drying in granules easily subjected to blocking. The dressing during drying refers to dressing during a period from the beginning of drying until the end of drying. There is a method of drying while crushing granules in a stirring fluid bed drier having a drying device and a dresing device or a method of drying granules in a fluid bed dryer, then dressing the granules and further drying the dressed granules. This is because granules begin being dried at the surface, water is likely to ramain inside the granules and water inside the granules is exposed on the surface by dressing whereby sufficient drying is carried out. For example, in an alkali agent, moisture absorption is prevented whereby blocking (aggregation of solid processing agents) due to moisture absorption is prevented; in a hydroxylamine or its derivatives, preservability during storage is less varied; in a p-phenylenediamine compound, coloration or tar component occurrence is prevented; in a thiosulfate, sulfurdization is effectively prevented; and in a ferric complex of an amino polycarboxylic acid, separation of a ferric ion is effectively prevented and storage stability during the manufacture is greatly improved.

When water or an aqueous solution is used in granulating, dressing during drying is carried out in view of granule strength and efficient drying, preferably when the moisture content of granules is not more than 4 wt % and more preferably when not more than 3 wt %. The moisture content referred to herein is a weight reduced when granules are dried at 90° C. for 10 minutes in an electric moisture meter available on the market and is represented by weight percentage (%).

In dressing the particle diameter of granules are preferably controlled using a screen in view of quantitative supply and miscibility with other granules. The screen used during dressing preferably has 0.5 to 3.0 mm mesh, and more preferably 0.5 to 2.0 mm mesh.

The granules after dressing preferably have 70 wt % or more of granules having a particle diameter of 149 to 2000 µm in view of quantitative supply and granule hardness in compression-molding, and more preferably have 70 wt % or more of granules having a particle diameter of 149 to 1490 µm.

The drying method includes a fluid bed method, a box method, an air drying method, a vacuum method or a freeze-dry method. The drying method is preferably a fluid bed method in view of drying efficiency and granule strength. The drying temperature is preferably 80° C. or less in a fluid bed method. The drying temperature is especially preferably 65° C. or less in view of granule strength in manufacture.

Unless otherwise specified, the drying end in the invention is when the moisture content of granules is 2 wt % or less after granules were dried at 90° C. for 10 minutes in an electric moisture meter available on the market.

The granules of the invention refers to as granules granulated to have an average particle diameter of 150 to 3000 µm. The average particle size of the granules of the invention refers to a weight average particle size, which is obtained from the following equation by screening granules using a screen according to JIS Standard and weighing the granules plus the screen, Equation $L_{ave.} = \Sigma (W_i \times L_i) / \Sigma W_i$ wherein $L_{ave.}$ represents a weight average particle size, $W_i$ represents granule weight plus the i-th screen, and $L_i$ represents a mesh size of the i-th screen.

The meshes of the screens used herein are 3360, 2830, 2000, 1410, 1000, 710, 500, 350, 210, 149, 105 and 37 µm. The granulating of the invention refers to granulating using a liquid such as water, an aqueous solution, methanol, ethanol or a mixture thereof as a binder. Water or an aqueous solution is preferably used in view of prevention of explosion and safety of operation.

The granulating with stirring in the presence of a liquid of the invention refers to as preparing aggregated particles of powder by stirring fine powder while adding an appropriate liquid binder and excludes granulating in a fluid bed or in a dryer. The granulating time refers to time taken from the beginning of water addition until the end of stirring. Granulation is preferably carried out, in view of drying property and prevention of aggregation among granules, not to exceed 10 wt % of a liquid binder based on the weight of the composition to be granulated. "Not to exceed 10 wt %" refers to "not to exceed 10 wt % in the end of granulation, although the binder may exceed 10 wt % temporarily during granulation".

Tablets obtained by compression-molding into tablets the solid processing composition prepared by the above method exhibit the effects of the invention markedly, effectively prevent fine powder occurrence due to vibration after storage, and have sufficient strength. When the compression pressure is 400 to 2000 kg/cm², the invention is effected more markedly. Tablets obtained by tableting a mixture of the granules of the invention is also effected more markedly.

The solid processing tablet is produced by well known compressors. The compressors for producing the tablets include a hydraulic press machine, a single tableting machine, a rotary tableting machine and a bricketing machine can be used. The solid processing tablet may be in any form, but is preferably in the cylindrical or parallelepiped form in view of producibility or processability, and more preferably in the cylindrical form. The tablets preferably have chamferings without corners in view of prevention of defects in processing or coating.

On tableting a solid processing composition, lubricants or other additives may be added for facilitating tableting or for other objects.

Hardness in the invention refers to compressive breaking strength, and, in the solid processing tablet, refers to strength in a perpendicular direction to a tableting direction on tableting and in a direction to give a maximum distance in a compression direction. Hardness can be measured by means of an apparatus available on the market such as a Monsant hardness meter, a Stoke hardness meter or Speed Checker (produced by Okada Seiko Co., Ltd.). Granular strength can be measured by means of an apparatus available on the market such as Grano produced by Okada Seiko Co., Ltd..

The method of the invention comprises a process for granulating with stirring in the presence of a liquid at least one component, particularly, a photographic processing agent, contained in the granular solid processing composition of the invention for a silver halide photographic light-sensitive material.

The photographic processing agent of the invention refers to a pH adjusting agent, a preservative, a developing agent, a bleaching agent, a fixing agent, a rehalogenating agent or a chelating agent, which is a material essential for a stable and sufficient photographic processing.

Next, the alkali agent will be explained below.

The alkali agent of the invention is a compound giving pH 8 or more in its aqueous solution. The preferable example includes sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate (borax), potassium tetraborate, sodium hydroxide, potassium hydroxide and lithium hydroxide. Sodium carbonate, sodium bicarbonate, sodium borate and trisodium phosphate are preferable in view of moisture prevention. In the invention sodium carbonate is especislly preferable.

The p-phenylene diamine type compound used in the invention will be explained below. The p-phenylene diamine type compound includes a compound represented by the following Formula [I], [II] or [III].

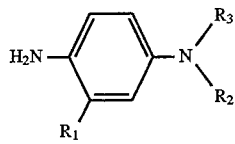

Formula [I]

In Formula [I], $R_1$ and $R_3$ may be the same or different, and independently represent a hydrogen atom, a methyl group, an ethyl group, a propyl group or a hydroxyethyl group; and $R_2$ represents a hydroxyethyl group, a methoxyethyl group, a sulfoalkyl group, a carboxyalkyl group or a β-methanesulfonamido group,

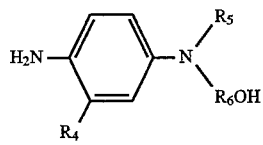

Formula [II]

In Formula [II], $R_4$ and $R_5$ independently represent an alkyl group having 1 to 4 carbon atoms; and $R_6$ represents a straight-chained or branched alkylene group having 3 to 4 carbon atoms,

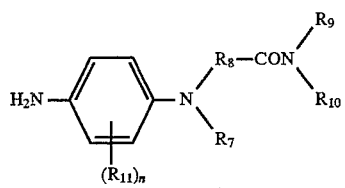

Formula [III]

In Formula [III], $R_7$ represents an alkyl group; $R_8$ represents an alkylene group having two or more carbon atoms, $R_9$ and $R_{10}$ may be the same or different and independently represent a hydrogen atom or an alkyl group having not more than 4 carbon atoms; $R_{11}$ represents a substituent; and n is an integer of 0 to 4, provided that when n is 2 or more, $R_{11}$ may be the same or differen.

The above p-phenylene diamine compound having at least one hydrophilic group which is positioned on the amino group or benzene nucleus is preferably used in view of no stains on a light sensitive material and less stimulation on skin. The typical hydrophilic group preferably includes —$(CH_2)_n$—$CH_2OH$, —$(CH_2)$—$NHSO_2$—$(CH_2)_n$—$CH_3$, —$(CH_2)_m$—O—$(CH_2)_n$—$CH_3$, —$(CH_2CH_2O)_nC_mH_{2m+1}$, —$(CH_2)_m$—$CON(C_mH_{2m+1})_2$, (in which m and n are each an integer of not less than 0), —COOH group and —$SO_3H$ group.

The typical examples preferably used in the invention will be shown below.

 (D-1)

.3/2H₂SO₄.H₂O

 (D-2)

.H₂SO₄

 (D-3)

.H₂SO₄

 (D-4)

.2CH₃—⌬—SO₃H

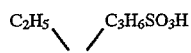 (D-5)

.H₂SO₄

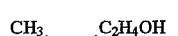 (D-6)

.1/2H₂SO₄

 (D-7)

.H₂SO₄

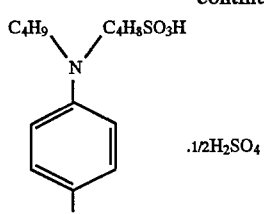 (D-8)

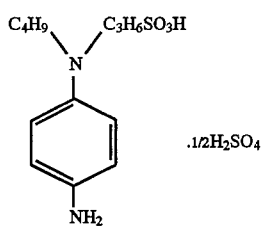 (D-9)

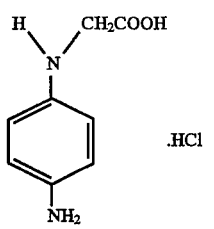 (D-10)

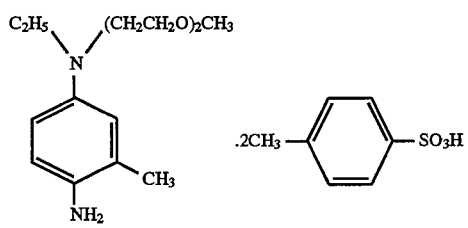 (D-11)

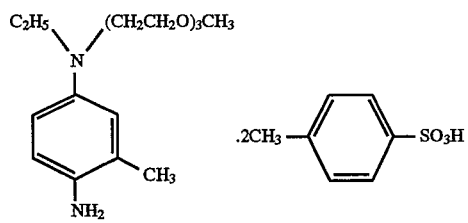 (D-12)

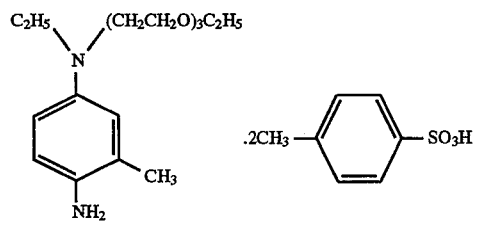 (D-13)

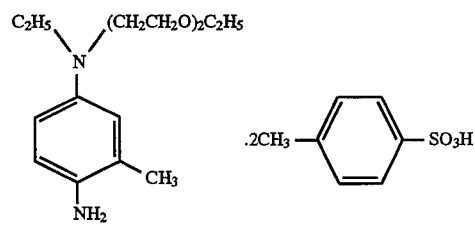 (D-14)

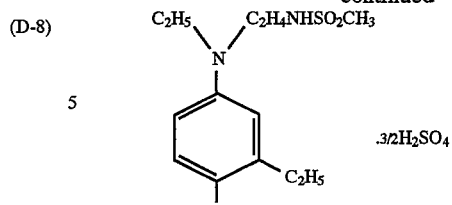 (D-15)

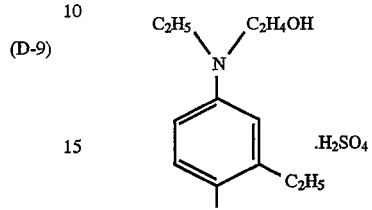 (D-16)

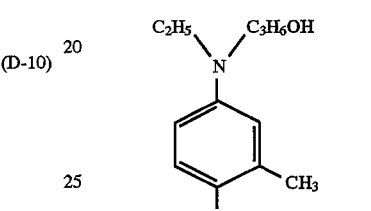 (D-17)

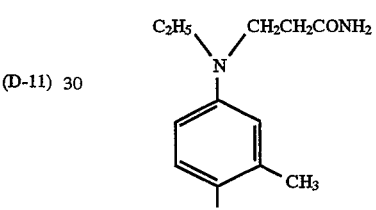 (D-18)

Of these (D-1), (D-3), (D-17) and (D-18) are preferable, and (D-1) and (D-3) are especially preferable.

The hydroxylamine and the hydroxylamine derivative in the invention will be explained below.

The hydroxylamine derivative includes a compound represented by the following Formula [IV]

 Formula [IV]

wherein $R_{12}$ and $R_{13}$ independently represent a hydrogen atom, a substituted or unsubstituted alkyl, aryl or heterocyclic group or $R_{14}CO$— wherein $R_{14}$ represents an alkyl group, an alkoxy group, an aryl group or an amino group, provided that $R_{12}$ and $R_{13}$ may combine to form a nitrogen containing heterocyclic ring.

In Formula [IV] the substituted alkyl group of $R_{12}$ and $R_{13}$ is preferably a substituted alkyl group having 1 to 3 cabon atoms, and may be the same or different. The substituent of the alkyl group includes a hydroxy group, a sulfo group, a phosphonic acid group, an alkoxy group, a carbamoyl group and a cyano group.

The exemplified compound of Formula [IV] will be given below.

| | $R_{12}$ | $R_{13}$ |
|---|---|---|
| IV-1 | —H | —H |
| IV-2 | —H | —CH$_3$ |
| IV-3 | —CH$_3$ | —CH$_3$ |
| IV-4 | —H | —C$_2$H$_5$ |
| IV-5 | —CH$_3$ | —C$_2$H$_5$ |
| IV-6 | —C$_2$H$_5$ | —C$_2$H$_5$ |
| IV-7 | —C$_3$H$_7$(n) | —C$_3$H$_7$(n) |
| IV-8 | —C$_3$H$_7$(i) | —C$_3$H$_7$(i) |
| IV-9 | —C$_4$H$_9$(n) | —C$_4$H$_9$(n) |
| IV-10 | —C$_4$H$_9$(i) | —C$_4$H$_9$(i) |
| IV-11 | —C$_4$H$_9$(t) | —C$_4$H$_9$(t) |
| IV-12 | —CH$_3$ | —CH$_2$CH$_2$COOH |
| IV-13 | —CH$_3$ | —CH$_2$CH$_2$SO$_3$H |
| IV-14 | —CH$_3$ | —CH$_2$COOH |
| IV-15 | —CH$_3$ | —CH$_2$CH$_2$PO$_3$H$_2$ |
| IV-16 | —H | —CH$_2$CH$_2$SO$_3$H |
| IV-17 | —CH$_2$CH$_2$COOH | —CH$_2$CH$_2$COOH |
| IV-18 | —CH$_2$CH$_2$SO$_3$H | —CH$_2$CH$_2$SO$_3$H |
| IV-19 | —CH$_2$COOH | —CH$_2$COOH |
| IV-20 | —CH$_2$CH$_2$PO$_3$H$_2$ | —CH$_2$CH$_2$PO$_3$H$_2$ |
| IV-21 | —CH$_2$CH$_2$OH | —CH$_2$CH$_2$OH |
| IV-22 | —CH$_3$ | —CH$_2$CH$_2$CONH$_2$ |
| IV-23 | —CH$_2$CH$_2$CONH$_2$ | —CH$_2$CH$_2$CONH$_2$ |
| IV-24 | —CH$_3$ | —CH$_2$CH$_2$OCH$_3$ |
| IV-25 | —CH$_2$CH$_2$OCH$_3$ | —CH$_2$CH$_2$OCH$_3$ |
| IV-26 | —CH$_3$ | —CH$_2$CH$_2$OH |
| IV-27 | —CH$_2$CH(CH$_3$)COOH | —CH$_2$CH(CH$_3$)COOH |
| IV-28 | —CH$_2$CH$_2$CN | —CH$_2$CH$_2$CN |

Compounds IV-12 through IV-20 and IV-27 can be used in the form of an alkali metal salt (sodium, potassium or lithium salt).

The compounds represented by Fomula [IV] are usually used in free amine or in the form of hydrochloric acid, sulfate, p-toluenesulfonic acid, oxalic acid, phosphoric acid or acetic acid salt.

The compounds represented by Fomula [IV] are preferably solids in view of the objects of the invention. Of these the especially preferable are the compounds given below.

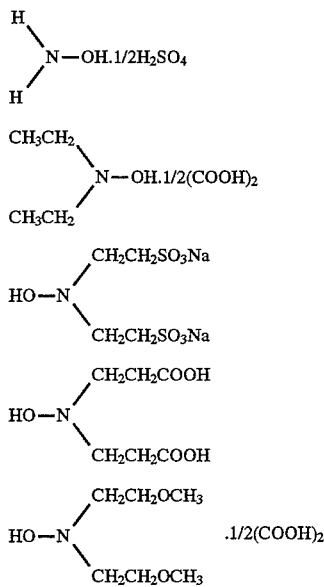

Next, ferric complex of an amino polycarboxylic acid in the invention will be explained below.

The ferric complex of an amino polycarboxylic acid refers to a ferric complex of the following free acid represented by the following Formula [V]

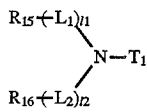

Formula [V]

wherein T$_1$ represents a hydrogen atom, a hydroxy group, a carboxy group, a sulfo group, a carbamoyl group, a phosphono group, a phosphon group, a sulfamoyl group, a substituted or unsubstituted alkyl group, an alkoxy group, an alkylsulfonamido group, an alkylthio group, an acylamino group or a hydroxamic acid group, a hydroxyalkyl group or

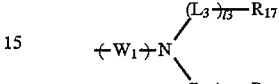

wherein W$_1$ represents a substituted or unsubstituted alkylene, arylene, alkenylene, cycloalkylene or aralkylene group or —(L$_5$—X—)$_{l5}$—(L$_6$)$_{l6}$ wherein X represents —O—, —S—, a divalent heterocyclic group or

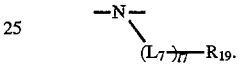

R$_{15}$ through R$_{19}$ independently represent a hydrogen atom, a hydroxy group, a carboxy group, a sulfo group, a carbamoyl group, a phosphono group, a phosphon group, a sulfamoyl group, a sulfonamido group, an acylamino group or a hydroxamic acid group, provided that at least one of R$_{15}$ through R$_{19}$ is a carboxy group. L$_1$ through L$_7$ independently represent a substituted or unsubstituted alkylene, arylene, alkenylene, cycloalkylene or aralkylene group; and l$_1$ through l$_7$ independently represent an integer of 0 to 6, provided that l$_1$ through l$_7$ are not simultaneously 0.

The example of the amino polycarboxylic acid represented by Formula [V] constituting the ferric complex of an amino polycarboxylic acid will be shown below.

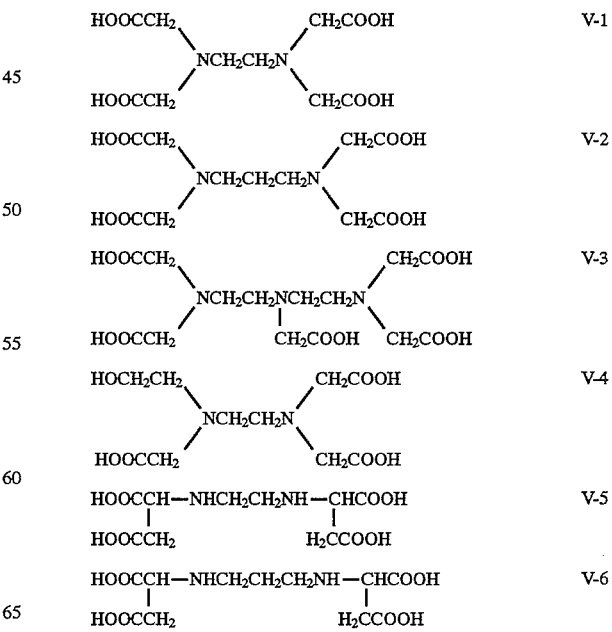

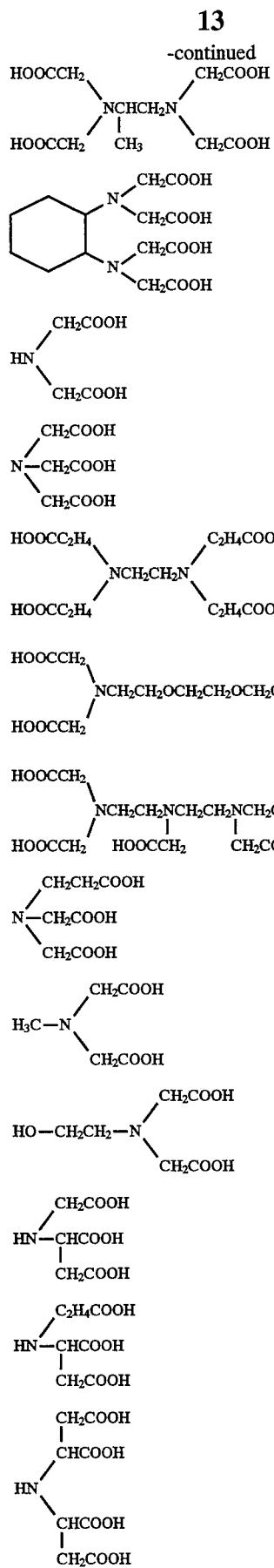
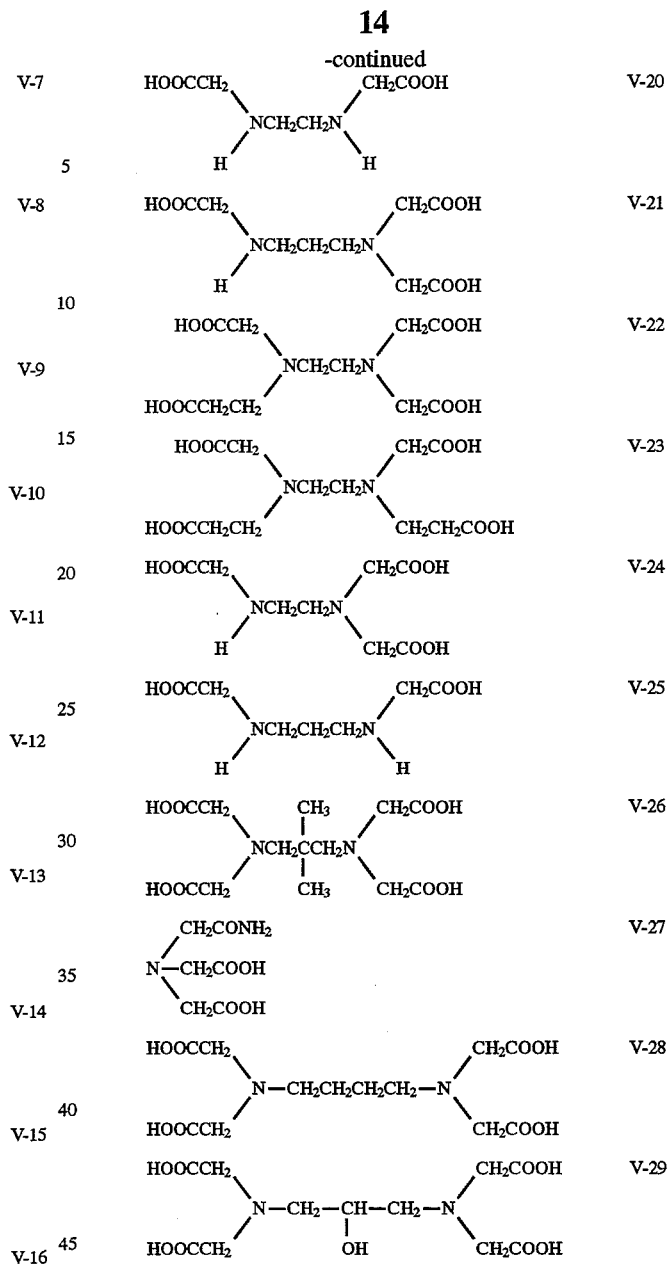

As compounds displaying the effects of the invention (V-1) through (V-8), (V-12), (V-14) through (V-20), (V-22), (V-23) and (V-27) are preferable, and (V-i), (V-2), (V-6), (V-12), (V-14), (V-15) and (V-17) are especially preferable.

In the ferric complex of an amino polycarboxylic acid in the invention the content ratio of a $Fe^{3+}$ ion to an amino polycarboxylic acid is preferably 1:1, and in (V-9) or (V-15) the ratio is preferably 1:2.

The salt of the ferric complex of an amino polycarboxylic acid may have an ammonium, potassium, sodium or hydrogen ion as a pair ion.

A thiosulfate used in the invention will be explained below. As the thiosulfate are preferably used sodium thiosulfate, potassium thiosulfate and ammonium thiosulfate in view of photographic properties, and sodium thiosulfate or potassium thiosulfate is especially preferable.

The solid processig composition in the invention includes a compound represented by the following Formula [A], in view of prevention of fine powder occurrence.

Formula [A]

$$A(-COOH)_{n1}$$

wherein A represents an $n_1$ valent organic group, $n_1$ represents an integer of 1 to 6, and M represents an ammonium, an alkali metal (sodium, potassium or lithium) or a hydrogen atom. In Formula [A] the $n_1$ valent organic group represented by A includes an alkylene group (such as methylene, ethylene, trimethylene or tetramethylene), an alkenylene group (such as ethenylene), an alkinylene group (such as ethynylene), a cycloalkylene group (such as 1,4-cyclohexanediyl), an arylene group (such as o-phenylene group or p-phenylene), an alkanetriyl group (such as 1,2,3-propanetriyl) or an arylenetriyl group (such as 1,2,4-benzenetriyl). The above n valent organic group includes a group having a substituent (such as a hydroxy group, an alkyl group or a halogen atom). The examples include 1,2-dihydroxyethylene, hydroxyethylene, 2-hydroxy-1,2,3-propanetriyl, methyl-p-phenylene, 1-hydroxy-2-chloroethylene, chloromethylene or chloroethenylene. The preferable compound represented by Formula [A] will be shown below.

HOOCCH₂C(OH)(COOH)CH₂COOH (A-1)

HOOC(CHOH)₂COOH (A-2)

HOOCCH₂COOH (A-3)

HOOCCH(OH)CH₂COOH (A-4)

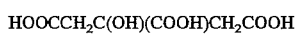 (A-6)

(COOH)₂ (A-7)

 (A-8)

 (A-9)

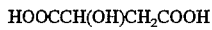 (A-10)

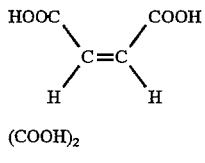 (A-11)

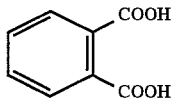 (A-12)

HOOC(CH₂)₃COOH (A-13)

HOOC(CH₂)₄COOH (A-14)

HOOCC≡CCOOH (A-15)

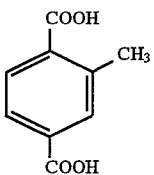 (A-16)

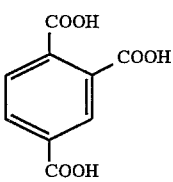 (A-17)

HOOC—CH—CH—COOH (A-18)
   |      |
  HOOC  COOH

 (A-19)

HO—CH₂—COOH (A-20)

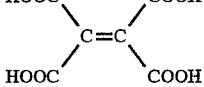 (A-21)

Of these Compounds (A-1), (A-3), (A-4), (A-6), (A-10), (A-13), (A-14), (A-15) and (A-20) are preferable, and (A-1), (A-5), (A-6), (A-10), (A-13), (A-14) and (A-20) are especially preferable.

The salt of the above acid includes an ammonium salt, a lithium salt, a sodium salt or a potassium salt, and the sodium salt or potassium salt is preferable in view of storage stability. These organic acids or salts thereof may be used singly or in combination. When the above ferric complex is mixed with the organic acid and/or the salt thereof, granules of the complex may be mixed with granules of the organic acid and/or the salt. However, granules of a mixture of the complex with the organic acid and/or the salt displays the effects of the invention more markedly. Further, the mixture, compression-molded into tablets, gives tablets excellent in the strength.

The solid processing composition of the invention preferably contains a sulfite, a bisulfite, a metabisulfite, a bisulfite adduct or a hydroxylamine derivative. For example, when it is contained in a solid processing composition comprising an alkali agent, moisture absorption during storage is reduced, and surprisingly expansion due to moisture absorption is greatly reduced. In a solid processing composition comprising a thiosulfate, storage stability during drying is greatly improved, which enables the drying temperature to elevate, resulting in shortening drying time and improving productivity.

The bisulfite adduct includes compounds represented by the following Formula [G] or [G']:

$$R_{29}-\overset{O}{\underset{\|}{C}}-R_{30}$$    Formula [G]

In Formula [G], $R_{29}$ represents a hydrogen atom, an alkyl group, an alkenyl group, an aralkyl group, a cycloalkyl group, an aryl group, a heterocyclic group, a carboxyl group, a benzoyl group, an acyl group, a formyl group or a carbamoyl group, each being substituted or un substituted; and $R_{30}$ represents a hydrogen atom or a methyl group,

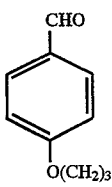
Formula [G']
In Formula [G'], Y represents an atomic group necessary to form a 3 through 6-membered cycloalkyl group or a heterocyclic ring; and Z represents a substituent; and n is an integer of 0 to 5, provided that when n is 2 to 5, Z may be the same of different.
The examples represented by Formula [G] or [G'] will be shown below:
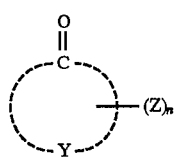 G-1
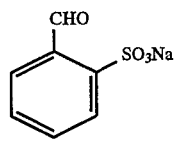 G-2
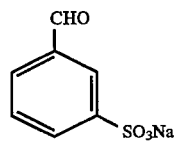 G-3
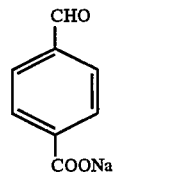 G-4
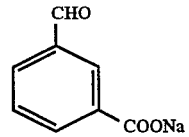 G-5
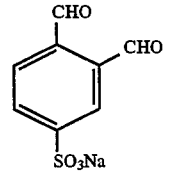 G-6
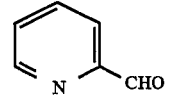 G-7
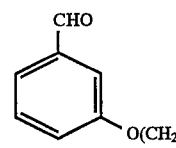 G-8
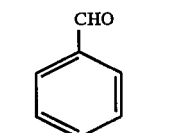 G-9
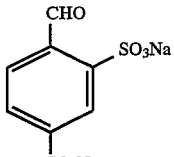 G-10
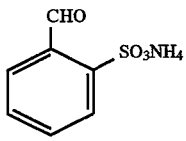 G-11
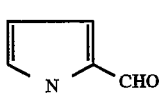 G-12
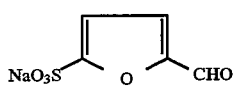 G-13
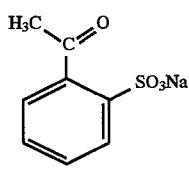 G-14
 G-15
 G-16
 G-17
 G-18
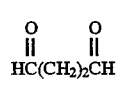 G-19
 G-20
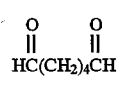 G-21
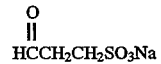 G-22
 G-23
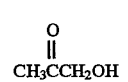 G-24

-continued

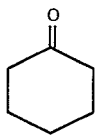

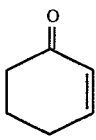

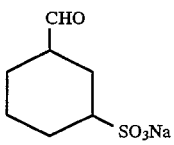

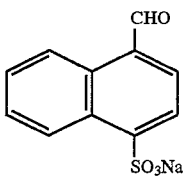

-continued

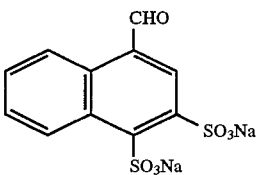

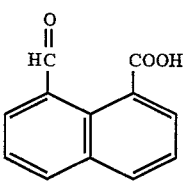

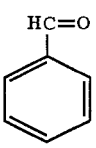

-continued

G-25

G-26

G'-27

G'-28

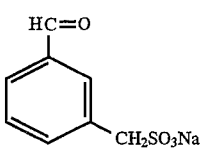

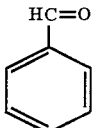

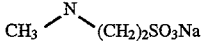

G-29

G-30

G-31

G-32

G-33

G-34

G-35

The solid processing composition of the invention may contain a halide. The halide includes sodium chloride potassiun chloride, ammonium chloride, potassiun bromide, sodium bromide, ammonium bromide, potassiun iodide, sodium iodide or ammonium iodide. Of these sodium chloride potassiun chloride, ammonium chloride, potassiun bromide, sodium bromide, ammonium bromide is preferably used and surprisingly has the effect of preventing fine powder occurrence due to vibration during storage.

The solid processing composition may further contain a compound represented by the Following Formula [E]:

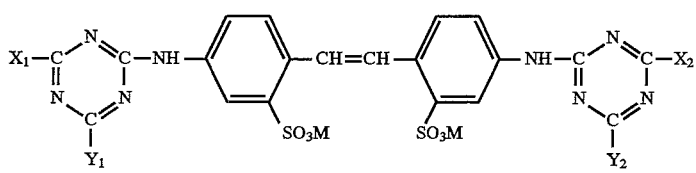

Formula [E]

wherein $X_1$, $X_2$, $Y_1$ and $Y_2$ independently represent a hydroxy group, a halogen atom, a morpholino group, an alkoxy group, an aryloxy group, analkyl group, an aryl group, an amino group, an alkylamino group or an arylamino group; and M represents a hydrogen atom, an alkali atom or other cations.

Next, the compound represented by the following Formula [E] will be explained. In Formula [E], the alkoxy group represented by $X_1$, $X_2$, $Y_1$ or $Y_2$ includes methoxy, ethoxy or methoxyethoxy; the aryloxy group includes phenoxy or p-sulfophenoxy; the alkyl group includes methyl or ethyl; the aryl group includes phenyl or methoxyphenyl; the alkylamino group includes methylamino, ethylamino; propylamino, dimethylamino, cyclohexylamino, β-hydroxyethylamino, β-dihydroxyethyamino, β-sulfoethylamino, N-β-sulfoethyl-N'-methylamino or N-β-hdroxyethyl-N'-methylamino; the arylamino group includes anilino, o-, m-, p-sulfoanilino, o-, m-, p-chloroanilino, o-, m-, p-toluidino, o-, m-, p-carboxyanilino, sulfoanilino, o-, m-, p-hydroxyanilino, o-, m-, p-sulfonaphthylamino, o-, m-, p-aminoanilino or o-, m-, p-anidino; and the alkali metal or other cations represented by M includes sodium, potassium, ammonium or lithium.

The examples of compounds represented by Formula [E] will be shon below.

| Compound No. | M | $X_1$ | $Y_1$ | $Y_2$ | $X_2$ |
|---|---|---|---|---|---|
| E-1 | Na | 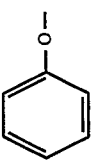 | $-NHC_2H_4OH$ | $-NHC_2H_4OH$ | 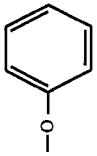 |
| E-2 | Na | $HOC_2H_4NH-$ | $-NHC_2H_4OH$ | $-NHC_2H_4OH$ | $-NHC_2H_4OH$ |
| E-3 | Na |  | $-N(C_2H_4OH)_2$ | $-N(C_2H_4OH)_2$ | 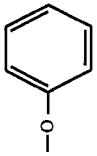 |
| E-4 | Na | $(HOC_2H_4)_2N-$ | $-OCH_3$ | $-OCH_3$ | $-NHC_2H_4SO_3Na$ |
| E-5 | Na | $HOC_2H_4NH-$ | $-(C_2H_4OH)_2$ | $-(C_2H_4OH)_2$ | $-NHCH_2CHOH$<br>$\quad\quad\quad\quad\ \ CH_2OH$ |
| E-6 | Na | $(HOC_2H_4)_2N-$ | $-N(C_2H_4OH)_2$ | $-N(C_2H_4OH)_2$ | $-N(C_2H_4OH)_2$ |
| E-7 | Na |  | $-NHC_2H_4OH$ | $-NHC_2H_4OH$ | 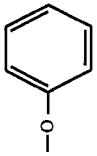 |
| E-8 | Na |  | $-N(C_2H_4OH)_2$ | $-N(C_2H_4OH)_2$ | 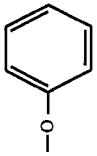 |
| E-9 | Na | $HO-$ |  | 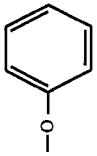 | $-OH$ |
| E-10 | Na | $H_2N-$ |  | 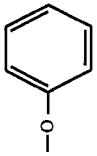 | $-NH_2$ |
| E-11 | Na | $CH_3O-$ | 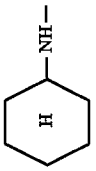 | 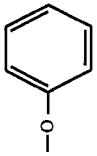 | $-OCH_3$ |

-continued

| Compound No. | M | $X_1$ | $Y_1$ | $Y_2$ | $X_2$ |
|---|---|---|---|---|---|
| E-12 | Na | $HOC_2H_4NH-$ | -NH-C₆H₅ | -NH-C₆H₅ | $-NHC_2H_4OH$ |
| E-13 | Na | $(HOC_2H_4)_2N-$ | -NH-C₆H₅ | -NH-C₆H₅ | $-(C_2H_4OH)_2$ |
| E-14 | Na | $HOC_2H_4NH-$ | -NH-C₆H₄(COONa) (o) | -NH-C₆H₄(COONa) (o) | $-NHC_2H_4OH$ |
| E-15 | Na | 3-(NaO₃S)-C₆H₄-NH- | $-(C_2H_4OH)_2$ | $-(C_2H_4OH)_2$ | -NH-C₆H₄-SO₃Na (3) |
| E-16 | Na | 4-(NaO₃S)-C₆H₄-NH- | $-(C_2H_4OH)_2$ | $-(C_2H_4OH)_2$ | -NH-C₆H₄-SO₃Na (4) |
| E-17 | Na | 4-(H₂NO₂S)-C₆H₄-NH- | $-(C_2H_4OH)_2$ | $-(C_2H_4OH)_2$ | -NH-C₆H₄-SO₂NH₂ (4) |
| E-18 | Na | 4-(NaO₃S)-C₆H₄- | $-(C_2H_4OH)_2$ | $-(C_2H_4OH)_2$ | -C₆H₄-SO₃Na (4) |
| E-19 | Na | $HOH_2CHCH_2CNH-$ $\quad\quad\quad CH_3$ | $-CH_3O$ | $-CH_3O$ | $-NHCH_2CHCH_2OH$ $\quad\quad\quad CH_3$ |

-continued

| Compound No. | M | $X_1$ | $Y_1$ | $Y_2$ | $X_2$ |
|---|---|---|---|---|---|
| E-20 | Na | $(HOC_2H_4)_2N-$ | -NH-C₆H₄-COONa (2-) | -NH-C₆H₄-COONa (2-) | $-N(C_2H_4OH)_2$ |
| E-21 | Na | $HOCH_2H_4NH-$ | -NH-C₆H₄-COONa (4-) | -NH-C₆H₄-COONa (4-) | $-NHC_2H_4OH$ |
| E-22 | Na | -NH-C₆H₃(SO₃Na)₂ (3,5-) | $-NHC_2H_5$ | $-NHC_2H_5$ | -NH-C₆H₃(SO₃Na)₂ (3,5-) |
| E-23 | Na | -NH-C₆H₃(SO₃Na)(NH) | | | -NH-C₆H₃(SO₃Na) |
| E-24 | Na | -NH-C₆H₃(SO₃Na)(NH) | $-NHCH_3$ | $-NHCH_3$ | -NH-C₆H₄-SO₃Na (4-) |
| E-25 | Na | $HOC_2H_4NH-$ | morpholino | morpholino | $-NHC_2H_4OH$ |
| E-26 | Na | $HOC_2H_4NH-$ | -NH-C₆H₄-CONH₂ (4-) | -NH-C₆H₄-CONH₂ (4-) | $-NHC_2H_4OH$ |
| E-27 | Na | $(HOC_2H_4)_2N-$ | -NH-C₆H₄-CONHC₂H₄OH (4-) | -NH-C₆H₄-CONHC₂H₄OH (4-) | $-N(C_2H_4OH)_2$ |

-continued

| Compound No. | M | $X_1$ | $Y_1$ | $Y_2$ | $X_2$ |
|---|---|---|---|---|---|
| E-28 | Na | $HOC_2H_4NH-$ | 4-($SO_2NH_2$)-phenyl-NH- | 4-($SO_2NH_2$, 1-$NH_2$)-phenyl-NH- | $-NHC_2H_4OH$ |
| E-29 | Na | $HOC_2H_4NH-$ | 4-($SO_2NHC_2H_4OH$)-phenyl-NH- | 4-($SO_2NHC_2H_4OH$)-phenyl-NH- | $-NHC_2H_4OH$ |
| E-30 | Na | $(HOC_2H_4)_2N-$ | 4-($SO_2NHC_2H_4OH$)-phenyl-NH- | 4-($SO_2NHC_2H_4OH$)-phenyl-NH- | $-N(C_2H_4OH)_2$ |
| E-31 | Na | $C_6H_5-N(C_2H_4OH)-$ | phenyl-NH- | phenyl-NH- | $C_6H_5-N(C_2H_4OH)-$ |
| E-32 | Na | 2-$SO_3Na$, 4-$HOCH_2$, 5-$SO_3Na$-phenyl-NH- | 4-OH-phenyl- | 4-OH-phenyl- | 2-$CH_2OH$, 3-$SO_3Na$, 5-$SO_3Na$-phenyl-NH- |
| E-33 | Na | 2-$SO_3Na$, 4-$HOCH_2$, 5-$SO_3Na$-phenyl-NH- | $-NHC_2H_5$ | $-NHC_2H_5$ | 2-$CH_2OH$, 3-$SO_3Na$, 5-$SO_3Na$-phenyl-NH- |
| E-34 | Na | $CH_3O-$ | $-NHCH_2CH(OH)CH_3$ | $-NHCH_2CH(OH)CH_3$ | $-OCH_3$ |
| E-35 | Na | 2-$SO_3Na$, 5-$SO_3Na$-phenyl-NH- | 4-O-phenyl- | 4-O-phenyl- | 2-$SO_3Na$, 5-$SO_3Na$-phenyl-NH- |

-continued
| Compound No. | M | $X_1$ | $Y_1$ | $Y_2$ | $X_2$ |
|---|---|---|---|---|---|
| E-36 | Na | 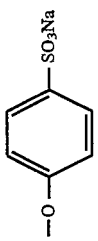 | $-N(C_2H_4OH)_2$ | $-N(C_2H_4OH)_2$ |  |
| E-37 | Na | 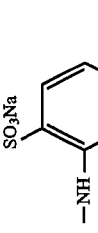 | $-N(C_2H_5)_2$ | $-N(C_2H_5)_2$ |  |
| E-38 | Na | 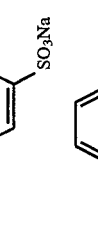 | $-NHCH_3$ | $-NHCH_3$ |  |
| E-39 | Na | $CH_3O-$ | $-NH-CH(CH_2OH)CH_3$ | $-NH-CH(CH_2OH)CH_3$ | $-OCH_3$ |
| E-40 | Na | $CH_3O-$ | $-N(C_2H_4OH)_2$ | $-N(C_2H_4OH)_2$ | $-OCH_3$ |
| E-41 | Na | $CH_3O-$ | $-NHC_2H_4SO_3Na$ | $-NHC_2H_4SO_3Na$ | $-OCH_3$ |
| E-42 | Na | $CH_3O-$ | $-NH(C_2H_4OH)$ | $-NH(C_2H_4OH)$ | $-OCH_3$ |
| E-43 | Na | $CH_3O-$ | 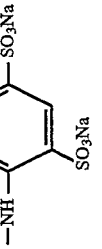 |  | $-OCH_3$ |
| E-44 | K | $CH_3O-$ | $-NHC_2H_4SO_3K$ | $-(C_2H_4OH)_2$ | $-OCH_3$ |
| E-45 | H | 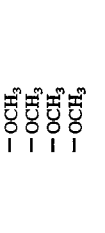 | $-N(C_2H_5)_2$ | $-N(C_2H_5)_2$ | 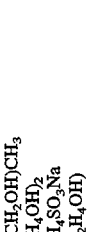 |

The above compounds can be prepared by a conventional method. Of the above compounds E-4, E-24, E-34, E-35, E-36, E-37, E-41 and E-44 are especially preferable.

The content of these compounds in granules is preferably 0.1 to 50 wt %, and more preferably 1 to 30 wt %.

In view of coloration and storage stability, the solid processing composition preferably contains compounds represented by the Following Formulas [VI] through [IX]: This is because reaction by air or heat during granulating or drying can be prevented even when water having a high concentration of metal ion (an iron ion or a carcium ion) used.

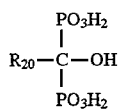

Formula [VI]

$$R_{20}-\underset{\underset{PO_3H_2}{|}}{\overset{\overset{PO_3H_2}{|}}{C}}-OH$$

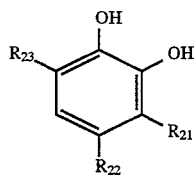

Formula [VII]

In Formulas above, $R_{20}$ represents a substituted or unsubstituted alkyl group having 1 to 5 carbon atoms; and $R_{21}$, $R_{22}$ and $R_{23}$ independently represent a hydrogen atom, a halogen atom, a sulfonic acid group or a substituted or unsubstituted alkyl group having 1 to 8 carbon atoms, The compounds of Formula [VI] include 1,2-dihydroxyethyl-1,1-diphosphonic acid, 1-hydroxyethylidene-1,1-diphosphonic acid or 1-hydroxypropylidene-1,1-diphosphonic acid, and one or two or more of these may be used. 1-Hydroxyethylidene-1,1-diphosphonic acid is especially preferable in the invention, and may be used in the form of an alkali metal salt such as a sodium, potassium or lithium salt. A sodium salt is preferable, and a tri- or tetra sodium salt is especially preferable.

The compounds of Formula [VII] include 1,2-dihydroxybenzene, 4-propyl-1,2-dihydroxybenzene, 1,2-dihydroxybenzene-3,5-disulfonic acid, 1,2-dihydroxybenzene-3,5,6-trisulfonic acid, 1,2,3-trihydroxybenzene, 1,2,3-trihydroxybenzene-5-carboxymethylester, 1,2,3-trihydroxybenzene-5-carboxy-n-butylester or 5-t-butyl-1,2,3-trihydroxybenzene, and one or two or more of these may be used. 1,2-dihydroxybenzene-3,5-disulfonic acid or 1,2-dihydroxybenzene-3,5,6-trisulfonic acid is especially preferable in the invention, and may be used in the form of an alkali metal salt such as a sodium or potassium salt. A sodium salt is preferable. The salt may be an anhydiride or a hydrate.

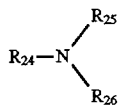

Formula [VIII]

In Formula above, $R_{24}$ represents a hydroxyalkyl group having 2 to 6 carbon atoms; and $R_{25}$ and $R_{26}$ independently represent a hydrogen atom, an alkyl group having 1 to 6 carbon atoms, a hydroxyalkyl group having 2 to 6 carbon atoms, benzyl group or —$C_nH_{2n}$—N(X)(Y), wherein n is an integer of 1 to 6 and X and Y independently represent a hydrogen atom, an alkyl group having 1 to 6 carbon atoms or a hydroxyalkyl group having 2 to 6 carbon atoms.

The examples represented by Formula [VIII] will be shown below:

VIII-1 Ethanolamine
VIII-2 Diethanolamine
VIII-3 Triethanolamine
VIII-4 Diisopropanolamine
VIII-5 2-Methylaminoethanolamine
VIII-6 2-Ethylaminoethanolamine
VIII-7 2-Dimethyaminoethanolamine
VIII-8 2-Diethylaminoethanol
VIII-9 1-Diethyamino-2-propanol
VIII-10 3-Diethyamino-1-propanol
VIII-11 3-Dimethyamino-1-propanol
VIII-12 iso-Propyamino-1-propanol
VIII-13 3-amino-1-propanol
VIII-14 2-amino-2-methyl-1,3-propane diol
VIII-15 Ethylenediamine tetra-iso-propanol
VIII-16 Benzylethanolamine
VIII-17 2-amino-2-hydroxymethyl-1,3-propane diol Of these compounds VIII-1, VIII-2 and VIII-3 are especially preferable.

These compounds may be used in the form of a free amine or a salt with hydrocloric acid or surfuric acid. These compounds may be used singly or in combination of two or more kinds.

Formula [IX]

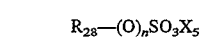

$$R_{28}-(O)_nSO_3X_5$$

wherein $R_{28}$ represents an alkyl group having 1–8 carbon atoms or a phenyl group, The compound in the invention represented by Formula [IX] will be detailed below.

In Formula [IX], a substituted of unsubstituted alkyl group having 1 to 8 carbon atoms represented by $R_{28}$, includes for example, a methyl group, a carboxymethyl group, a phenylmethyl group, an ethyl group, a hydroxyethyl group, a sulfonylethyl group, a propyl group, a butyl group, a tert-butyl group, a heptyl group, an iso-octyl group or a furanyl group. These groups may be straight-chained or branched and may also include those each having a substituent. Such substituents include, for example, a halogen atom (such as a chlorine atom or a bromine atom), an aryl group (such as a phenyl group), a hydroxyl group, an amino group, a nitro group, a carboxylic acid group (including the salts thereof) and a sulfonic acid group (including the salts thereof).

The phenyl group represented by $R_{28}$ includes those each having a substituent. Such substituent includes, for example, a halogen atom (such as a chlorine atom and a bromine atom), an alkyl group (including, preferably, an alkyl group having 1 to 4 carbon atoms, such as a methyl group, an ethyl group, an iso-propyl group or a butyl group), a hydroxyl group, an amino group, a nitro group, a carboxylic acid group (including the salts thereof) and a sulfonic acid group (including the salts thereof). The substituent on the phenyl group may be a single substituent or 2 to 5 substituents. In the case of 2 to 5 substituents, these substituents may be the same as or the different from each other.

Further, $R_{28}$ may represent a polymer chain having a repetition unit derived from an ethylenically-unsaturated group.

$R_{28}$ represents, preferably, a phenyl group and, preferably, a phenyl group having a substituent. The preferable substituents thereto include, for example, an alkyl group having 1 to 4 carbon atoms, a hydroxyl group, a carboxylic acid group (including the salts thereof) and a sulfinic acid group (including the salts thereof).

$X_5$ represents a hydrogen atom, an alkali metal atom or an ammonium group, and the alkali metal atom include a sodium atom, a potassium atom or a lithium atom. $X_5$ preferably represents a sodium atom, a potassium atom or an ammonium group, and n preferably is 0.

The typical examples of the sulfonic acid derivatives in the invention represented by the Formula [IX] will be given below, but the invention shall not be limited thereto.

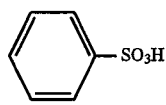 (IX-1)

 (IX-2)

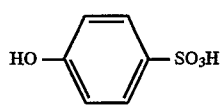 (IX-3)

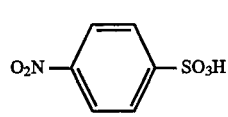 (IX-4)

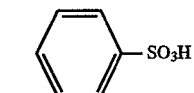 (IX-5)

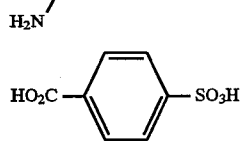 (IX-6)

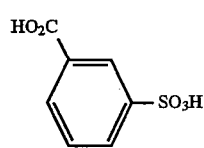 (IX-7)

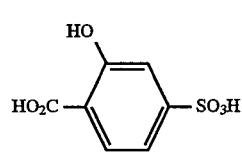 (IX-8)

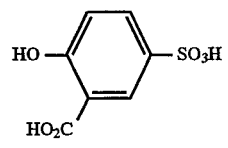 (IX-9)

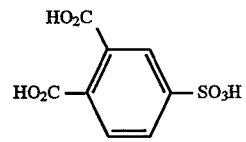 (IX-10)

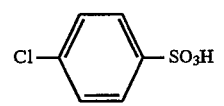 (IX-11)

-continued

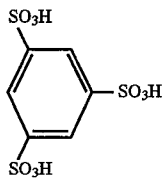 (IX-12)

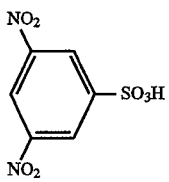 (IX-13)

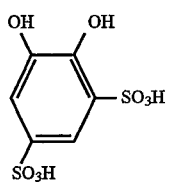 (IX-14)

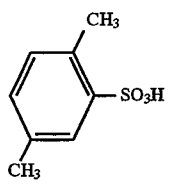 (IX-15)

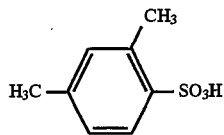 (IX-16)

 (IX-17)

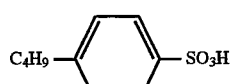 (IX-18)

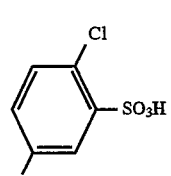 (IX-19)

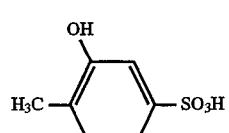 (IX-20)

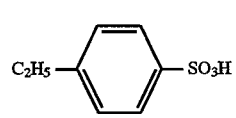 (IX-21)

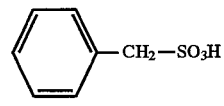 (IX-22)

(IX-23) HO—C₆H₄—CH₂SO₃H (IX-24) 2,4-dinitrobenzenesulfonic acid (O₂N, NO₂, SO₃H on benzene)

(IX-25) 3-hydroxy-4-carboxy-benzene-1,5-disulfonic acid type (COOH, HO, SO₃H, SO₃H)

(IX-26) 3-hydroxybenzenesulfonic acid (HO—C₆H₄—SO₃H)

(IX-27) 2,5-dihydroxybenzene-1,4-disulfonic acid (OH, SO₃H, HO₃S, OH)

(IX-28) benzene-1,3-disulfonic acid (IX-29) 4-hydroxybenzene-1,3-disulfonic acid (HO—, SO₃H, SO₃H)

(IX-30) 4-bromobenzenesulfonic acid (Br—C₆H₄—SO₃H)

(IX-31) 2-bromobenzenesulfonic acid (IX-32) 4-methylbenzenesulfonic acid (H₃C—C₆H₄—SO₃H)

(IX-33) 2-chlorobenzenesulfonic acid (Cl—C₆H₄—SO₃H)

(IX-34) $H_3CSO_3H$ (IX-35) $H_2C(SO_3H)_2$ (IX-36) $C_6H_{13}SO_3H$ (IX-37) $C_7H_{15}SO_3H$ (IX-38) $C_8H_{17}SO_3H$ (IX-39) $C_3H_7SO_3H$ (IX-40) $C_4H_9SO_3H$ (IX-41) $C_5H_{11}SO_3H$ (IX-42) $HO_3S-C_2H_4-SO_3H$ (IX-43) $HO-C_2H_4-SO_3H$ (IX-44) $HO_2CCH_2SO_3H$ (IX-45) 
$$\left(-CH_2CH-\right)_n$$
$$\quad\quad\quad | $$
$$\quad\quad\; SO_3H$$
n = 3–300

(IX-46) poly(styrenesulfonic acid), $\left(-CH_2CH-\right)_m$ with phenyl-SO₃H, m = 3–300

(IX-47) phenyl—OSO₃H (IX-48) $CH_3$—C₆H₄—OSO₃H (IX-49) $C_2H_5$—C₆H₄—OSO₃H (IX-50) $C_3H_7$—C₆H₄—OSO₃H Of these compounds IX-17, IX-18 and IX-32 are especially preferably used. In the above compounds each of compounds having a sulfonic acid group or a carboxyl group include its salts such as sodium, potassium, lithium and ammonium.

The solid processing composition of the invention may contains a compound represented by the following Formula [H] or [J]. The addition of the compound represented by the following Formula [H] or [J] eliminates an addiyion of an aldehyde which causes a sulfide precipitation.

Formula [H]

(ring Z with substituent X, shown as $(X)_n$)

In Formula [H], Z represents an atomic group necessary to form a hydrocarbon ring or a heterocyclic ring; and X represents an aldehyde group,

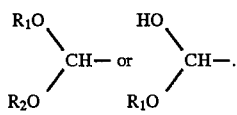

wherein $R_1$ and $R_2$ independently represent a lower alkyl group and n is an integer of 1 to 4.

In Formula [H], Z represents an atomic group necessary to form a substituted or unsubstituted hydrocarbon ring or a substituted or unsubstituted heterocyclic ring, provided that the ring may be a single or condensed ring. Z preferably represents an aromatic hydrocarbon ring or a heterocyclic ring, each having a substituent. The substituent includes an aldehyde group, a hydroxy group, an alkyl group, an ether group, a halogen group or a characteristic group. The hydrocarbon ring of Z preferably is a benzene ring, and the heterocyclic ring of Z preferably is a 5- or 6-membered heterocyclic ring or or a condensed ring.

The examples represented by Formula [H] will be shown below.

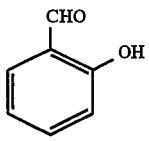 H-1

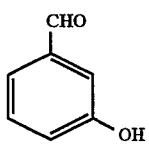 H-2

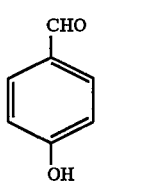 H-3

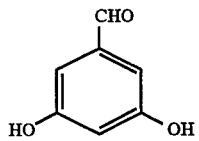 H-4

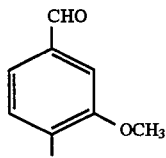 H-5

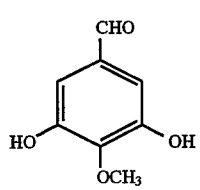 H-6

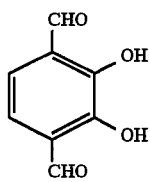 H-7

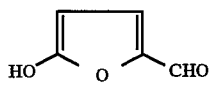 H-8

Besides the above compounds, the compounds represented by Formula [H] include compounds (1) through (90) described in U.S. Pat. No. 5,278,033.

Compound (H-2) is most preferable of compounds represented by Formula [H].

Next, compounds represented by Formula [J] will be explained below.

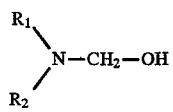

Formula [J]

In Formula [J], $R_1$ and $R_2$ may be the same or different and independently represent a hydrogen atom or a substituent, provided that $R_1$ and $R_2$ may combine each other to form a ring. In Formula [J], the substituent represented by $R_1$ and $R_2$ is not limited, but is preferably a hydrocarbon group, a characteristic group, a halogenated hydrocarbon group, an acyl group, a heterocyclic group or an ether group. The group represented by $R_1$ and $R_2$ further has a substituent, and the substituent is preferably a hydroxy group, a carboxyl group, a sulfonic acid group, a phosphoric acid group, an amino group, an acid group or an alkoxy group.

The examples represented by Formula [J] will be shown below.

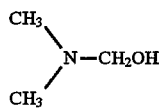 J-1

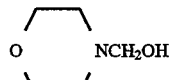 J-2

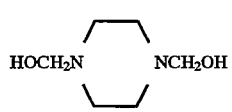 J-3

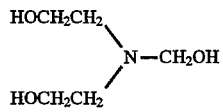 J-4

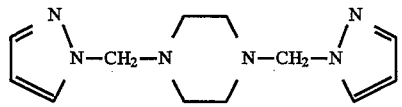 J-5

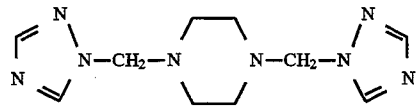 J-6

Besides the above compounds, the compounds represented by Formula [J] include compounds (A-1) through (A-76) described on pages 10–20 in Japanese Patent O.P.I. Publication No. 4-359249/1992 or compounds (X-1) through (X-76) described on pages 14–23 in Japanese Patent O.P.I. Publication No. 4-362943/1992. Compound (J-3), (J-5) or (J-6) is most preferable of compounds represented by Formula [J].

Compounds represented by Formula [J] are preferably used in combination with a nitrogen-containing heterocyclic compound. The nitrogen-containing heterocyclic compound includes 1,2,4-triazole or imidazole and further compounds (I-1) through (I-48) described on pages 4–7 in Japanese Patent O.P.I. Publication No. 4-359249/1992.

When a saccharide and/or water soluble polymer are used during manufacture of the solid composition, the invention is further effected in view of strength of granules. The saccharide and/or water soluble polymer may be used during granulating as a solid mixture with a carbonate, a solution or in combination of a solid and a solution. The preferable compound will be shown below, but the invention is not limited thereto.

I. Water Soluble Polymer

A water soluble polymer includes polyethylene glycol, polyvinyl alcohol, polyvinyl pyrrolidone, polyvinyl acetal, polyvinyl acetate, an aminoalkylmethacrylate copolymer, methacrylic acid-methacrylate copolymer, methacrylic acid-acrylate copolymer, and methacrylic acid betaine type polymer.

II Saccharide

A saccharide includes a monosaccharide such as glucose or galactose, disaccharide such as maltose, sucrose or lactose, a sugar alcohol such as mannitol, sorbitol or erythritol, pullulan, methylcellulose, ethylcellulose, hydroxypropylcellulose, hydroxypropylmethylcellulose, cellulose acetate phthalate, hydroxypropylmethylcellulose phthalate, hydroxypropylmethylcellulose acetate succinate, dextrin or starch dissociate.

Of the above compounds the preferable are a block polymer of polyethylene glycol and polypropylene glycol, polyethylene glycol (weight average molecular weight of 2,000 to 20,000), a methacrylic acid-methacrylate copolymer or methacrylic acid-acrylate copolymer reperesented by Oidragid produced by Rehm Pharma Co., erythritol, maltose, mannitol, dextrin or starch dissociate represented by Pineflow and Pinedex produced by Matsutani Kagaku Co., Ltd., and methacrylic acid betaine type polymer represented by Yuka Former produced by Mitsubishi Yuka Co., Ltd.

The content of these compounds is preferably 0.5 to 20% by weight and especially preferably 0.5 to 20% by weight based on the weight of the solid processing composition.

EXAMPLES

The invention will be detailed in the following Examples, but is not limited thereto.

Example 1

Procedure (1-1)

| Anhydrous potassium carbonate | 15,000 g |
|---|---|

In MICRO-PULVERIZER produced by Hosokawa Mikuron Co. Ltd. the above compound was pulverized at 30° C. and not more than 50% RH to have a particle size of not more than 100 µm. The resulting powder was granulated in a fluid bed spraying granulator by spraying 1000 ml of water as a binder. The granulation was carried out, while air temperature was maintained at 50° to 65° C. The resulting granules were dried to have a moisture content of not more than 2 wt %. Thereafter, the granules were dressed one time after drying using NEW SPEED MILL produced by Okada Seiko Co., Ltd equipped with a 1.5 mm screen. Thus, sample (1-1) was obtained.

Procedure (1-2)

| Anhydrous potassium carbonate | 15,000 g |
|---|---|

In the same manner as in Example 1, the above compound was pulverized at 30° C. and not more than 50% RH to have a particle size of not more than 100 µm. The resulting powder was granulated with stirring in the presence of a liquid in a NEW SPEED KNEADER (produced by Okada Seiko Co., Ltd.) by spraying 1000 ml of water as a binder at a rate of 750 ml/min.

The resulting granules were dried by a hot air of 50° to 65° C. in a fluid bed dryer MDD-400N (produced by Fuji Powder Co., Ltd.) to have a moisture content of not more than 2 wt %. Thus, sample (1-2) was obtained.

Procedure (1-3)

| Anhydrous potassium carbonate | 15,000 g |
|---|---|

In the same manner as in Procedure (1-2), the above compound was pulverized and granulated. The resulting granules were dried in a fluid bed dryer in the same manner as in Procedure (1-2), except that the granules were dressed one time during drying in a NEW SPEED MILL (produced by Okada Seiko Co., Ltd.) equipped with a 1.5 µm screen. Thereafter, the resulting granules were dried to have a moisture content of not more than 2 wt %. Thus, sample (1-3) was obtained.

Sample (1-3) after drying was further dressed one more time using a 1.5 µm screen. Thus, sample (1-4) was obtained.

Procedure (1-4)

| Anhydrous potassium carbonate | 7,300 g |
|---|---|
| Anhydrous sodium sulfite | 80 g |
| Lithium hydroxide monohydrate | 800 g |
| Penta sodium diethylenetriaminepentaacetate | 720 g |
| Sodium p-toluenesulfonate | 3,000 g |
| Polyethylene glycol #4000 (produced by Nihon Yushi Co. Ltd.) | 2,000 g |
| D-mannitol | 1,300 g |

In the same manner as in Procedure (1-2), the above compound was independently pulverized. The resulting powders were mixed for 3 minutes in a stirring granulator and were granulated for 4 minutes by spraying 450 ml of water at a rate of 750 ml/min. The resulting granules were dried in the same manner as in Procedure (1-2) to have a moisture content of not more than 2 wt %. Thus, sample (1-5) was obtained.

Procedure (1-5)

Compounds in Procedure (1-4) were pulverized, granulated and dried in the same manner as in Procedure (1-4) to obtain granules, except that dressing was carried out one time in the same manner as in Procedure (1-3). The resulting granules were dried to have a moisture content of not more than 2 wt %. Thus, sample (1-6) was obtained.

Procedure (1-6)

The compounds of Procedure (1-5) were pulverized, granulated, dried and dressed in the same manner as in Procedure (1-5) to obtain granules having a moisture content of not more than 2 wt %. The resulting granules were dressed one more time in the same manner as in Procedure (1-3). Thus, sample (1-7) was obtained.

Procedure (1-7)

| | |
|---|---:|
| Anhydrous potassium carbonate | 9,000 g |
| Anhydrous sodium sulfite | 1,400 g |
| Penta sodium diethylenetriaminepentaacetate | 580 g |
| Sodium p-toluenesulfonate | 2,000 g |
| Polyethylene glycol #6000 (produced by Nihon Yushi Co. Ltd.) | 1,200 g |
| D-mannitol | 920 g |

The above compounds were pulverized, granulated and dried in the same manner as in Procedure (1-4) to obtain sample (1-8).

Procedure (1-8)

The compounds in Procedure (1-7) were pulverized, granulated, dried and dressed in the same manner as in Procedure (1-5) to obtain sample (1-9).

Procedure (1-9)

The compounds in Procedure (1-7) were pulverized, granulated, dried and dressed during and after drying in the same manner as in Procedure (1-6) to obtain sample (1-10).

Procedure (1-10)

Procedure (1-9) was carried out to obtain sample (1-11), except that potassium carbonate 1.5 hydrate was used instead of anhydrous potassium carbonate.

Procedure (1-9) was carried out to obtain sample (1-12), except that potassium carbonate monohydrate was used instead of anhydrous potassium carbonate.

Experiment (1-1)

One kilogram of each of samples (1-1) through (1-12) was sieved with a 149 μm sieve (according to JIS Standard), and one hundred gram of each of the resulting samples plus sieve were packaged in aluminum packages and tightly sealed. The Procedure was repeated twice.

The sealed packages were stored for 2 weeks in a thermostatted chamber in which the temperature varied as shown in FIG. 1, and thereafter, subjected to a vibration test under the following condition using a vibration tester BF-UA produced by IDEX Co., Ltd. The resulting samples were sieved with a 105 μm sieve, and evaluated for fine powder occurrence. The samples less than 105 were evaluated as fine powder. The results are shown in Table 1.

(Vibration Test Condition)

The vibration was carried out for 30 minutes under condition of 5–67 Hz/210 sec.

The evaluation criteria are as follows:

◎: No fine powder

○: Slight fine powder passes the sieve, but no powder occurrence

X: marked powder occurrence and loosen powder on unpacking, and problematic

Experiment (1-2)

Two kilograms of each of samples (1-1) through (1-12) was continuously compression tableted in an amount of 5 g per tablet in a rotary tableting machine produced by Kikusui Seisakusho Co., Ltd. to obtain 500 tablets. Twenty tablets of these are weighed and the weight variation was evaluated. The results are shown in Table 1.

The evaluation criteria are as follows:

◎◎: All tablets fall within ±3% of the predetermined weight.

◎: Ten tablets fall within ±3% of the predetermined weight and the other ten within ±5% of the predetermined weight.

○: Zero to 10 tablets fall within ±3% of the predetermined weight and the others within ±5% of the predetermined weight.

Δ: All tablets fall within ±5% of the predetermined weight.

X: No tablets fall within ±5% of the predetermined weight.

X shows much variation of pH in developing which is problematic.

Experiment (1-3)

Two 100 g of each sample were placed in an open Petri dish, and stored for 1 hour at 25° C. and 50% RH and further, for 1 hour at 30° C. and 40% RH. Thereafter, the resulting sample was evaluated for blocking property according to the following criteria. The results are shown in Table 1.

◎◎: The two samples show no blocking.

◎: One partly shows slight blocking, but recovers on slight vibration.

○: The two partly show slight blocking, but recover on slight vibration.

X: The two show blocking about a half, and do not recover on slight vibration.

X is problematic in qualitative supply.

TABLE 1

| Sample No. | Dressing during drying | Dressing after drying | Alkali agent | Fine powder occurence in vibration after storage | Fluctuation of supplying amount | Blocking due to hygroscopicity |
|---|---|---|---|---|---|---|
| 1-1 (Comp.) | No | Yes | Anhydrous $K_2CO_3$ | X | X | ○ |
| 1-2 (Comp.) | No | No | Anhydrous $K_2CO_3$ | ○ | X | Δ |
| 1-3 (Inv.) | Yes | No | Anhydrous $K_2CO_3$ | ○ | ○ | ○ |
| 1-4 (Inv.) | Yes | Yes | Anhydrous $K_2CO_3$ | ○ | ◎ | ◎ |
| 1-5 (Comp.) | No | No | Anhydrous $K_2CO_3$ | ○ | X | Δ |
| 1-6 (Inv.) | Yes | No | Anhydrous $K_2CO_3$ | ○ | ○ | ◎ |
| 1-7 (Inv.) | Yes | Yes | Anhydrous $K_2CO_3$ | ○ | ◎◎ | ◎◎ |
| 1-8 (Comp.) | No | No | Anhydrous $K_2CO_3$ | ○ | X | Δ |

TABLE 1-continued

| Sample No. | Dressing during drying | Dressing after drying | Alkali agent | Fine powder occurence in vibration after storage | Fluctuation of supplying amount | Blocking due to hygroscopicity |
|---|---|---|---|---|---|---|
| 1-9 (Inv.) | Yes | No | Anhydrous $K_2CO_3$ | ○ | ○ | ◉ |
| 1-10 (Inv.) | Yes | Yes | Anhydrous $K_2CO_3$ | ○ | ◉◉ | ◉◉ |
| 1-11 (Inv.) | Yes | Yes | Anhydrous $K_2CO_3 \cdot \tfrac{3}{2}H_2$ | ○ | ◉◉ | ◉◉ |
| 1-12 (Inv.) | Yes | Yes | Anhydrous $K_2CO_3 \cdot H_2O$ | ○ | ◉◉ | ◉◉ |

Comp.: Comparative
Inv.: Invention

As is apparent from Table 1, it is possible to give a granular processing agent for a silver halide color photographic light-sensitive material by dressing granules after granulating under stirring, which reduces fine powder occurrence in vibration and prevents fluctuation of supplying amount. The dressing during and after drying shows the above effects more markedly. Further, the addition of additives (compounds other than potassium carbonate) greatly improves blocking property due to hygroscopicity.

Example 2

Procedure (2-1)

The compounds in Procedure (1-7) of Example 1 were pulverized, granulated and dried in the same manner as in Procedure (1-7) to obtain granules. The dried granules were dressed according to methods shown in Table 2. Thus, samples (2-1) through (2-10) were obtained.

Procedure (2-2)

The compounds in Procedure (1-4) of Example 1 were pulverized, granulated and dried in the same manner as in Procedure (1-4) to obtain granules. The dried granules were dressed according to methods shown in Table 2. Thus, samples (2-11) through (2-18) were obtained.

Experiment (2-1)

The above samples were evaluated for the fluctuation and blocking property in the same manner as in Experiments (1-2) and (1-3). The results are shown in Table 2. The evaluation criteria are the same as Example 1.

Experiment (2-2)

Three of 60 g of each of samples (2-1) through (2-18) were placed in polyethylene packages and tightly sealed, and stored for 10 days at 50° C. The resulting samples were dissolved in water to make 1 liter and pH of the solutions was measured. The variation of the pH was measured as compared with theoretical pH before storage.

The results are shown in table 2.

The evaluation criteria are as follows:

◉: Three packages fall within ±0.03.
○: Three packages fall within ±0.05.
Δ: Three packages fall within ±0.10.
X: Three packages fall within ±0.30.

The samples of X have adverse affect on processing properties in continuously processing.

TABLE 2

| Sample No. | Dressing during drying (Screen, mm) | Dressing after drying (Screen, mm) | Fluctuation of supplying amount | Blocking due to hygroscopicity | pH fluctuation due to storage |
|---|---|---|---|---|---|
| 2-1 (Comparative) | No | No | X | Δ | X |
| 2-2 (Invention) | No | Yes (1.0) | ◉ | ○ | ○ |
| 2-3 (Invention) | Yes (4.0) | Yes (1.0) | ○ | ◉◉ | ○ |
| 2-4 (Invention) | Yes (3.0) | Yes (1.0) | ◉ | ◉◉ | ○ |
| 2-5 (Invention) | Yes (2.5) | Yes (1.0) | ◉ | ◉◉ | ○ |
| 2-6 (Invention) | Yes (2.0) | Yes (1.0) | ◉◉ | ◉◉ | ◉ |
| 2-7 (Invention) | Yes (1.5) | Yes (1.0) | ◉◉ | ◉◉ | ◉ |
| 2-8 (Invention) | Yes (1.0) | Yes (1.0) | ◉◉ | ◉◉ | ◉ |
| 2-9 (Invention) | Yes (0.5) | Yes (1.0) | ◉◉ | ◉◉ | ◉ |
| 2-10 (Invention) | Yes (0.3) | Yes (1.0) | ◉◉ | ◉ | ○ |
| 2-11 (Invention) | Yes (4.0) | Yes (1.0) | ○ | ◉◉ | ○ |
| 2-12 (Invention) | Yes (3.0) | Yes (1.0) | ◉ | ◉◉ | ○ |
| 2-13 (Invention) | Yes (2.5) | Yes (1.0) | ◉ | ◉◉ | ○ |
| 2-14 (Invention) | Yes (2.0) | Yes (1.0) | ◉◉ | ◉◉ | ◉ |
| 2-15 (Invention) | Yes (1.5) | Yes (1.0) | ◉◉ | ◉◉ | ◉ |
| 2-16 (Invention) | Yes (1.0) | Yes (1.0) | ◉◉ | ◉◉ | ◉ |
| 2-17 (Invention) | Yes (0.5) | Yes (1.0) | ◉◉ | ◉◉ | ◉ |
| 2-18 (Invention) | Yes (0.3) | Yes (1.0) | ◉◉ | ◉ | ○ |

As is apparent from Table 2, it is possible to give a granular processing agent for a silver halide color photographic light-sensitive material by dressing granules using 0.5 to 3.0 mm screens, which reduces fine powder occurrence in vibration and prevents fluctuation of supplying amount. Further, use of the 0.5 to 2.0 mm screens greatly improves pH fluctuation after storage.

Example 3

Procedure (3-1)

| | |
|---|---|
| Anhydrous potassium carbonate | 9,000 g |
| Anhydrous sodium sulfite | 1,400 g |
| Penta sodium diethylenetriaminepentaacetate | 580 g |
| Sodium p-toluenesulfonate | 2,000 g |
| Bis(disodiumsulfoethyl) hydroxylamine | 500 g |
| Polyethylene glycol #6000 (produced by Nihon Yushi Co. Ltd.) | 1,200 g |
| D-mannitol | 800 g |

The above compounds were pulverized in the same manner as in Procedure (1-2). The resulting powder was mixed in a stirring granulator for 4 minutes and granulated for 3 minutes by adding water at a rate of 750 ml/min. in an amount shown in Table 3 (based on the total weight of the above compounds). The resulting granules were dried in a fluid bed drier in the same manner as in Procedure (1-2). The dressing was carried during and after drying using a 1.0 mm screen. Thus, samples (3-1) through (3-7) were obtained.

Procedure (3-2)

| | |
|---|---|
| Anhydrous potassium carbonate | 7,300 g |
| Anhydrous sodium sulfite | 80 g |
| Lithium hydroxide monohydrate | 800 g |
| Penta sodium diethylenetriaminepentaacetate | 720 g |
| Sodium p-toluenesulfonate | 3,000 g |
| Bis(disodiumsulfoethyl) hydroxylamine | 1,300 g |
| Polyethylene glycol #6000 (produced by Nihon Yushi Co. Ltd.) | 2,000 g |
| D-mannitol | 1,300 g |

The above compounds were granulated in the same manner as in Procedure (3-1), except that water was added in an amount shown in Table 3. Thus, samples (3-8) through (3-14) were obtained.

Experiment (3-1)

The above samples were evaluated for blocking property in the same manner as in Experiments (2-1). The results are shown in Table 3. The evaluation criteria are the same as Example 1.

Experiment (3-2)

The above samples were evaluated for pH fluctuation after storage in the same manner as in Experiments (2-2). The results are shown in Table 3. The evaluation criteria are the same as Example 1.

TABLE 3

| Sample No. | Added amount of water (wt %) | Blocking due to hygroscopicity | pH fluctuation after storage |
|---|---|---|---|
| 3-1 (Invention) | 2.5 | ⊙⊙ | ⊙ |
| 3-2 (Invention) | 3.0 | ⊙⊙ | ⊙ |
| 3-3 (Invention) | 4.0 | ⊙⊙ | ⊙ |
| 3-4 (Invention) | 6.0 | ⊙⊙ | ⊙ |

TABLE 3-continued

| Sample No. | Added amount of water (wt %) | Blocking due to hygroscopicity | pH fluctuation after storage |
|---|---|---|---|
| 3-5 (Invention) | 8.0 | ⊙⊙ | ○ |
| 3-6 (Invention) | 10.0 | ⊙ | ○ |
| 3-7 (Invention) | 12.0 | ○ | ○ |
| 3-8 (Invention) | 2.5 | ⊙⊙ | ⊙ |
| 3-9 (Invention) | 3.0 | ⊙⊙ | ⊙ |
| 3-10 (Invention) | 4.0 | ⊙⊙ | ⊙ |
| 3-11 (Invention) | 6.0 | ⊙⊙ | ⊙ |
| 3-12 (Invention) | 8.0 | ⊙⊙ | ○ |
| 3-13 (Invention) | 10.0 | ⊙ | ○ |
| 3-14 (Invention) | 12.0 | ○ | ○ |

As is apparent from Table 3, it is possible to give a granular processing agent for a silver halide color photographic light-sensitive material by adding water or an aqueous solution not to exceed 10 wt %, which prevents blocking due to hygroscopicity and gives an excellent processability. Further, the addition of not more than 8 wt % shows the above effects markedly, and not more than 6 wt % greatly improves processability.

Example 4

Procedure (4-1)

Samples prepared in Examples 1, 2 and 3 (shown in Tables 4 and 5) were mixed with 0.5 wt % of sodium myristoyl-N-methyl-$\beta$-alanine (pulverized to 100 μm or less) for 3 minutes in a cross-rotary mixer produced by Meiwa Kogyo Co., Ltd. and tableted at a compression pressure shown in Tables 4 and 5 to obtain 1,000 tablets, using a tableting machine, Clean Press Collect 18K produced by Kikusui Seisakusho Co., Ltd. which was modified. Thus, samples (4-1) through (4-44) were obtained. The tablets weighed about 11 g and were in a cylindrical form having a diameter of 30 mm.

Experiment (4-1)

Ten tablets of each of samples (4-1) through (4-44) were placed in a line in high density polyethylene packages as shown in FIG. 2, and tightly sealed in an aluminium package. The resulting package was stored and subjected to vibration test in the same manner as in Experiment (1-1). Thereafter, 105 μm or less powder produced was evaluated as fine powder. The results are shown in tables 4 and 5. The evaluation criteria were the same as Experiment (1-1).

Experiment (4-2)

Twenty tablets of each sample were weighed and the weight fluctuation was evaluated. The results are shown in tables 4 and 5. The evaluation criteria were the same as Experiment (1-2).

Experiment (4-2)

Two tablets of each sample were placed one by one in an open Petri dish, and stored for 1 hour at 25° C. and 50% RH and further, for 1 hour at 30° C. and 40% RH. Thereafter, the resulting sample was evaluated for expansion due to moisture absorption. The results are shown in tables 4 and 5. The evaluation criteria are as follows:

⊙⊙: The two samples expand 0.1 mm or less in the compression direction on tableting.

⊙: The one samples expand 0.1 mm or less and the other 0.3 mm or less in the compression direction.

○: The two samples expand 0.3 mm or less in the compression direction.

X: The two samples expand 0.5 mm or more in the compression direction.

Experiment (4-4)

Ten tablets of each of the samples were evaluated for compression breakage strength using Speed Checker produced by Okada Seiko Co., Ltd. The measurement was carried out at 25° C. and 40% RH within one hour after tableting.

The average value is shown in Tables 4 and 5.

Next, tablet supplying means shown in FIG. 2 will be detailed below.

The accommodating container 33 includes: a container main body 331 for accommodating a plural of processing tablets, the configuration of which is like a hollow square hole; outlet member 332 having an opening for discharging the tablets connecting accommodating container main body 33, a cap member 333 for closing the other opening of the container main body 331; and a sliding cover member 334 capable of being slid on a rail of the opening 332.

Three sets of partition walls 331S are integrally fixed inside the container 331, so that the inside of the container 331 is divided into four chambers 331A, 331B, 331C, 331D. In each chamber, the approximately cylindrical tablets of solid processing agent J are longitudinally accommodated under the condition that each outer circumference externally contacts each other. Specifically, 10 tablets of solid processing agent J1A to J10A are accommodated in the first chamber 331A, and 10 tablets of solid processing agent J1B are accommodated in the second chamber 331B. In the same manner, the tablets J1C and J1D are respectively accommodated in the chambers.

A projection 331E is projected from the bottom surface of each chamber of the container main body 331. This projection 331E comes into a point of the outer circumferential surface of the tablet of solid processing agent J, so that the tablet can be easily moved, and powder separated from the tablet of solid processing agent J drops from the top of the projection 331E. Separated powder accumulates in a groove formed under the projection 331E. Accordingly, even when the powder is deposited in the groove, no problems are caused because the tablet of solid processing agent J moves on the projection 331E.

A rail is provided on the both side of the outlet of the opening 332 and slide cover member 334 having a groove can slide on the rail by the groove. Protrusions on the both edges under slide cover member 334 connect means described later capable of opening and closing the opening 332 by moving slide cover member 334.

On the both sides of the opening 332 protrudes pin 332B engaged with cam of loading means for a container described below.

The rear surface 333A of cap means 333 is pressed by press means of the loading means and container 33 is press-contacts the normal position of supplying means. Further, rear surface 333A is integrated with discriminating protrusion 333B and prevents erroneously loading on the wrong container.

TABLE 4

| Sample No. | Granule sample No. for tableting | Compression pressure (kg/cm²) | Fine powder occurrence due to vibration after storage | Fluctuation of supplying amount | Expansion due to moisture absorption | Hardness |
|---|---|---|---|---|---|---|
| 4-1 (Comparative) | 1-1 | 1400 | ○ | X | ○ | 52.1 |
| 4-2 (Comparative) | 1-2 | 1400 | ○ | X | X | 45.3 |
| 4-3 (Invention) | 1-7 | 1400 | ◎ | ◎◎ | ◎◎ | 102.0 |
| 4-4 (Invention) | 1-10 | 1400 | ◎ | ◎◎ | ◎◎ | 98.2 |
| 4-5 (Invention) | 1-11 | 1400 | ◎ | ◎◎ | ◎◎ | 101.3 |
| 4-6 (Invention) | 1-12 | 1400 | ◎ | ◎◎ | ◎◎ | 105.2 |
| 4-7 (Invention) | 2-2 | 1400 | ◎ | ◎ | ◎ | 90.2 |
| 4-8 (Invention) | 2-3 | 1400 | ◎ | ○ | ◎ | 103.1 |
| 4-9 (Invention) | 2-4 | 1400 | ◎ | ◎ | ◎◎ | 106.2 |
| 4-10 (Invention) | 2-5 | 1400 | ◎ | ◎ | ◎◎ | 100.3 |
| 4-11 (Invention) | 2-6 | 1400 | ◎ | ◎◎ | ◎◎ | 99.6 |
| 4-12 (Invention) | 2-7 | 1400 | ◎ | ◎◎ | ◎◎ | 102.5 |
| 4-13 (Invention) | 2-8 | 1400 | ◎ | ◎◎ | ◎◎ | 101.6 |
| 4-14 (Invention) | 2-9 | 1400 | ◎ | ◎◎ | ◎◎ | 100.1 |
| 4-15 (Invention) | 2-10 | 1400 | ◎ | ◎◎ | ◎ | 98.9 |
| 4-16 (Invention) | 2-11 | 1400 | ◎ | ○ | ◎ | 102.6 |
| 4-17 (Invention) | 2-12 | 1400 | ◎ | ◎ | ◎◎ | 103.9 |
| 4-18 (Invention) | 2-13 | 1400 | ◎ | ◎ | ◎◎ | 102.4 |
| 4-19 (Invention) | 2-14 | 1400 | ◎ | ◎◎ | ◎◎ | 104.5 |
| 4-20 (Invention) | 2-15 | 1400 | ◎ | ◎◎ | ◎◎ | 97.8 |
| 4-21 (Invention) | 2-16 | 1400 | ◎ | ◎◎ | ◎◎ | 102.7 |
| 4-22 (Invention) | 2-17 | 1400 | ◎ | ◎◎ | ◎◎ | 100.5 |
| 4-23 (Invention) | 2-18 | 1400 | ◎ | ◎◎ | ◎ | 101.8 |

TABLE 5

| Sample No. | Granule sample No. for tableting | Compression pressure (kg/cm²) | Fine powder occurrence due to vibration after storage | Fluctuation of supplying amount | Expansion due to moisture absorption | Hardness |
|---|---|---|---|---|---|---|
| 4-24 (Invention) | 3-1 | 1400 | ⊚ | ⊚⊚ | ⊚⊚ | 98.3 |
| 4-25 (Invention) | 3-2 | 1400 | ⊚ | ⊚⊚ | ⊚⊚ | 103.1 |
| 4-26 (Invention) | 3-3 | 1400 | ⊚ | ⊚⊚ | ⊚⊚ | 110.2 |
| 4-27 (Invention) | 3-4 | 1400 | ⊚ | ⊚⊚ | ⊚⊚ | 109.4 |
| 4-28 (Invention) | 3-5 | 1400 | ⊚ | ⊚⊚ | ⊚ | 112.7 |
| 4-29 (Invention) | 3-6 | 1400 | ⊚ | ⊚ | ○ | 103.5 |
| 4-30 (Invention) | 3-7 | 1400 | ⊚ | ○ | ○ | 101.7 |
| 4-31 (Invention) | 3-8 | 1400 | ⊚ | ⊚⊚ | ⊚⊚ | 102.4 |
| 4-32 (Invention) | 3-9 | 1400 | ⊚ | ⊚⊚ | ⊚⊚ | 96.8 |
| 4-33 (Invention) | 3-10 | 1400 | ⊚ | ⊚⊚ | ⊚⊚ | 113.1 |
| 4-34 (Invention) | 3-11 | 1400 | ⊚ | ⊚⊚ | ⊚⊚ | 112.6 |
| 4-35 (Invention) | 3-12 | 1400 | ⊚ | ⊚⊚ | ⊚ | 109.8 |
| 4-36 (Invention) | 3-13 | 1400 | ⊚ | ⊚ | ○ | 103.9 |
| 4-37 (Invention) | 3-14 | 1400 | ⊚ | ○ | ○ | 100.8 |
| 4-38 (Invention) | 3-2 | 300 | ○ | ⊚⊚ | ⊚ | 80.3 |
| 4-39 (Invention) | 3-2 | 400 | ⊚ | ⊚⊚ | ⊚⊚ | 99.8 |
| 4-40 (Invention) | 3-2 | 800 | ⊚ | ⊚⊚ | ⊚⊚ | 100.6 |
| 4-41 (Invention) | 3-2 | 1200 | ⊚ | ⊚⊚ | ⊚⊚ | 98.7 |
| 4-42 (Invention) | 3-2 | 1600 | ⊚ | ⊚⊚ | ⊚⊚ | 104.5 |
| 4-43 (Invention) | 3-2 | 2000 | ⊚ | ⊚⊚ | ⊚⊚ | 101.3 |
| 4-44 (Invention) | 3-2 | 2200 | ⊚ | ⊚⊚ | ⊚ | 106.2 |

As is apparent from Tables 4 and 5, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of supplying amount, and 0.5 to 2.0 mm screens show the above effect more markedly. Further, the addition of water of not more than 10 wt % prevents expansion due to moisture absorption, and the addition of not more than 8 wt % shows the above effect markedly. The compression pressure is preferably 400 to 2000 kg/cm² in view of hardness and expansion of tablets. The addition of additives greatly improves blocking property due to hygroscopicity.

Procedure (5-1)

| 4-Amino-3-methyl-N-ethyl-N-(β-methanesulfonamidoethyl)aniline-⅔H₂SO₄.H₂O (hereinafter referred to as CD-3) | 15,000 g |
|---|---|

The above compound was pulverized, granulated, dried and dressed in the same manner as in Procedure (1-1). Water of 1000 ml was sprayed and the temperature of drying air was controlled to be 50° C. or less. Thus, sample (5-1) was obtained.

Procedure (5-2)

| CD-3 | 15,000 g |
|---|---|

The above compound was pulverized and granulated in the same manner as in Procedure (1-2). Granulation was carried out for 7 minutes while 900 ml of water was sprayed at a rate of 750 ml/min. The resulting granules were dried in a fluid bed drier to have a moisture content of 2 wt % or less, while the temperature of drying air was controlled to be 50° C. or less. Thus, sample (5-2) was obtained.

Procedure (5-3)

Procedure (5-2) was carried out, except that 4-Amino-3-methyl-N-ethyl-N-(β-hydroxyethyl)aniline.sulfate (hereinafter referred to as CD-4) was used instead of CD-3. Thus, sample (5-3) was obtained.

Procedure (5-4)

| CD-3 | 15,000 g |
|---|---|

The above compound was pulverized, granulated and dried in the same manner as in Procedure (5-2). Dressing was carried out according to drying methods and screens shown in Tables 6 and 7. Thereafter, the resulting sample was dried to have a moisture content of 2 wt % or less. Thus, samples (5-4) through (5-13) were obtained.

Procedure (5-5)

Procedure (5-4) was carried out, except that CD-4 was used instead of CD-3. Thus, samples (5-14) through (5-23) were obtained.

Procedure (5-6)

| CD-4 | 10,000 g |
|---|---|
| Bis(sodiumsulfoethyl)hydroxylamine | 3,000 g |
| D-mannitol | 1,500 g |

The above compounds was independently pulverized in the same manner as in Procedure (1-2). The resulting powders were mixed for 3 minutes in a stirring granulator, and granulated for about 7 minutes while 900 ml of a 10 wt % bis(sodiumsulfoethyl)hydroxylamine solution water was added at a rate of 750 ml/min. The resulting granules were dried in the same manner as in Procedure (5-2). Dressing was carried out according to drying methods and screens shown in Table 7. Thereafter, the resulting sample was dried to have a moisture content of 2 wt % or less. Thus, samples (5-24) through (5-33) were obtained.

Procedure (5-7)

Procedure (5-6) was carried out, except that CD-3 was used instead of CD-4. Thus, samples (5-34) through (5-43) were obtained.

Experiment (5-1)

The above samples were evaluated for fine powder occurrence and the fluctuation in the same manner as in Example 1. The results are shown in Tables 6 and 7. The evaluation criteria were the same as Example 1.

One hundred grams of each of the samples were placed in an aluminium package and tightly sealed. The package was stored at 55° C. for 20 days, and evaluated for coloration. The results are shown in Tables 6 and 7. The evaluation criteria were as follows:

⊚⊚: No coloration
⊚: Ten % or less of the sample colored pink.
o: Thirty % or less of the sample colored pink.
X: More than fifty % of the sample colored brown.

TABLE 6

| Sample No. | p-Phenylene diamine compound | Dressing during drying (Screen, mm) | Dressing after drying (Screen, mm) | Fine powder occurrence in vibration after storage | Fluctuation of supplying amount | Coloration |
|---|---|---|---|---|---|---|
| 5-1 (Comparative) | CD-3 | No | Yes (1.5) | X | X | O |
| 5-2 (Comparative) | CD-3 | No | No | O | X | X |
| 5-3 (Comparative) | CD-4 | No | No | O | X | X |
| 5-4 (Invention) | CD-3 | Yes (1.5) | No | O | O⊚ | O |
| 5-5 (Invention) | CD-3 | No | Yes (1.5) | O | O | O |
| 5-6 (Invention) | CD-3 | Yes (1.5) | Yes (1.0) | O | ⊚⊚ | ⊚⊚ |
| 5-7 (Invention) | CD-3 | Yes (4.0) | Yes (1.0) | O | O | ⊚⊚ |
| 5-8 (Invention) | CD-3 | Yes (3.0) | Yes (1.0) | O | ⊚ | ⊚⊚ |
| 5-9 (Invention) | CD-3 | Yes (2.5) | Yes (1.0) | O | ⊚ | ⊚⊚ |
| 5-10 (Invention) | CD-3 | Yes (2.0) | Yes (1.0) | O | ⊚⊚ | ⊚⊚ |
| 5-11 (Invention) | CD-3 | Yes (1.0) | Yes (1.0) | O | ⊚⊚ | ⊚⊚ |
| 5-12 (Invention) | CD-3 | Yes (0.5) | Yes (1.0) | O | ⊚⊚ | ⊚⊚ |
| 5-13 (Invention) | CD-3 | Yes (0.3) | Yes (1.0) | O | ⊚⊚ | O |
| 5-14 (Invention) | CD-4 | Yes (1.5) | No | O | O | ⊚ |
| 5-15 (Invention) | CD-4 | No | Yes (1.5) | O | O | O |
| 5-16 (Invention) | CD-4 | Yes (1.5) | Yes (1.0) | O | ⊚⊚ | ⊚⊚ |
| 5-17 (Invention) | CD-4 | Yes (4.0) | Yes (1.0) | O | O | ⊚⊚ |
| 5-18 (Invention) | CD-4 | Yes (3.0) | Yes (1.0) | O | ⊚ | ⊚⊚ |
| 5-19 (Invention) | CD-4 | Yes (2.5) | Yes (1.0) | O | ⊚ | ⊚⊚ |
| 5-20 (Invention) | CD-4 | Yes (2.0) | Yes (1.0) | O | ⊚⊚ | ⊚⊚ |
| 5-21 (Invention) | CD-4 | Yes (1.0) | Yes (1.0) | O | ⊚⊚ | ⊚⊚ |
| 5-22 (Invention) | CD-4 | Yes (0.5) | Yes (1.0) | O | ⊚⊚ | ⊚ |
| 5-23 (Invention) | CD-4 | Yes (0.3) | Yes (1.0) | O | ⊚⊚ | O |

TABLE 7

| Sample No. | p-Phenylene diamine compound | Dressing during drying (Screen, mm) | Dressing after drying (Screen, mm) | Fine powder occurrence in vibration after storage | Fluctuation of supplying amount | Coloration |
|---|---|---|---|---|---|---|
| 5-24 (Invention) | CD-4 | Yes (1.5) | No | O | O | ⊚⊚ |
| 5-25 (Invention) | CD-4 | No | Yes (1.5) | O | O | ⊚ |
| 5-26 (Invention) | CD-4 | Yes (1.5) | Yes (1.0) | O | ⊚⊚ | ⊚⊚ |
| 5-27 (Invention) | CD-4 | Yes (4.0) | Yes (1.0) | O | O | ⊚⊚ |
| 5-28 (Invention) | CD-4 | Yes (3.0) | Yes (1.0) | O | ⊚ | ⊚⊚ |
| 5-29 (Invention) | CD-4 | Yes (2.5) | Yes (1.0) | O | ⊚ | ⊚⊚ |
| 5-30 (Invention) | CD-4 | Yes (2.0) | Yes (1.0) | O | ⊚⊚ | ⊚⊚ |
| 5-31 (Invention) | CD-4 | Yes (1.0) | Yes (1.0) | O | ⊚⊚ | ⊚⊚ |
| 5-32 (Invention) | CD-4 | Yes (0.5) | Yes (1.0) | O | ⊚⊚ | ⊚⊚ |
| 5-33 (Invention) | CD-4 | Yes (0.3) | Yes (1.0) | O | ⊚⊚ | ⊚ |
| 5-34 (Invention) | CD-3 | Yes (1.5) | No | O | O | ⊚⊚ |
| 5-35 (Invention) | CD-3 | No | Yes (1.5) | O | O | ⊚ |
| 5-36 (Invention) | CD-3 | Yes (1.5) | Yes (1.0) | O | ⊚⊚ | ⊚⊚ |
| 5-37 (Invention) | CD-3 | Yes (4.0) | Yes (1.0) | O | O | ⊚⊚ |
| 5-38 (Invention) | CD-3 | Yes (3.0) | Yes (1.0) | O | ⊚ | ⊚⊚ |
| 5-39 (Invention) | CD-3 | Yes (2.5) | Yes (1.0) | O | ⊚ | ⊚⊚ |
| 5-40 (Invention) | CD-3 | Yes (2.0) | Yes (1.0) | O | ⊚⊚ | ⊚⊚ |
| 5-41 (Invention) | CD-3 | Yes (1.0) | Yes (1.0) | O | ⊚⊚ | ⊚⊚ |

TABLE 7-continued

| Sample No. | p-Phenylene diamine compound | Dressing during drying (Screen, mm) | Dressing after drying (Screen, mm) | Fine powder occurrence in vibration after storage | Fluctuation of supplying amount | Coloration |
|---|---|---|---|---|---|---|
| 5-42 (Invention) | CD-3 | Yes (0.5) | Yes (1.0) | ○ | ◎◎ | ◎◎ |
| 5-43 (Invention) | CD-3 | Yes (0.3) | Yes (1.0) | ○ | ◎◎ | ◎ |

As is apparent from Tables 6 and 7, it is possible to give a granular processing agent by granulating with stirring and then, dressing, which greatly reduces fine powder occurrence due to vibration and fluctuation of supplying amount. The dressing during drying shows the above effects markedly. Further, the addition of additives greatly reduces coloration after storage. Use of 0.5 to 3.0 mm screens shows the effects of the invention markedly, and 0.5 to 2.0 mm screens more markedly.

Example 6

Procedure (6-1)

| Compounds shown in Table 8 | 12,000 g |
|---|---|
| Bis(sodiumsulfoethyl)hydroxylamine | 3,500 g |
| D-mannitol | 2,000 g |

The above compounds was independently pulverized in the same manner as in Procedure (1-2). The resulting powders were mixed for 3 minutes in a stirring granulator, and granulated for about 7 minutes while a 10 wt % bis(sodiumsulfoethyl)hydroxylamine solution was added in an amount (in terms of water) shown in Table 8 at a rate of 750 ml/min. The resulting granules were dried in the same manner as in Procedure (5-2). Dressing was carried out during and after drying using a 1.5 mm screen. Thus, samples (6-1) through (6-14) were obtained.

Experiment (6-1)

The resulting samples were evaluated for coloration and processability after storage in the same manner as in Example 5. The evaluation criteria were the same as Example 5.

Experiment (6-1)

The resulting samples were evaluated for the p-phenylene diamine compound content before and after the manufacture.

The content was evaluated according to the following criteria, the content before the manufacture being represented as 100%.

◎: About 100%
o: Not less than 98%
Δ: Not less than 95%
X: Not more than 90%

TABLE 8

| Sample No. | p-Phenylene-diamine compound | Added amount of water (wt %) | Coloration | Content after the manufacture |
|---|---|---|---|---|
| 6-1 (Invention) | CD-3 | 4 | ◎◎ | ◎ |
| 6-2 (Invention) | CD-3 | 6 | ◎◎ | ◎ |
| 6-3 (Invention) | CD-3 | 7 | ◎◎ | ◎ |
| 6-4 (Invention) | CD-3 | 8 | ◎◎ | ◎ |
| 6-5 (Invention) | CD-3 | 9 | ◎ | ○ |
| 6-6 (Invention) | CD-3 | 10 | ◎ | ○ |
| 6-7 (Invention) | CD-3 | 12 | ○ | ○ |
| 6-8 (Invention) | CD-4 | 4 | ◎◎ | ◎ |
| 6-9 (Invention) | CD-4 | 6 | ◎◎ | ◎ |
| 6-10 (Invention) | CD-4 | 7 | ◎◎ | ◎ |
| 6-11 (Invention) | CD-4 | 8 | ◎◎ | ◎ |
| 6-12 (Invention) | CD-4 | 9 | ◎ | ○ |
| 6-13 (Invention) | CD-4 | 10 | ◎ | ○ |
| 6-14 (Invention) | CD-4 | 12 | ○ | ○ |

As is apparent from Table 8, it is possible to give a granular processing agent for a silver halide photographic color light-sensitive material by controlling the addition of water to be not more than 10 wt %, which prevents the coloration after storage and improves processability. The addition of not more than 8 wt % shows the above effects markedly.

Example 7

Procedure (7-1)

Samples prepared in Examples 5 and 6 (shown in Tables 9, 10 and 11) were mixed with 1.0 wt % of sodium myristoyl-N-methyl-β-alanine (pulverized to 100 μm or less) for 3 minutes in a cross-rotary mixer produced by Meiwa Kogyo Co., Ltd. and tableted at a compression pressure shown in Tables 9, 10 and 11, using a tableting machine, Clean Press Collect 18K produced by Kikusui Seisakusho Co., Ltd. which was modified. The tablets weighed about 9 g and were in a cylindrical form having a diameter of 30 mm. Thus, samples (7-1) through (7-57) were obtained.

Experiment (7-1)

The samples were evaluated for fine powder occurrence, fluctuation and hardness in the same manner as in Example 4. The evaluation criteria were the same as Example 4.

Experiment (7-2)

The samples were evaluated for slidability. Two tablets of each of samples (4-1) through (4-44) were placed in a petri dish and stored under conditions of Experiment (1-3). Thereafter, the resulting sample was placed and fixed on a high-density polyethylene plate, and then angle, θ at which the sample moves on the plate was measured using Static Friction Tester Heidon-10 (produced by HEIDON Co., Ltd.). The evaluation criteria were as follows:

⊚: Two tablets slide at not more than 15°.
○: One tablet slides at not more than 15°, and the other at 15° to 30°.
Δ: Two tablets slide at 15° to 30°.
X: Neither tablets slide at not more than 30°.

TABLE 9

| Sample No. | Granule sample No. used | Compression pressure (kg/cm²) | Fine powder occurrence due to vibration after storage | Fluctuation of supplying amount | Slidability | Hardness |
|---|---|---|---|---|---|---|
| 7-1 (Comparative) | 5-1 | 1400 | ○ | X | ○ | 30.4 |
| 7-2 (Comparative) | 5-2 | 1400 | ○ | X | X | 25.3 |
| 7-3 (Comparative) | 5-3 | 1400 | ○ | X | X | 27.2 |
| 7-4 (Invention) | 5-4 | 1400 | ⊚ | ○ | ○ | 42.8 |
| 7-5 (Invention) | 5-5 | 1400 | ⊚ | ○ | ○ | 39.6 |
| 7-6 (Invention) | 5-6 | 1400 | ⊚ | ⊚⊚ | ⊚ | 40.1 |
| 7-7 (Invention) | 5-14 | 1400 | ⊚ | ○ | ○ | 41.5 |
| 7-8 (Invention) | 5-15 | 1400 | ⊚ | ○ | ○ | 42.7 |
| 7-9 (Invention) | 5-16 | 1400 | ⊚ | ⊚⊚ | ⊚ | 39.8 |
| 7-10 (Invention) | 5-24 | 1400 | ⊚ | ○ | ○ | 59.8 |
| 7-11 (Invention) | 5-25 | 1400 | ⊚ | ○ | ○ | 62.1 |
| 7-12 (Invention) | 5-26 | 1400 | ⊚ | ⊚⊚ | ⊚⊚ | 60.7 |
| 7-13 (Invention) | 5-27 | 1400 | ⊚ | ○ | ⊚ | 61.9 |
| 7-14 (Invention) | 5-28 | 1400 | ⊚ | ⊚ | ⊚ | 58.7 |
| 7-15 (Invention) | 5-29 | 1400 | ⊚ | ⊚ | ⊚ | 59.3 |
| 7-16 (Invention) | 5-30 | 1400 | ⊚ | ⊚⊚ | ⊚⊚ | 63.2 |
| 7-17 (Invention) | 5-31 | 1400 | ⊚ | ⊚⊚ | ⊚⊚ | 62.5 |
| 7-18 (Invention) | 5-32 | 1400 | ⊚ | ⊚⊚ | ⊚⊚ | 60.4 |
| 7-19 (Invention) | 5-33 | 1400 | ⊚ | ⊚⊚ | ⊚ | 61.6 |

TABLE 10

| Sample No. | Granule sample No. used | Compression pressure (kg/cm²) | Fine powder occurrence due to vibration after storage | Fluctuation of supplying amount | Slidability | Hardness |
|---|---|---|---|---|---|---|
| 7-20 (Invention) | 5-34 | 1400 | ⊚ | ○ | ○ | 60.0 |
| 7-21 (Invention) | 5-35 | 1400 | ⊚ | ○ | ○ | 59.9 |
| 7-22 (Invention) | 5-36 | 1400 | ⊚ | ⊚⊚ | ⊚⊚ | 62.4 |
| 7-23 (Invention) | 5-37 | 1400 | ⊚ | ○ | ⊚ | 61.1 |
| 7-24 (Invention) | 5-38 | 1400 | ⊚ | ⊚ | ⊚ | 58.7 |
| 7-25 (Invention) | 5-39 | 1400 | ⊚ | ⊚ | ⊚ | 59.9 |
| 7-26 (Invention) | 5-40 | 1400 | ⊚ | ⊚⊚ | ⊚⊚ | 59.4 |
| 7-27 (Invention) | 5-41 | 1400 | ⊚ | ⊚⊚ | ⊚⊚ | 61.8 |
| 7-28 (Invention) | 5-42 | 1400 | ⊚ | ⊚⊚ | ⊚⊚ | 58.7 |
| 7-29 (Invention) | 5-43 | 1400 | ⊚ | ⊚⊚ | ⊚ | 61.6 |
| 7-30 (Invention) | 6-1 | 1400 | ⊚ | ⊚⊚ | ⊚⊚ | 60.3 |
| 7-31 (Invention) | 6-2 | 1400 | ⊚ | ⊚⊚ | ⊚⊚ | 60.8 |
| 7-32 (Invention) | 6-3 | 1400 | ⊚ | ⊚⊚ | ⊚⊚ | 72.4 |
| 7-33 (Invention) | 6-4 | 1400 | ⊚ | ⊚⊚ | ⊚⊚ | 70.8 |
| 7-34 (Invention) | 6-5 | 1400 | ⊚ | ⊚ | ⊚⊚ | 71.5 |
| 7-35 (Invention) | 6-6 | 1400 | ⊚ | ⊚ | ⊚ | 59.8 |
| 7-36 (Invention) | 6-7 | 1400 | ⊚ | ○ | ○ | 63.1 |
| 7-37 (Invention) | 6-8 | 1400 | ⊚ | ⊚⊚ | ⊚⊚ | 62.7 |
| 7-38 (Invention) | 6-9 | 1400 | ⊚ | ⊚⊚ | ⊚⊚ | 59.5 |
| 7-39 (Invention) | 6-10 | 1400 | ⊚ | ⊚⊚ | ⊚⊚ | 71.7 |
| 7-40 (Invention) | 6-11 | 1400 | ⊚ | ⊚⊚ | ⊚⊚ | 72.3 |
| 7-41 (Invention) | 6-12 | 1400 | ⊚ | ⊚ | ⊚⊚ | 69.9 |
| 7-42 (Invention) | 6-13 | 1400 | ⊚ | ⊚ | ⊚ | 58.4 |
| 7-43 (Invention) | 6-14 | 1400 | ⊚ | ○ | ○ | 61.5 |

TABLE 11

| Sample No. | Granule sample No. used | Compression pressure (kg/cm²) | Fine powder occurrence due to vibration after storage | Fluctuation of supplying amount | Slidability | Hardness |
|---|---|---|---|---|---|---|
| 7-44 (Invention) | 5-26 | 300 | ⊚ | ⊚⊚ | ○ | 52.4 |
| 7-45 (Invention) | 5-26 | 400 | ⊚ | ⊚⊚ | ⊚ | 61.4 |
| 7-46 (Invention) | 5-26 | 800 | ⊚ | ⊚⊚ | ⊚⊚ | 60.7 |
| 7-47 (Invention) | 5-26 | 1200 | ⊚ | ⊚⊚ | ⊚⊚ | 63.1 |
| 7-48 (Invention) | 5-26 | 1600 | ⊚ | ⊚⊚ | ⊚⊚ | 62.5 |
| 7-49 (Invention) | 5-26 | 2000 | ⊚ | ⊚⊚ | ⊚⊚ | 59.8 |
| 7-50 (Invention) | 5-26 | 2200 | ⊚ | ⊚⊚ | ⊚ | 57.3 |
| 7-51 (Invention) | 5-36 | 300 | ⊚ | ⊚⊚ | ○ | 53.1 |
| 7-52 (Invention) | 5-36 | 400 | ⊚ | ⊚⊚ | ⊚ | 59.6 |
| 7-53 (Invention) | 5-36 | 800 | ⊚ | ⊚⊚ | ⊚⊚ | 58.3 |
| 7-54 (Invention) | 5-36 | 1200 | ⊚ | ⊚⊚ | ⊚⊚ | 61.5 |
| 7-55 (Invention) | 5-36 | 1600 | ⊚ | ⊚⊚ | ⊚⊚ | 59.4 |
| 7-56 (Invention) | 5-36 | 2000 | ⊚ | ⊚⊚ | ⊚⊚ | 62.1 |
| 7-57 (Invention) | 5-36 | 2200 | ⊚ | ⊚⊚ | ⊚ | 61.7 |

As is apparent from Tables 9, 10 and 11, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of supplying amount, and 0.5 to 2.0 mm screens show the above effects more markedly. Further, the addition of water of not more than 10 wt % prevents expansion due to moisture absorption, and the addition of not more than 8 wt % shows the above effects markedly. The compression pressure is preferably 400 to 2000 kg/cm² in view of tablet strength and slidability after storage.

Example 8

Procedure (8-1)

| | |
|---|---|
| Hydroxylamine sulfate | 15,000 g |

The above compound was pulverized and granulated in the same method as in Procedure (1-1). Water of 1000 ml was sprayed and the temperature of drying air was controlled to be 50° C. or less. The resulting granules were dressed according to methods shown in Table 12 using screens shown in Table 12. The resulting granules were dried to have a moisture content of 2 wt % or less Thus, sample (8-1) was obtained.

Procedure (8-2)

| | |
|---|---|
| Hydroxylamine sulfate | 15,000 g |

The above compound was pulverized and granulated in the same method as in Procedure (1-2). Granulation was carried out for about 5 minutes while 600 ml of water was sprayed at a rate of 750 ml/min. The resulting granules were dried in a fluid bed drier to have a moisture content of 2 wt % or less, while the temperature of drying air was controlled to be 50° to 65° C. The resulting granules were dressed according to methods shown in Table 12 using screens shown in Table 12 and dried to have a moisture content of 2 wt % or less. Thus, samples (8-2) through (8-12) were obtained.

Procedure (8-3)

Procedure (5-2) was carried out, except that bis(sodiumsulfoethyl)hydroxylamine was used instead of hydroxylamine sulfate. Thus, samples (8-13) through (8-23) were obtained.

Procedure (8-4)

| | |
|---|---|
| Hydroxylamine sulfate | 12,000 g |
| Potassium bromide | 1,400 g |
| Disodium 1,2-dihydroxybenzene-3,5-disulfonate monohydrate (hereinafter referred to Tilon) | 700 g |
| Pineflow (produced by Matsutani Kagaku Co., Ltd.) | 900 g |

The above compounds was independently pulverized at 30° C. and 50% RH in the same manner as in Procedure (1-2). The resulting powders were mixed for 3 minutes in a stirring granulator and granulated for about 5 minutes while 500 ml of water was sprayed at a rate of 750 ml/min. The resulting granules were dried in a fluid bed drier, while the temperature of drying air was controlled to be 50° to 65° C. The resulting granules were dressed according to methods shown in Table 13 using screens shown in Table 13 and dried to have a moisture content of 2 wt % or less. Thus, samples (8-24) through (8-33) were obtained.

Procedure (8-5)

| | |
|---|---|
| Bis(sodiumsulfoethyl)hydroxylamine | 4,000 g |
| Sodium p-toluene sulfonate | 9,000 g |
| Tinopar (produced by Ciba-Geigy Co.) | 1,500 g |
| Pineflow | 1,500 g |

The above compounds were pulverized and granulated in the same manner as in Procedure (8-4). The procedure was carried out in the same manner as in Procedure (8-4), except that 1200 ml of water were added. Thus, samples (8-34) through (8-43) were obtained.

Experiment (8-1)

The above samples were evaluated for fine powder occurrence and the fluctuation in the same manner as in Example 1. The results are shown in Tables 12 and 13. The evaluation criteria were the same as Example 1.

Experiment (8-2)

One hundred grams of each of the samples were placed in an aluminium package and tightly sealed. The package was stored at 55° C. for 30 days, and evaluated for the content of hydroxylamine and its derivative after storage.

The content was evaluated according to the following criteria, the content before the manufacture being represented as 100%.

⊙⊙: not less than 95%
⊙: Not less than 90%
o: Not less than 80%
X: Not more than 50%

TABLE 12

| Sample No. | Dressing during drying (Screen, mm) | Dressing after drying (Screen, mm) | Fine powder occurrence in vibration after storage | Fluctuation of supplying amount | Content of hydroxylamines |
|---|---|---|---|---|---|
| 8-1 (Comparative) | No | Yes (1.5) | X | X | X |
| 8-2 (Comparative) | No | No | o | X | X |
| 8-3 (Invention) | Yes (1.5) | No | o | o | ⊙ |
| 8-4 (Invention) | No | Yes (1.0) | o | o | o |
| 8-5 (Invention) | Yes (1.5) | Yes (1.0) | o | ⊙⊙ | ⊙ |
| 8-6 (Invention) | Yes (4.0) | Yes (1.0) | o | o | ⊙⊙ |
| 8-7 (Invention) | Yes (3.0) | Yes (1.0) | o | ⊙ | ⊙⊙ |
| 8-8 (Invention) | Yes (2.5) | Yes (1.0) | o | ⊙ | ⊙⊙ |
| 8-9 (Invention) | Yes (2.0) | Yes (1.0) | o | ⊙⊙ | ⊙⊙ |
| 8-10 (Invention) | Yes (1.0) | Yes (1.0) | o | ⊙⊙ | ⊙⊙ |
| 8-11 (Invention) | Yes (0.5) | Yes (1.0) | o | ⊙⊙ | ⊙ |
| 8-12 (Invention) | Yes (0.3) | Yes (1.0) | o | ⊙⊙ | o |
| 8-13 (Comparative) | No | No | o | X | X |
| 8-14 (Invention) | Yes (1.5) | No | o | o | ⊙ |
| 8-15 (Invention) | No | Yes (1.0) | o | o | o |
| 8-16 (Invention) | Yes (1.5) | Yes (1.0) | o | ⊙⊙ | ⊙ |
| 8-17 (Invention) | Yes (4.0) | Yes (1.0) | o | o | ⊙⊙ |
| 8-18 (Invention) | Yes (3.0) | Yes (1.0) | o | ⊙ | ⊙⊙ |
| 8-19 (Invention) | Yes (2.5) | Yes (1.0) | o | ⊙ | ⊙⊙ |
| 8-20 (Invention) | Yes (2.0) | Yes (1.0) | o | ⊙⊙ | ⊙⊙ |
| 8-21 (Invention) | Yes (1.0) | Yes (1.0) | o | ⊙⊙ | ⊙⊙ |
| 8-22 (Invention) | Yes (0.5) | Yes (1.0) | o | ⊙⊙ | ⊙ |
| 8-23 (Invention) | Yes (0.3) | Yes (1.0) | o | ⊙⊙ | o |

TABLE 13

| Sample No. | Dressing during drying (Screen, mm) | Dressing after drying (Screen, mm) | Fine powder occurrence in vibration after storage | Fluctuation of supplying amount | Content of hydroxylamines |
|---|---|---|---|---|---|
| 8-24 (Invention) | Yes (1.5) | No | o | o | ⊙⊙ |
| 8-25 (Invention) | No | Yes (1.0) | o | o | ⊙ |
| 8-26 (Invention) | Yes (1.5) | Yes (1.0) | o | ⊙⊙ | ⊙⊙ |
| 8-27 (Invention) | Yes (4.0) | Yes (1.0) | o | o | ⊙⊙ |
| 8-28 (Invention) | Yes (3.0) | Yes (1.0) | o | ⊙ | ⊙⊙ |
| 8-29 (Invention) | Yes (2.5) | Yes (1.0) | o | ⊙ | ⊙⊙ |
| 8-30 (Invention) | Yes (2.0) | Yes (1.0) | o | ⊙⊙ | ⊙⊙ |
| 8-31 (Invention) | Yes (1.0) | Yes (1.0) | o | ⊙⊙ | ⊙⊙ |
| 8-32 (Invention) | Yes (0.5) | Yes (1.0) | o | ⊙⊙ | ⊙⊙ |
| 8-33 (Invention) | Yes (0.3) | Yes (1.0) | o | ⊙⊙ | ⊙ |
| 8-34 (Invention) | Yes (1.5) | No | o | o | ⊙⊙ |
| 8-35 (Invention) | No | Yes (1.0) | o | o | ⊙ |
| 8-36 (Invention) | Yes (1.5) | Yes (1.0) | o | ⊙⊙ | ⊙⊙ |
| 8-37 (Invention) | Yes (4.0) | Yes (1.0) | o | o | ⊙⊙ |
| 8-38 (Invention) | Yes (3.0) | Yes (1.0) | o | ⊙ | ⊙⊙ |
| 8-39 (Invention) | Yes (2.5) | Yes (1.0) | o | ⊙ | ⊙⊙ |
| 8-40 (Invention) | Yes (2.0) | Yes (1.0) | o | ⊙⊙ | ⊙⊙ |
| 8-41 (Invention) | Yes (1.0) | Yes (1.0) | o | ⊙⊙ | ⊙⊙ |
| 8-42 (Invention) | Yes (0.5) | Yes (1.0) | o | ⊙⊙ | ⊙⊙ |
| 8-43 (Invention) | Yes (0.3) | Yes (1.0) | o | ⊙⊙ | ⊙ |

As is apparent from Tables 12 and 13, it is possible to give a granular processing agent by granulating with stirring and then, dressing, which greatly reduces fine powder occurrence due to vibration and fluctuation of supplying amount. The dressing during drying shows the above effects markedly. Further, the addition of additives greatly improves the content of the hydroxylamines after storage. Use of 0.5 to 3.0 mm screens shows the effects of the invention markedly, and 0.5 to 2.0 mm screens more markedly.

Example 9

Procedures (8-4) and (8-5) were carried out, except that water was added in an amount (based on the total content of the compounds) shown in Table 14. The dressing was carried out during and after drying using a 1.5 mm mesh screen. Thus, samples (9-1) through (9-12) were obtained.

Experiment (9-1)

The above samples were evaluated for the content after storage in the same manner as in Experiment (8-1). The results are shown in Table 14. The evaluation criteria were the same as Example 8.

Experiment (9-2)

The above samples were evaluated for the content of hydroxylamine and its derivative after the manufacture.

The content was evaluated according to the following criteria, the content before the manufacture being represented as 100%.

⊚: about 100%
o: Not less than 98%
X: Not more than 90%

TABLE 14

| Sample No. | Procudure No. used | Added amount if water (wt %) | Content of hydroxyl-amines after storage | Content of hydroxylamines after manufacture |
|---|---|---|---|---|
| 9-1 (Invention) | 8-4 | 3 | ⊚⊚ | ⊚ |
| 9-2 (Invention) | 8-4 | 4 | ⊚⊚ | ⊚ |
| 9-3 (Invention) | 8-4 | 6 | ⊚⊚ | ⊚ |

TABLE 14-continued

| Sample No. | Procudure No. used | Added amount if water (wt %) | Content of hydroxyl-amines after storage | Content of hydroxylamines after manufacture |
|---|---|---|---|---|
| 9-4 (Invention) | 8-4 | 8 | ⊚⊚ | o |
| 9-5 (Invention) | 8-4 | 10 | ⊚ | o |
| 9-6 (Invention) | 8-4 | 12 | o | o |
| 9-7 (Invention) | 8-5 | 3 | ⊚⊚ | ⊚ |
| 9-8 (Invention) | 8-5 | 4 | ⊚⊚ | ⊚ |
| 9-9 (Invention) | 8-5 | 6 | ⊚⊚ | ⊚ |
| 9-10 (Invention) | 8-5 | 8 | ⊚⊚ | o |
| 9-11 (Invention) | 8-5 | 10 | ⊚ | o |
| 9-12 (Invention) | 8-5 | 12 | o | o |

As is apparent from Table 14, it is possible to give a granular processing agent by granulating while the addition of water is controlled to be not more than 10 wt %, which has excellent content ratio of hydroxylamines and stable productivity. The addition of not more than 8 wt % shows the above effects markedly, and not more than 6 wt % more markedly.

Example 10

Procedure (10-1)

Samples prepared in Examples 8 and 9 (shown in Tables 15, 16 and 17) were mixed with 0.5 wt % of sodium myristoyl-N-methyl-β-alanine (pulverized to 100 μm or less) for 3 minutes in a cross-rotary mixer, and then, tableted at a compression pressure shown in Tables 15, 16 and 17 in the same manner as in Procedure (7-1). The resulting tablets weighed about 11 g and were in a cylindrical form having a diameter of 30 mm.

Experiment (10-1)

The samples were evaluated for fine powder occurrence, fluctuation, slidability and hardness in the same manner as in Example 7. The results are shown in Tables 15, 16 and 17. The evaluation criteria were the same as Example 7.

TABLE 15

| Sample No. | Tablet sample No. used | Compression pressure (kg/cm$^2$) | Fine powder occurrence due to vibration after storage | Fluctuation of supplying amount | Slidability | Hardness |
|---|---|---|---|---|---|---|
| 10-1 (Comparative) | 8-1 | 1400 | o | X | o | 39.8 |
| 10-2 (Comparative) | 8-2 | 1400 | o | X | X | 31.6 |
| 10-3 (Invention) | 8-3 | 1400 | ⊚ | o | o | 49.9 |
| 10-4 (Invention) | 8-4 | 1400 | ⊚ | o | o | 51.4 |
| 10-5 (Invention) | 8-5 | 1400 | ⊚ | ⊚⊚ | ⊚ | 51.5 |
| 10-6 (Invention) | 8-9 | 1400 | ⊚ | ⊚⊚ | ⊚ | 50.2 |
| 10-7 (Invention) | 8-10 | 1400 | ⊚ | ⊚⊚ | ⊚ | 49.7 |
| 10-8 (Invention) | 8-11 | 1400 | ⊚ | ⊚⊚ | ⊚ | 50.6 |
| 10-9 (Comparative) | 8-13 | 1400 | o | X | X | 29.8 |
| 10-10 (Invention) | 8-14 | 1400 | ⊚ | o | o | 49.6 |
| 10-11 (Invention) | 8-15 | 1400 | ⊚ | o | o | 48.7 |
| 10-12 (Invention) | 8-20 | 1400 | ⊚ | ⊚⊚ | ⊚ | 52.1 |
| 10-13 (Invention) | 8-21 | 1400 | ⊚ | ⊚⊚ | ⊚ | 50.3 |
| 10-14 (Invention) | 8-22 | 1400 | ⊚ | ⊚⊚ | ⊚ | 49.8 |
| 10-15 (Invention) | 8-24 | 1400 | ⊚ | o | o | 65.0 |
| 10-16 (Invention) | 8-25 | 1400 | ⊚ | o | o | 66.2 |
| 10-17 (Invention) | 8-26 | 1400 | ⊚ | ⊚⊚ | ⊚⊚ | 64.8 |
| 10-18 (Invention) | 8-27 | 1400 | ⊚ | o | ⊚ | 63.9 |

TABLE 15-continued

| Sample No. | Tablet sample No. used | Compression pressure (kg/cm²) | Fine powder occurrence due to vibration after storage | Fluctuation of supplying amount | Slidability | Hardness |
|---|---|---|---|---|---|---|
| 10-19 (Invention) | 8-28 | 1400 | ◎ | ◎ | ◎ | 65.4 |
| 10-20 (Invention) | 8-29 | 1400 | ◎ | ◎ | ◎ | 66.7 |

TABLE 16

| Sample No. | Tablet sample No. used | Compression pressure (kg/cm²) | Fine powder occurrence due to vibration after storage | Fluctuation of supplying amount | Slidability | Hardness |
|---|---|---|---|---|---|---|
| 10-21 (Invention) | 8-30 | 1400 | ◎ | ◎◎ | ◎◎ | 65.1 |
| 10-22 (Invention) | 8-31 | 1400 | ◎ | ◎◎ | ◎◎ | 63.6 |
| 10-23 (Invention) | 8-32 | 1400 | ◎ | ◎◎ | ◎◎ | 66.6 |
| 10-24 (Invention) | 8-33 | 1400 | ◎ | ◎◎ | ◎ | 65.2 |
| 10-25 (Invention) | 8-34 | 1400 | ◎ | ○ | ○ | 65.5 |
| 10-26 (Invention) | 8-35 | 1400 | ◎ | ○ | ○ | 64.9 |
| 10-27 (Invention) | 8-36 | 1400 | ◎ | ◎◎ | ◎◎ | 64.4 |
| 10-28 (Invention) | 8-37 | 1400 | ◎ | ○ | ◎ | 65.3 |
| 10-29 (Invention) | 8-38 | 1400 | ◎ | ◎ | ◎ | 64.7 |
| 10-30 (Invention) | 8-39 | 1400 | ◎ | ◎ | ◎ | 64.5 |
| 10-31 (Invention) | 8-40 | 1400 | ◎ | ◎◎ | ◎◎ | 67.2 |
| 10-32 (Invention) | 8-41 | 1400 | ◎ | ◎◎ | ◎◎ | 65.8 |
| 10-33 (Invention) | 8-42 | 1400 | ◎ | ◎◎ | ◎◎ | 63.8 |
| 10-34 (Invention) | 8-43 | 1400 | ◎ | ◎◎ | ◎ | 65.3 |
| 10-35 (Invention) | 9-1 | 1400 | ◎ | ◎◎ | ◎◎ | 64.8 |
| 10-36 (Invention) | 9-2 | 1400 | ◎ | ◎◎ | ◎◎ | 65.4 |
| 10-37 (Invention) | 9-3 | 1400 | ◎ | ◎◎ | ◎◎ | 71.5 |
| 10-38 (Invention) | 9-4 | 1400 | ◎ | ◎◎ | ◎ | 72.3 |
| 10-39 (Invention) | 9-5 | 1400 | ◎ | ◎ | ◎ | 64.3 |
| 10-40 (Invention) | 9-6 | 1400 | ◎ | ○ | ○ | 65.1 |

TABLE 17

| Sample No. | Tablet sample No. used | Compression pressure (kg/cm²) | Fine powder occurrence due to vibration after storage | Fluctuation of supplying amount | Slidability | Hardness |
|---|---|---|---|---|---|---|
| 10-41 (Invention) | 9-7 | 1400 | ◎ | ◎◎ | ◎◎ | 64.4 |
| 10-42 (Invention) | 9-8 | 1400 | ◎ | ◎◎ | ◎◎ | 65.8 |
| 10-43 (Invention) | 9-9 | 1400 | ◎ | ◎◎ | ◎◎ | 71.6 |
| 10-44 (Invention) | 9-10 | 1400 | ◎ | ◎◎ | ◎ | 72.9 |
| 10-45 (Invention) | 9-11 | 1400 | ◎ | ◎ | ◎ | 65.2 |
| 10-46 (Invention) | 9-12 | 1400 | ◎ | ○ | ○ | 65.8 |
| 10-47 (Invention) | 8-26 | 300 | ◎ | ◎◎ | ○ | 59.8 |
| 10-48 (Invention) | 8-26 | 400 | ◎ | ◎◎ | ◎ | 66.6 |
| 10-49 (Invention) | 8-26 | 800 | ◎ | ◎◎ | ◎◎ | 64.4 |
| 10-50 (Invention) | 8-26 | 1200 | ◎ | ◎◎ | ◎◎ | 65.3 |
| 10-51 (Invention) | 8-26 | 1600 | ◎ | ◎◎ | ◎◎ | 64.5 |
| 10-52 (Invention) | 8-26 | 2000 | ◎ | ◎◎ | ◎◎ | 64.8 |
| 10-53 (Invention) | 8-26 | 2200 | ◎ | ◎◎ | ◎ | 65.6 |
| 10-54 (Invention) | 8-36 | 300 | ◎ | ◎◎ | ○ | 58.1 |
| 10-55 (Invention) | 8-36 | 400 | ◎ | ◎◎ | ◎ | 65.7 |
| 10-56 (Invention) | 8-36 | 800 | ◎ | ◎◎ | ◎◎ | 65.2 |
| 10-57 (Invention) | 8-36 | 1200 | ◎ | ◎◎ | ◎◎ | 65.8 |
| 10-58 (Invention) | 8-36 | 1600 | ◎ | ◎◎ | ◎◎ | 64.7 |
| 10-59 (Invention) | 8-36 | 2000 | ◎ | ◎◎ | ◎◎ | 63.9 |
| 10-60 (Invention) | 8-36 | 2200 | ◎ | ◎◎ | ◎ | 66.4 |

As is apparent from Tables 9, 10 and 11, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of supplying amount, and 0.5 to 2.0 mm screens show the above effects more markedly. Further, the addition of water of not more than 10 wt % reduces slidabilituy after storage, and the addition of not more than 8 wt % shows the above effect markedly. The compression pressure is preferably 400 to 2000 kg/cm² in view of tablet strength and slidability after storage.

Example 11

Procedure (11-1)

| | |
|---|---|
| Sodium ferric ethylenediamine-tetraacetate.trihydrate | 14,000 g |
| Pineflow | 1,000 g |

The above compounds were independently pulverized, granulated and dressed in the same manner as in Procedure (1-1). Water of 1000 ml was sprayed and the temperature of drying air was controlled to be 50° C. or less. The resulting granules were dressed according to methods shown in Table 18 using screens shown in Table 18. The resulting granules were dried to have a moisture content of 2 wt % or less. Thus, sample (11-1) was obtained.

Procedure (11-2)

| | |
|---|---|
| Sodium ferric ethylenediamine-tetraacetate-trihydrate (hereinafter referred to EDTA-Fe.Na.3H₂O) | 14,000 g |
| Pineflow | 1,000 g |

The above compounds was pulverized, mixed, and granulated in the same manner as in Procedure (8-2). The resulting powders were granulated for about 5 minutes while 450 ml of water was sprayed at a rate of 750 ml/min. The resulting granules were dried in a fluid bed drier, while the temperature of drying air was controlled to be 50° to 65° C., and dressed according to methods shown in Table 18 using screens shown in Table 18. The resulting granules were dried to have a moisture content of 2 wt % or less. Thus, samples (11-2) through (11-12) were obtained.

Procedure (11-3)

Procedure (11-2) was carried out, except that ammonium ferric 1,3-propanediaminetetraacetate.monohydrate (hereinafter referred to as PDTA-Fe.NH₄.H₂O) or ammonium ferric diethylenetriaminepentaacetate.monohydrate (hereinafter referred to as DTPA-Fe.NH₄H.H₂O) was used instead of EDTA-Fe.Na.3H₂O. Thus, samples (11-13) through (11-27) were obtained.

Procedure (11-4)

| | |
|---|---|
| EDTA-Fe.Na.3H₂O | 13,000 g |
| Pineflow | 1,000 g |
| Potassium carbonate monohydrate | 1,000 g |

The above compounds was subjected to Procedure (11-2). Thus, samples (11-28) through (11-31) were obtained.

Experiment (11-1)

The above samples were evaluated for fine powder occurrence and the fluctuation in the same manner as in Example 1. The results are shown in Tables 18 and 19. The evaluation criteria were the same as Example 1.

Experiment (11-2)

One hundred grams of each of the samples were placed in an aluminium package and tightly sealed. The package was stored at 55° C. for 30 days, and evaluated for coloration after storage. The results are shown in Tables 18 and 19. The evaluation criteria were as follows:

⊚⊚: Not color-changed.
⊚: Patches of coloration, but only a few.
o: Partly colored, but not more than 10%.
X: Almost entirely colored.

TABLE 18

| Sample No. | Ferric complex of amino polycarboxylic acid | Dressing during drying (Screen, mm) | Dressing after drying (Screen, mm) | Fine powder occurrence in vibration after storage | Fluctuation of supplying amount | Coloration |
|---|---|---|---|---|---|---|
| 11-1 (Comp.) | EDTA-Fe.Na.3H₂O | No | Yes (1.5) | X | X | o |
| 11-2 (Comp.) | EDTA-Fe.Na.3H₂O | No | No | o | X | X |
| 11-3 (Inv.) | EDTA-Fe.Na.3H₂O | Yes (1.5) | No | o | o | ⊚ |
| 11-4 (Inv.) | EDTA-Fe.Na.3H₂O | No | Yes (1.5) | o | o | o |
| 11-5 (Inv.) | EDTA-Fe.Na.3H₂O | Yes (1.5) | Yes (1.5) | o | ⊚⊚ | ⊚⊚ |
| 11-6 (Inv.) | EDTA-Fe.Na.3H₂O | Yes (4.0) | Yes (1.5) | o | ⊚ | ⊚ |
| 11-7 (Inv.) | EDTA-Fe.Na.3H₂O | Yes (3.0) | Yes (1.5) | o | ⊚ | ⊚⊚ |
| 11-8 (Inv.) | EDTA-Fe.Na.3H₂O | Yes (2.5) | Yes (1.5) | o | ⊚ | ⊚⊚ |
| 11-9 (Inv.) | EDTA-Fe.Na.3H₂O | Yes (2.0) | Yes (1.5) | o | ⊚⊚ | ⊚⊚ |
| 11-10 (Inv.) | EDTA-Fe.Na.3H₂O | Yes (1.0) | Yes (1.5) | o | ⊚⊚ | ⊚⊚ |
| 11-11 (Inv.) | EDTA-Fe.Na.3H₂O | Yes (0.5) | Yes (1.5) | o | ⊚⊚ | ⊚⊚ |
| 11-12 (Inv.) | EDTA-Fe.Na.3H₂O | Yes (0.3) | Yes (1.5) | o | ⊚⊚ | ⊚ |
| 11-13 (Inv.) | PDTA-Fe.NH₄.H₂O | Yes (1.5) | Yes (1.5) | o | ⊚⊚ | ⊚⊚ |
| 11-14 (Inv.) | PDTA-Fe.NH₄.H₂O | Yes (4.0) | Yes (1.5) | o | ⊚ | ⊚ |
| 11-15 (Inv.) | PDTA-Fe.NH₄.H₂O | Yes (3.0) | Yes (1.5) | o | ⊚ | ⊚⊚ |
| 11-16 (Inv.) | PDTA-Fe.NH₄.H₂O | Yes (2.5) | Yes (1.5) | o | ⊚ | ⊚⊚ |
| 11-17 (Inv.) | PDTA-Fe.NH₄.H₂O | Yes (2.0) | Yes (1.5) | o | ⊚⊚ | ⊚⊚ |
| 11-18 (Inv.) | PDTA-Fe.NH₄.H₂O | Yes (1.0) | Yes (1.5) | o | ⊚⊚ | ⊚⊚ |
| 11-19 (Inv.) | PDTA-Fe.NH₄.H₂O | Yes (0.5) | Yes (1.5) | o | ⊚⊚ | ⊚⊚ |
| 11-20 (Inv.) | PDTA-Fe.NH₄.H₂O | Yes (0.3) | Yes (1.5) | o | ⊚⊚ | ⊚ |

Comp.: Comparative
Inv.: Invention

TABLE 19

| Sample No. | Ferric complex of amino polycarboxylic acid | Dressing during drying (Screen, mm) | Dressing after drying (Screen, mm) | Fine powder occurrence in vibration after storage | Fluctuation of supplying amount | Coloration |
|---|---|---|---|---|---|---|
| 11-21 (Inv.) | DTPA-Fe.NH$_4$.H.H$_2$O | Yes (1.5) | Yes (1.5) | o | ⊚⊚ | ⊚⊚ |
| 11-22 (Inv.) | DTPA-Fe.NH$_4$.H.H$_2$O | Yes (4.0) | Yes (1.5) | o | ⊚ | ⊚ |
| 11-23 (Inv.) | DTPA-Fe.NH$_4$.H.H$_2$O | Yes (3.0) | Yes (1.5) | o | ⊚ | ⊚⊚ |
| 11-24 (Inv.) | DTPA-Fe.NH$_4$.H.H$_2$O | Yes (2.0) | Yes (1.5) | o | ⊚⊚ | ⊚⊚ |
| 11-25 (Inv.) | DTPA-Fe.NH$_4$.H.H$_2$O | Yes (1.0) | Yes (1.5) | o | ⊚⊚ | ⊚⊚ |
| 11-26 (Inv.) | DTPA-Fe.NH$_4$.H.H$_2$O | Yes (0.5) | Yes (1.5) | o | ⊚⊚ | ⊚⊚ |
| 11-27 (Inv.) | DTPA-Fe.NH$_4$.H.H$_2$O | Yes (0.3) | Yes (1.5) | o | ⊚⊚ | ⊚ |
| 11-28 (Inv.) | EDTA-Fe.Na.3H$_2$O | Yes (1.5) | Yes (1.5) | o | ⊚⊚ | ⊚⊚ |
| 11-29 (Inv.) | EDTA-Fe.Na.3H$_2$O | Yes (2.0) | Yes (1.5) | o | ⊚⊚ | ⊚⊚ |
| 11-30 (Inv.) | EDTA-Fe.Na.3H$_2$O | Yes (1.0) | Yes (1.5) | o | ⊚⊚ | ⊚⊚ |
| 11-31 (Inv.) | EDTA-Fe.Na.3H$_2$O | Yes (0.5) | Yes (1.5) | o | ⊚⊚ | ⊚⊚ |

Inv.: Invention

As is apparent from Tables 18 and 19, it is possible to give a granular processing agent by granulating with stirring and then, dressing, which greatly reduces fine powder occurrence due to vibration and fluctuation of supplying amount. The dressing during drying can prevent coloration. Use of 0.5 to 3.0 mm screens shows the effects of the invention markedly, and 0.5 to 2.0 mm screens more markedly.

Example 12

Procedure (12-1)

| | |
|---|---|
| PDTA-Fe.NH$_4$.H$_2$O | 6,300 g |
| 1,3-Propanediaminetetraacetic acid | 300 g |
| Potassium bromide | 3,000 g |
| Succinic acid | 2,500 g |
| Disodium maleate monohydrate | 800 g |
| Adipic acid | 1,000 g |
| Sodium carbonate monohydrate | 300 g |
| Sodium p-toluenesulfonate | 150 g |
| D-Mannitol | 600 g |
| D-Sorbitol | 150 g |

The above compounds was independently pulverized, mixed and granulated in the same manner as in Procedure (8-2). Water was added in an amount shown in Tables 20 and 21 (based on the total weight of the compounds). at a rate of 750 ml/min. The resulting granules were dried in the same manner as in Procedure (8-2). Dressing was carried out during and after drying using a 1.5 mm screen. Thus, samples (12-1) through (12-11) and samples (12-27) through (12-32) were obtained.

Procedure (12-2)

Procedure (12-1) was carried out, except that EDTA-Fe.NH$_4$.2H$_2$O or DTPA-Fe.NH$_4$H.H$_2$O was used instead of PDTA-Fe.NH$_4$.H$_2$O. Thus, samples (12-12) through (12-26) were obtained.

Experiment (12-1)

The evaluation was carried out in the same manner as in Example 11. The evaluation criteria was the same as Example 11.

TABLE 20

| Sample No. | Ferric complex of amino polycarboxylic acid | Added amount of water (wt %) | Dressing during drying (Screen, mm) | Dressing after drying (Screen, mm) | Fine powder occurrence in vibration after storage | Fluctuation of supplying amount | Coloration |
|---|---|---|---|---|---|---|---|
| 12-1 (Comp.) | PDTA-Fe.NH$_4$.H$_2$O | 3 | No | No | o | X | X |
| 12-2 (Inv.) | PDTA-Fe.NH$_4$.H$_2$O | 3 | Yes (1.5) | No | o | o | o |
| 12-3 (Inv.) | PDTA-Fe.NH$_4$.H$_2$O | 3 | No | Yes (1.5) | o | o | o |
| 12-4 (Inv.) | PDTA-Fe.NH$_4$.H$_2$O | 3 | Yes (1.5) | Yes (1.5) | o | ⊚⊚ | ⊚⊚ |
| 12-5 (Inv.) | PDTA-Fe.NH$_4$.H$_2$O | 3 | Yes (4.0) | Yes (1.5) | o | ⊚ | ⊚ |
| 12-6 (Inv.) | PDTA-Fe.NH$_4$.H$_2$O | 3 | Yes (3.0) | Yes (1.5) | o | ⊚ | ⊚⊚ |
| 12-7 (Inv.) | PDTA-Fe.NH$_4$.H$_2$O | 3 | Yes (2.5) | Yes (1.5) | o | ⊚ | ⊚⊚ |
| 12-8 (Inv.) | PDTA-Fe.NH$_4$.H$_2$O | 3 | Yes (2.0) | Yes (1.5) | o | ⊚⊚ | ⊚⊚ |
| 12-9 (Inv.) | PDTA-Fe.NH$_4$.H$_2$O | 3 | Yes (1.0) | Yes (1.5) | o | ⊚⊚ | ⊚⊚ |
| 12-10 (Inv.) | PDTA-Fe.NH$_4$.H$_2$O | 3 | Yes (0.5) | Yes (1.5) | o | ⊚⊚ | ⊚⊚ |
| 12-11 (Inv.) | PDTA-Fe.NH$_4$.H$_2$O | 3 | Yes (0.3) | Yes (1.5) | o | ⊚⊚ | ⊚ |
| 12-12 (Inv.) | EDTA-FeNH$_4$2H$_2$O | 3 | Yes (1.5) | Yes (1.5) | o | ⊚⊚ | ⊚⊚ |
| 12-13 (Inv.) | EDTA-FeNH$_4$2H$_2$O | 3 | Yes (4.0) | Yes (1.5) | o | ⊚ | ⊚ |
| 12-14 (Inv.) | EDTA-FeNH$_4$2H$_2$O | 3 | Yes (3.0) | Yes (1.5) | o | ⊚ | ⊚⊚ |
| 12-15 (Inv.) | EDTA-FeNH$_4$2H$_2$O | 3 | Yes (2.5) | Yes (1.5) | o | ⊚ | ⊚⊚ |
| 12-16 (Inv.) | EDTA-FeNH$_4$2H$_2$O | 3 | Yes (2.0) | Yes (1.5) | o | ⊚⊚ | ⊚⊚ |

TABLE 20-continued

| Sample No. | Ferric complex of amino polycarboxylic acid | Added amount of water (wt %) | Dressing during drying (Screen, mm) | Dressing after drying (Screen, mm) | Fine powder occurrence in vibration after storage | Fluctuation of supplying amount | Color-ation |
|---|---|---|---|---|---|---|---|
| 12-17 (Inv.) | EDTA-FeNH₄2H₂O | 3 | Yes (1.0) | Yes (1.5) | ○ | ⊚⊚ | ⊚⊚ |
| 12-18 (Inv.) | EDTA-FeNH₄2H₂O | 3 | Yes (0.5) | Yes (1.5) | ○ | ⊚⊚ | ⊚⊚ |
| 12-19 (Inv.) | EDTA-FeNH₄2H₂O | 3 | Yes (0.3) | Yes (1.5) | ○ | ⊚⊚ | ⊚ |

Comp.: Comparative  Inv.: Invention

TABLE 21

| Sample No. | Ferric complex of amino polycarboxylic acid | Added amount of water (wt %) | Dressing during drying (Screen, mm) | Dressing after drying (Screen, mm) | Fine powder occurrence in vibration after storage | Fluctuation of supplying amount | Color-ation |
|---|---|---|---|---|---|---|---|
| 12-20 (Inv.) | DTPA-Fe.NH₄H.H₂O | 3 | Yes (1.5) | Yes (1.5) | ○ | ⊚⊚ | ⊚⊚ |
| 12-21 (Inv.) | DTPA-Fe.NH₄H.H₂O | 3 | Yes (4.0) | Yes (1.5) | ○ | ⊚ | ⊚ |
| 12-22 (Inv.) | DTPA-Fe.NH₄H.H₂O | 3 | Yes (3.0) | Yes (1.5) | ○ | ⊚ | ⊚⊚ |
| 12-23 (Inv.) | DTPA-Fe.NH₄H.H₂O | 3 | Yes (2.0) | Yes (1.5) | ○ | ⊚⊚ | ⊚⊚ |
| 12-24 (Inv.) | DTPA-Fe.NH₄H.H₂O | 3 | Yes (1.0) | Yes (1.5) | ○ | ⊚⊚ | ⊚⊚ |
| 12-25 (Inv.) | DTPA-Fe.NH₄H.H₂O | 3 | Yes (0.5) | Yes (1.5) | ○ | ⊚⊚ | ⊚⊚ |
| 12-26 (Inv.) | DTPA-Fe.NH₄H.H₂O | 3 | Yes (0.3) | Yes (1.5) | ○ | ⊚⊚ | ⊚ |
| 12-27 (Inv.) | PDTA-Fe.NH₄.H₂O | 3 | Yes (1.5) | Yes (1.5) | ○ | ⊚⊚ | ⊚⊚ |
| 12-28 (Inv.) | PDTA-Fe.NH₄.H₂O | 4 | Yes (1.5) | Yes (1.5) | ○ | ⊚⊚ | ⊚⊚ |
| 12-29 (Inv.) | PDTA-Fe.NH₄.H₂O | 6 | Yes (1.5) | Yes (1.5) | ○ | ⊚⊚ | ⊚⊚ |
| 12-30 (Inv.) | DTPA-Fe.NH₄.H₂O | 8 | Yes (1.5) | Yes (1.5) | ○ | ⊚⊚ | ⊚ |
| 12-31 (Inv.) | DTPA-Fe.NH₄.H₂O | 10 | Yes (1.5) | Yes (1.5) | ○ | ⊚⊚ | ○ |
| 12-32 (Inv.) | PDTA-Fe.NH₄.H₂O | 12 | Yes (1.5) | Yes (1.5) | ○ | ⊚⊚ | ○ |

Inv.: Invention

As is apparent from Tables 20 and 21, it is possible to give a granular processing agent by granulating with stirring and then, dressing, which greatly reduces fine powder occurrence due to vibration and fluctuation of supplying amount. The dressing during drying can prevent coloration. Use of 0.5 to 3.0 mm screens shows the effects of the invention markedly, and 0.5 to 2.0 mm screens more markedly. Further, the addition of water of not more than 8 wt % effectively prevents coloration, and the addition of not more than 6 wt % shows the above effect markedly.

Example 13

Procedure (13-1)

Samples prepared in Examples 11 and 12 (shown in Tables 22, 23 and 24) were mixed with 1.0 wt % of sodium N-lauroylsarcosine (pulverized to 100 μm or less) for 3 minutes in a cross-rotary mixer, and then, tableted at a compression pressure shown in Tables 22, 23 and 24 in the same manner as in Procedure (7-1). The resulting tablets weighed about 11 g and were in a cylindrical form having a diameter of 30 mm. Thus, samples (7-1) through (7-57) were obtained.

Experiment (13-1)

The samples were evaluated in the same manner as in Example 10. The evaluation criteria were the same as Example 10.

TABLE 22

| Sample No. | Sample No. used | Compression pressure (kg/cm²) | Fine powder occurrence due to vibration after storage | Fluctuation of supplying amount | Slida-bility | Hard-ness |
|---|---|---|---|---|---|---|
| 13-1 (Comparative) | 11-1 | 1400 | ○ | X | ○ | 41.3 |
| 13-2 (Comparative) | 11-2 | 1400 | ○ | X | ○ | 29.8 |
| 13-3 (Invention) | 11-3 | 1400 | ○ | ○ | X | 54.8 |
| 13-4 (Invention) | 11-4 | 1400 | ⊚ | ○ | ○ | 55.6 |
| 13-5 (Invention) | 11-5 | 1400 | ⊚ | ○ | ○ | 56.1 |
| 13-6 (Invention) | 11-6 | 1400 | ⊚ | ⊚⊚ | ⊚⊚ | 55.2 |
| 13-7 (Invention) | 11-7 | 1400 | ⊚ | ⊚ | ⊚ | 55.3 |
| 13-8 (Invention) | 11-8 | 1400 | ⊚ | ⊚ | ⊚ | 54.5 |
| 13-9 (Invention) | 11-9 | 1400 | ⊚ | ⊚ | ⊚ | 56.1 |
| 13-10 (Invention) | 11-10 | 1400 | ⊚ | ⊚⊚ | ⊚⊚ | 55.8 |
| 13-11 (Invention) | 11-11 | 1400 | ⊚ | ⊚⊚ | ⊚⊚ | 56.7 |

TABLE 22-continued

| Sample No. | Sample No. used | Compression pressure (kg/cm²) | Fine powder occurrence due to vibration after storage | Fluctuation of supplying amount | Slidability | Hardness |
|---|---|---|---|---|---|---|
| 13-12 (Invention) | 11-12 | 1400 | ⊚ | ⊚⊚ | ⊚⊚ | 54.4 |
| 13-13 (Invention) | 11-21 | 1400 | ⊚ | ⊚⊚ | ⊚ | 55.2 |
| 13-14 (Invention) | 11-24 | 1400 | ⊚ | ⊚⊚ | ⊚⊚ | 55.9 |
| 13-15 (Invention) | 11-25 | 1400 | ⊚ | ⊚⊚ | ⊚⊚ | 56.5 |
| 13-16 (Invention) | 11-26 | 1400 | ⊚ | ⊚⊚ | ⊚⊚ | 54.8 |
| 13-17 (Invention) | 11-28 | 1400 | ⊚ | ⊚⊚ | ⊚⊚ | 63.2 |
| 13-18 (Invention) | 11-29 | 1400 | ⊚ | ⊚⊚ | ⊚⊚ | 64.5 |
| 13-19 (Invention) | 11-30 | 1400 | ⊚ | ⊚⊚ | ⊚⊚ | 64.1 |
| 13-20 (Invention) | 11-31 | 1400 | ⊚ | ⊚⊚ | ⊚⊚ | 63.9 |

TABLE 23

| Sample No. | Sample No. used | Compression pressure (kg/cm²) | Fine powder occurrence due to vibration after storage | Fluctuation of supplying amount | Slidability | Hardness |
|---|---|---|---|---|---|---|
| 13-21 (Comparative) | 12-1 | 1400 | o | X | X | 34.8 |
| 13-22 (Invention) | 12-2 | 1400 | ⊚ | o | o | 83.1 |
| 13-23 (Invention) | 12-3 | 1400 | ⊚ | o | o | 84.3 |
| 13-24 (Invention) | 12-4 | 1400 | ⊚ | ⊚⊚ | ⊚⊚ | 82.5 |
| 13-25 (Invention) | 12-5 | 1400 | ⊚ | ⊚ | ⊚ | 84.1 |
| 13-26 (Invention) | 12-6 | 1400 | ⊚ | ⊚ | ⊚ | 84.2 |
| 13-27 (Invention) | 12-7 | 1400 | ⊚ | ⊚ | ⊚ | 83.4 |
| 13-28 (Invention) | 12-8 | 1400 | ⊚ | ⊚⊚ | ⊚⊚ | 84.8 |
| 13-29 (Invention) | 12-9 | 1400 | ⊚ | ⊚⊚ | ⊚⊚ | 82.7 |
| 13-30 (Invention) | 12-10 | 1400 | ⊚ | ⊚⊚ | ⊚⊚ | 82.2 |
| 13-31 (Invention) | 12-11 | 1400 | ⊚ | ⊚⊚ | ⊚ | 83.2 |
| 13-32 (Invention) | 12-12 | 1400 | ⊚ | ⊚⊚ | ⊚⊚ | 84.3 |
| 13-33 (Invention) | 12-16 | 1400 | ⊚ | ⊚⊚ | ⊚⊚ | 84.4 |
| 13-34 (Invention) | 12-17 | 1400 | ⊚ | ⊚⊚ | ⊚⊚ | 82.9 |
| 13-35 (Invention) | 12-18 | 1400 | ⊚ | ⊚⊚ | ⊚⊚ | 83.8 |
| 13-36 (Invention) | 12-27 | 1400 | ⊚ | ⊚⊚ | ⊚⊚ | 82.2 |
| 13-37 (Invention) | 12-28 | 1400 | ⊚ | ⊚⊚ | ⊚⊚ | 95.8 |
| 13-38 (Invention) | 12-29 | 1400 | ⊚ | ⊚⊚ | ⊚⊚ | 94.6 |
| 13-39 (Invention) | 12-30 | 1400 | ⊚ | ⊚ | ⊚⊚ | 83.1 |
| 13-40 (Invention) | 12-31 | 1400 | ⊚ | ⊚ | ⊚ | 84.6 |
| 13-41 (Invention) | 12-32 | 1400 | ⊚ | o | o | 84.5 |

TABLE 24

| Sample No. | Sample No. used | Compression pressure (kg/cm²) | Fine powder occurrence due to vibration after storage | Fluctuation of supplying amount | Slidability | Hardness |
|---|---|---|---|---|---|---|
| 13-42 (Invention) | 11-5 | 300 | ⊚ | ⊚⊚ | o | 43.6 |
| 13-43 (Invention) | 11-5 | 400 | ⊚ | ⊚⊚ | ⊚ | 49.8 |
| 13-44 (Invention) | 11-5 | 800 | ⊚ | ⊚⊚ | ⊚⊚ | 55.2 |
| 13-45 (Invention) | 11-5 | 1200 | ⊚ | ⊚⊚ | ⊚⊚ | 56.6 |
| 13-46 (Invention) | 11-5 | 1600 | ⊚ | ⊚⊚ | ⊚⊚ | 54.5 |
| 13-47 (Invention) | 11-5 | 2000 | ⊚ | ⊚⊚ | ⊚⊚ | 55.7 |
| 13-48 (Invention) | 11-5 | 2200 | ⊚ | ⊚⊚ | ⊚ | 55.3 |
| 13-49 (Invention) | 12-4 | 300 | ⊚ | ⊚⊚ | o | 72.6 |
| 13-50 (Invention) | 12-4 | 400 | ⊚ | ⊚⊚ | ⊚ | 78.5 |
| 13-51 (Invention) | 12-4 | 800 | ⊚ | ⊚⊚ | ⊚⊚ | 84.6 |
| 13-52 (Invention) | 12-4 | 1200 | ⊚ | ⊚⊚ | ⊚⊚ | 83.3 |
| 13-53 (Invention) | 12-4 | 1600 | ⊚ | ⊚⊚ | ⊚⊚ | 85.7 |
| 13-54 (Invention) | 12-4 | 2000 | ⊚ | ⊚⊚ | ⊚⊚ | 84.7 |
| 13-55 (Invention) | 12-4 | 2200 | ⊚ | ⊚⊚ | ⊚ | 84.9 |

As is apparent from Tables 22, 23 and 24, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of supplying amount, and 0.5 to 2.0 mm screens show the above effects more markedly. Further, the addition of water of not more than 10 wt % reduces slidabilituy after storage, the addition of not more than 8 wt % shows the above effect markedly, and not more than 6 wt % more markedly. The compression pressure is preferably 400 to 2000 kg/cm² in view of tablet strength and slidability after storage.

Example 14

Procedure (14-1)

| Ammonium thiosulfate | 13,500 g |
|---|---|
| Sodium thiosulfate | 1,500 g |

The above compounds were independently pulverized, mixed and granulated in the same manner as in Procedure (1-1). Water of 1000 ml was sprayed and the temperature of drying air was controlled to be 30° C. or less during glanulating and the temperature after granulating was controlled to be 50° to 60° C. The resulting granules were dressed according to methods shown in Table 25 using screens shown in Table 25. Thus, sample (15-1) was obtained.

Procedure (14-2)

| Ammonium thiosulfate | 13,500 g |
|---|---|
| Sodium thiosulfate | 1,500 g |

The above compounds was pulverized, mixed, and granulated in the same manner as in Procedure (8-2). The resulting powders were granulated for about 3 minutes while 450 ml of water was sprayed at a rate of 750 ml/min. The resulting granules were dried in a fluid bed drier, while the temperature of drying air was controlled to be 50° to 60° C., and dressed according to methods shown in Table 25 using screens shown in Table 25. The resulting granules were dried to have a moisture content of 2 wt % or less. Thus, samples (14-2) through (14-12) were obtained.

Procedure (14-3)

| Sodium thiosulfate | 10,000 g |
|---|---|
| Sodium metabisulfite | 4,000 g |
| Ethylenediaminetetraacetic acid | 400 g |
| Pineflow | 600 g |

The above compounds was pulverized, mixed, and granulated in the same manner as in Procedure (8-2). The Procedure (14-2 was carried, except that the added amount of water was 470 ml. Thus, samples (14-13) through (14-20) were obtained.

Procedure (14-4)

| Ammonium thiosulfate | 14,000 g |
|---|---|
| Sodium sulfite | 1,000 g |
| Disodium ethylenediaminetetraacetate | 100 g |
| Potassium carbonate | 100 g |
| Pineflow | 300 g |

The above compounds were pulverized, mixed, and granulated in the same manner as in Procedure (8-2). The Procedure (14-2) was carried, except that the added amount of water was 6000 ml. Thus, samples (14-21) through (14-28) were obtained.

Experiment (14-1)

The above samples were evaluated for fine powder occurrence due to vibration, the fluctuation and blocking property due to moisture absorption in the same manner as in Experiments (1-1) through (1-3) of Example 1. The results are shown in Tables 25 and 26. The evaluation criteria were the same as Example 1.

TABLE 25

| Sample No. | Dressing during drying (Screen, mm) | Dressing after drying (Screen, mm) | Fine powder occurrence in vibration after storage | Fluctuation of supplying amount | Blocking due to storage |
|---|---|---|---|---|---|
| 14-1 (Comparative) | No | Yes (1.5) | × | × | ○ |
| 14-2 (Comparative) | No | No | ○ | × | × |
| 14-3 (Invention) | No | Yes (1.5) | ○ | ○ | ⊚ |
| 14-4 (Invention) | Yes (1.5) | No | ○ | ○ | ○ |
| 14-5 (Invention) | Yes (1.5) | Yes (1.5) | ○ | ⊚⊚ | ⊚ |
| 14-6 (Invention) | Yes (4.0) | Yes (1.5) | ○ | ⊚ | ○ |
| 14-7 (Invention) | Yes (3.0) | Yes (1.5) | ○ | ⊚ | ⊚ |
| 14-8 (Invention) | Yes (2.5) | Yes (1.5) | ○ | ⊚ | ⊚ |
| 14-9 (Invention) | Yes (2.0) | Yes (1.5) | ○ | ⊚⊚ | ⊚ |
| 14-10 (Invention) | Yes (1.0) | Yes (1.5) | ○ | ⊚⊚ | ⊚ |
| 14-11 (Invention) | Yes (0.5) | Yes (1.5) | ○ | ⊚⊚ | ⊚ |
| 14-12 (Invention) | Yes (0.3) | Yes (1.5) | ○ | ⊚⊚ | ○ |
| 14-13 (Invention) | Yes (4.0) | Yes (1.5) | ○ | ⊚ | ⊚ |
| 14-14 (Invention) | Yes (3.0) | Yes (1.5) | ○ | ⊚ | ⊚⊚ |
| 14-15 (Invention) | Yes (2.5) | Yes (1.5) | ○ | ⊚ | ⊚⊚ |
| 14-16 (Invention) | Yes (2.0) | Yes (1.5) | ○ | ⊚⊚ | ⊚⊚ |
| 14-17 (Invention) | Yes (1.5) | Yes (1.5) | ○ | ⊚⊚ | ⊚⊚ |
| 14-18 (Invention) | Yes (1.0) | Yes (1.5) | ○ | ⊚⊚ | ⊚⊚ |
| 14-19 (Invention) | Yes (0.5) | Yes (1.5) | ○ | ⊚⊚ | ⊚⊚ |
| 14-20 (Invention) | Yes (0.3) | Yes (1.5) | ○ | ⊚⊚ | ○ |

TABLE 26

| Sample No. | Dressing during drying (Screen, mm) | Dressing after drying (Screen, mm) | Fine powder occurrence in vibration after storage | Fluctuation of supplying amount | Blocking due to storage |
|---|---|---|---|---|---|
| 14-21 (Invention) | Yes (4.0) | Yes (1.5) | ○ | ⊙ | ⊙ |
| 14-22 (Invention) | Yes (3.0) | Yes (1.5) | ○ | ⊙ | ⊙⊙ |
| 14-23 (Invention) | Yes (2.5) | Yes (1.5) | ○ | ⊙ | ⊙⊙ |
| 14-24 (Invention) | Yes (2.0) | Yes (1.5) | ○ | ⊙⊙ | ⊙⊙ |
| 14-25 (Invention) | Yes (1.5) | Yes (1.5) | ○ | ⊙⊙ | ⊙⊙ |
| 14-26 (Invention) | Yes (1.0) | Yes (1.5) | ○ | ⊙⊙ | ⊙⊙ |
| 14-27 (Invention) | Yes (0.5) | Yes (1.5) | ○ | ⊙⊙ | ⊙⊙ |
| 14-28 (Invention) | Yes (0.3) | Yes (1.5) | ○ | ⊙⊙ | ○ |

As is apparent from Tables 25 and 26, it is possible to give a granular processing agent by granulating with stirring and then, dressing, which greatly reduces fine powder occurrence due to vibration and fluctuation of supplying amount. The dressing during drying shows the above effect markedly and the addition of additives can greatly improve the blocking after storage. Use of 0.5 to 3.0 mm screens shows the effects of the invention markedly, and 0.5 to 2.0 mm screens more markedly.

Example 15

Procedure (15-1)

The compounds were independently pulverized, mixed and granulated in the same manner as in Procedure (14-3), except that water was added in an amount shown in Table 27 (based on the total weight of the compounds). The resulting granules were dressed during and after drying using a 1.5 mm screen. Thus, samples (15-1) through (15-7) were obtained.

Procedure (15-2)

The compounds were independently pulverized, mixed and granulated in the same manner as in Procedure (14-4), except that water was added in an amount shown in Table 27 (based on the total weight of the compounds). The resulting granules were dressed during and after drying using a 1.5 mm screen. Thus, samples (15-8) through (15-14) were obtained.

Experiment (15-1)

The above samples were evaluated for blocking property due to moisture absorption in the same manner as in Experiments (14-1). The evaluation criteria were the same as Example 14.

Experiment (15-2)

Samples (15-1) through (15-14) were evaluated for the content of thiosulfate before and after the manufacture.

The content was evaluated according to the following criteria, the content before the manufacture being represented as 100%.
⊙: About 100%
○: Not less than 98%
X: Not more than 90%

TABLE 27

| Sample No. | Added amount of water (wt %) | Blocking due to moisture absorption | Content after the manufacture |
|---|---|---|---|
| 15-1 (Invention) | 3 | ⊙⊙ | ⊙ |
| 15-2 (Invention) | 4 | ⊙⊙ | ⊙ |
| 15-3 (Invention) | 5 | ⊙⊙ | ⊙ |
| 15-4 (Invention) | 6 | ⊙⊙ | ⊙ |
| 15-5 (Invention) | 8 | ⊙ | ⊙ |
| 15-6 (Invention) | 10 | ⊙ | ○ |
| 15-7 (Invention) | 12 | ○ | ○ |
| 15-8 (Invention) | 3 | ⊙⊙ | ⊙ |
| 15-9 (Invention) | 4 | ⊙⊙ | ⊙ |
| 15-10 (Invention) | 5 | ⊙⊙ | ⊙ |
| 15-11 (Invention) | 6 | ⊙⊙ | ⊙ |
| 15-12 (Invention) | 8 | ⊙ | ⊙ |
| 15-13 (Invention) | 10 | ⊙ | ○ |
| 15-14 (Invention) | 12 | ○ | ○ |

As is apparent from Table 27, it is possible to give a granular processing agent for a silver halide photographic color light-sensitive material by controlling the addition of water to be not more than 10 wt %, which improves blocking after manufacture and gives an excellent productivity. The addition of not more than 8 wt % shows the above effects markedly, and not more than 6 wt % more markedly.

Example 16

Procedure (16-1)

Samples prepared in Examples 14 and 15 (shown in Tables 28, 29 and 30) were mixed with 0.5 wt % of sodium N-lauroylsarcosine (pulverized to 100 μm or less) for 3 minutes in a cross-rotary mixer, and then, tableted at a compression pressure shown in Tables 28, 29 and 30 in the same manner as in Procedure (7-1). The resulting tablets weighed about 11 g and were in a cylindrical form having a diameter of 30 mm.

Experiment (16-1)

The samples were evaluated for fine powder occurrence after storage, fluctuation, blocking property due to moisture absorption after storage and hardness in the same manner as in Example 4. The evaluation criteria were the same as Example 4.

TABLE 28

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 16-1 (Comparative) | 14-1 | 1400 | ○ | × | ○ | 58.2 |
| 16-2 (Comparative) | 14-2 | 1400 | ○ | × | × | 53.7 |
| 16-3 (Invention) | 14-3 | 1400 | ◎ | ○ | ○ | 97.5 |
| 16-4 (Invention) | 14-4 | 1400 | ◎ | ○ | ○ | 98.4 |
| 16-5 (Invention) | 14-5 | 1400 | ◎ | ◎◎ | ◎ | 97.9 |
| 16-6 (Invention) | 14-13 | 1400 | ◎ | ◎ | ◎ | 123.6 |
| 16-7 (Invention) | 14-14 | 1400 | ◎ | ◎ | ◎ | 122.8 |
| 16-8 (Invention) | 14-15 | 1400 | ◎ | ◎ | ◎ | 120.5 |
| 16-9 (Invention) | 14-16 | 1400 | ◎ | ◎◎ | ◎◎ | 121.7 |
| 16-10 (Invention) | 14-17 | 1400 | ◎ | ◎◎ | ◎◎ | 120.3 |
| 16-11 (Invention) | 14-18 | 1400 | ◎ | ◎◎ | ◎◎ | 121.4 |
| 16-12 (Invention) | 14-19 | 1400 | ◎ | ◎◎ | ◎◎ | 119.7 |
| 16-13 (Invention) | 14-20 | 1400 | ◎ | ◎◎ | ◎ | 119.8 |
| 16-14 (Invention) | 14-21 | 1400 | ◎ | ◎ | ○ | 120.2 |
| 16-15 (Invention) | 14-22 | 1400 | ◎ | ◎ | ◎ | 118.1 |
| 16-16 (Invention) | 14-23 | 1400 | ◎ | ◎ | ◎ | 122.3 |
| 16-17 (Invention) | 14-24 | 1400 | ◎ | ◎◎ | ◎◎ | 119.6 |
| 16-18 (Invention) | 14-25 | 1400 | ◎ | ◎◎ | ◎◎ | 121.4 |
| 16-19 (Invention) | 14-26 | 1400 | ◎ | ◎◎ | ◎◎ | 122.5 |
| 16-20 (Invention) | 14-27 | 1400 | ◎ | ◎◎ | ◎◎ | 120.9 |

TABLE 29

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 16-21 (Invention) | 14-28 | 1400 | ◎ | ◎◎ | ◎ | 118.7 |
| 16-22 (Invention) | 15-1 | 1400 | ◎ | ◎◎ | ◎◎ | 119.9 |
| 16-23 (Invention) | 15-2 | 1400 | ◎ | ◎◎ | ◎◎ | 132..6 |
| 16-24 (Invention) | 15-3 | 1400 | ◎ | ◎◎ | ◎◎ | 133.2 |
| 16-25 (Invention) | 15-4 | 1400 | ◎ | ◎◎ | ◎ | 130.1 |
| 16-26 (Invention) | 15-5 | 1400 | ◎ | ◎ | ◎ | 122.2 |
| 16-27 (Invention) | 15-6 | 1400 | ◎ | ◎ | ◎ | 119.6 |
| 16-28 (Invention) | 15-7 | 1400 | ◎ | ○ | ○ | 121.7 |
| 16-29 (Invention) | 15-8 | 1400 | ◎ | ◎◎ | ◎◎ | 120.4 |
| 16-30 (Invention) | 15-9 | 1400 | ◎ | ◎◎ | ◎◎ | 133.4 |
| 16-31 (Invention) | 15-10 | 1400 | ◎ | ◎◎ | ◎◎ | 132.8 |
| 16-32 (Invention) | 15-11 | 1400 | ◎ | ◎◎ | ◎ | 132.5 |
| 16-33 (Invention) | 15-12 | 1400 | ◎ | ◎ | ◎ | 120.5 |
| 16-34 (Invention) | 15-13 | 1400 | ◎ | ◎ | ◎ | 120.4 |
| 16-35 (Invention) | 15-14 | 1400 | ◎ | ○ | ○ | 121.3 |

TABLE 30

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 16-36 (Invention) | 14-17 | 300 | ◎ | ◎◎ | ○ | 109.2 |
| 16-37 (Invention) | 14-17 | 400 | ◎ | ◎◎ | ◎ | 120.1 |
| 16-38 (Invention) | 14-17 | 800 | ◎ | ◎◎ | ◎◎ | 119.3 |
| 16-39 (Invention) | 14-17 | 1200 | ◎ | ◎◎ | ◎◎ | 120.4 |
| 16-40 (Invention) | 14-17 | 1600 | ◎ | ◎◎ | ◎◎ | 120.6 |
| 16-41 (Invention) | 14-17 | 2000 | ◎ | ◎◎ | ◎◎ | 118.4 |
| 16-42 (Invention) | 14-17 | 2200 | ◎ | ◎◎ | ◎ | 118.9 |
| 16-43 (Invention) | 14-2A | 300 | ◎ | ◎◎ | ○ | 110.5 |
| 16-44 (Invention) | 14-25 | 400 | ◎ | ◎◎ | ◎ | 120.1 |
| 16-45 (Invention) | 14-25 | 800 | ◎ | ◎◎ | ◎◎ | 122.2 |
| 16-46 (Invention) | 14-25 | 1200 | ◎ | ◎◎ | ◎◎ | 122.8 |
| 16-47 (Invention) | 14-25 | 1600 | ◎ | ◎◎ | ◎◎ | 121.6 |

TABLE 30-continued

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 16-48 (Invention) | 14-25 | 2000 | ◎ | ◎◎ | ◎◎ | 121.7 |
| 16-49 (Invention) | 14-25 | 2200 | ◎ | ◎◎ | ◎ | 120.9 |

As is apparent from Tables 28, 29 and 30, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of qualitative supply, and 0.5 to 2.0 mm screens show the above effects more markedly. Further, the addition of water of not more than 10 wt % reduces slidability after storage, the addition of not more than 8 wt % shows the above effect markedly, and not more than 6 wt % more markedly. The compression pressure is preferably 400 to 2000 kg/cm² in view of tablet strength and expansion due to moisture absorption.

Example 17

Procedure (17-1)

| | |
|---|---|
| o-Phenylphenol | 200 g |
| Ethylenediaminetetraacetic acid | 2,000 g |
| Disodium ethylenediaminetetraacetate | 2,500 g |
| Polyethylene glycol #4000 (produced by Nihon Yushi Co., Ltd.) | 1,500 g |
| Tetrasodium 1-hydroxyethylidene-1,1-diphosphonate | 9,000 g |

The above compounds were independently pulverized, mixed and granulated in the same manner as in Procedure (8-1). Water of 2000 ml was sprayed and the temperature of drying air was controlled to be 50° to 60° C. during granulating. The resulting granules were dressed according to methods shown in Table 31 using screens shown in Table 31. Thus, sample (17-1) was obtained.

Procedure (17-2)

| | |
|---|---|
| o-Phenylphenol | 200 g |
| Ethylenediaminetetraacetic acid | 2,000 g |
| Disodium ethylenediaminetetraacetate | 2,500 g |
| Polyethylene glycol #4000 (produced by Nihon Yushi Co., Ltd.) | 1,500 g |
| Tetrasodium 1-hydroxyethylidene-1,1-diphosphonate | 9,000 g |

The above compounds were pulverized, mixed, and granulated in the same manner as in Procedure (8-2). The powders were granulated for 3 minutes while water was sprayed in an amount shown in Table 31 (based on the total weight of the compounds) at a rate of 750 ml/min. The resulting granules were dried in a fluid bed drier, while the temperature of drying air was controlled to be 50° to 65° C., and dressed according to methods shown in Table 31 using screens shown in Table 31. The resulting granules were dried to have a moisture content of 2 wt % or less. Thus, samples (17-2) through (17-17) were obtained.

Procedure (17-3)

| | |
|---|---|
| Tetrasodium 1-hydroxyethylidene-1,1-diphosphonate | 15,000 g |

The above compound was pulverized, granulated, dried and dressed in the same manner as in Procedure (17-2). Thus, samples (17-18) through (17-27) were obtained.

Experiment (17-1)

The above samples were evaluated for fine powder occurrence due to vibration after storage, the fluctuation and blocking property due to moisture absorption after storage in the same manner as in Example 1. The evaluation criteria were the same as Example 1.

TABLE 31

| Sample No. | Dressing during drying (Screen, mm) | Dressing after drying (Screen, mm) | Added amount of water (wt %) | Fine powder occurrence in vibration after storage | Fluctuation of supplying amount | Blocking due to storage |
|---|---|---|---|---|---|---|
| 17-1 (Comparative) | No | Yes (1.5) | 13 | X | X | o |
| 17-2 (Comparative) | No | No | 10 | o | X | X |
| 17-3 (Invention) | No | Yes (1.5) | 10 | o | o | o |
| 17-4 (Invention) | Yes (1.5) | No | 10 | o | o | ◎ |
| 17-5 (Invention) | Yes (4.0) | Yes (1.5) | 10 | o | o | ◎◎ |
| 17-6 (Invention) | Yes (3.0) | Yes (1.5) | 10 | o | ◎ | ◎◎ |
| 17-7 (Invention) | Yes (2.5) | Yes (1.5) | 10 | o | ◎ | ◎◎ |
| 17-8 (Invention) | Yes (2.0) | Yes (1.5) | 10 | o | ◎◎ | ◎◎ |
| 17-9 (Invention) | Yes (1.5) | Yes (1.5) | 10 | o | ◎◎ | ◎◎ |

TABLE 31-continued

| Sample No. | Dressing during drying (Screen, mm) | Dressing after drying (Screen, mm) | Added amount of water (wt %) | Fine powder occurrence in vibration after storage | Fluctuation of supplying amount | Blocking due to storage |
|---|---|---|---|---|---|---|
| 17-10 (Invention) | Yes (1.0) | Yes (1.5) | 10 | o | ◎◎ | ◎◎ |
| 17-11 (Invention) | Yes (0.5) | Yes (1.5) | 10 | o | ◎◎ | ◎◎ |
| 17-12 (Invention) | Yes (0.3) | Yes (1.5) | 10 | o | ◎◎ | ◎ |
| 17-13 (Invention) | Yes (1.5) | Yes (1.5) | 8 | o | ◎◎ | ◎◎ |
| 17-14 (Invention) | Yes (1.5) | Yes (1.5) | 11 | o | ◎◎ | ◎◎ |
| 17-15 (Invention) | Yes (1.5) | Yes (1.5) | 12 | o | ◎◎ | ◎◎ |
| 17-16 (Invention) | Yes (1.5) | Yes (1.5) | 14 | o | ◎◎ | ◎ |
| 17-17 (Invention) | Yes (1.5) | Yes (1.5) | 16 | o | ◎◎ | o |
| 17-18 (Invention) | No | Yes (1.5) | 10 | o | o | o |
| 17-19 (Invention) | Yes (1.5) | No | 10 | o | o | ◎ |

TABLE 32

| Sample No. | Dressing during drying (Screen, mm) | Dressing after drying (Screen, mm) | Added amount of water (wt %) | Fine powder occurrence in vibration after storage | Fluctuation of supplying amount | Blocking due to storage |
|---|---|---|---|---|---|---|
| 17-20 (Invention) | Yes (4.0) | Yes (1.5) | 10 | o | o | ◎ |
| 17-21 (Invention) | Yes (3.0) | Yes (1.5) | 10 | o | ◎ | ◎ |
| 17-22 (Invention) | Yes (2.5) | Yes (1.5) | 10 | o | ◎ | ◎ |
| 17-23 (Invention) | Yes (2.0) | Yes (1.5) | 10 | o | ◎◎ | ◎ |
| 17-24 (Invention) | Yes (1.5) | Yes (1.5) | 10 | o | ◎◎ | ◎ |
| 17-25 (Invention) | Yes (1.0) | Yes (1.5) | 10 | o | ◎◎ | ◎ |
| 17-26 (Invention) | Yes (0.5) | Yes (1.5) | 10 | o | ◎◎ | ◎ |
| 17-27 (Invention) | Yes (0.3) | Yes (1.5) | 10 | o | ◎◎ | o |

As is apparent from Tables 31 and 32, it is possible to give a granular processing agent by granulating with stirring and then, dressing, which greatly reduces fine powder occurrence due to vibration and fluctuation of supplying amount. The dressing during drying prevents blocking due to moisture absorption after storage and the addition of additives further prevents the blocking. Use of 0.5 to 3.0 mm screens shows the effects of the invention markedly, and 0.5 to 2.0 mm screens more markedly. The addition of water not more than 10 wt % during granulation prevents the blocking.

Example 18

Procedure (18-1)

Samples prepared in Example 17 (shown in Tables 33 and 34) were mixed with 0.5 wt % of sodium N-lauroylsarcosine (pulverized to 100 μm or less) for 3 minutes in a cross-rotary mixer, and then, tableted at a compression pressure shown in Tables 33 and 34 in the same manner as in Procedure (7-1). The resulting tablets weighed about 10.5 g and were in a cylindrical form having a diameter of 30 mm.

Experiment (18-1)

The samples were evaluated in the same manner as in Example 4. The evaluation criteria were the same as Example 4.

TABLE 33

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 18-1 (Comparative) | 17-1 | 1400 | o | X | o | 42.8 |
| 18-2 (Comparative) | 17-2 | 1400 | o | X | X | 30.4 |
| 18-3 (Invention) | 17-3 | 1400 | ◎ | o | o | 55.9 |

TABLE 33-continued

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 18-4 (Invention) | 17-4 | 1400 | ⊚ | o | ⊚ | 54.3 |
| 18-5 (Invention) | 17-5 | 1400 | ⊚ | o | ⊚⊚ | 59.6 |
| 18-6 (Invention) | 17-6 | 1400 | ⊚ | ⊚ | ⊚⊚ | 58.3 |
| 18-7 (Invention) | 17-7 | 1400 | ⊚ | ⊚ | ⊚⊚ | 60.4 |
| 18-8 (Invention) | 17-8 | 1400 | ⊚ | ⊚⊚ | ⊚⊚ | 62.3 |
| 18-9 (Invention) | 17-9 | 1400 | ⊚ | ⊚⊚ | ⊚⊚ | 60.5 |
| 18-10 (Invention) | 17-10 | 1400 | ⊚ | ⊚⊚ | ⊚⊚ | 63.2 |
| 18-11 (Invention) | 17-11 | 1400 | ⊚ | ⊚⊚ | ⊚⊚ | 60.9 |
| 18-12 (Invention) | 17-12 | 1400 | ⊚ | ⊚⊚ | ⊚ | 59.2 |
| 18-13 (Invention) | 17-13 | 1400 | ⊚ | ⊚⊚ | ⊚⊚ | 58.6 |
| 18-14 (Invention) | 17-14 | 1400 | ⊚ | ⊚⊚ | ⊚⊚ | 66.3 |
| 18-15 (Invention) | 17-15 | 1400 | ⊚ | ⊚⊚ | ⊚⊚ | 67.1 |
| 18-16 (Invention) | 17-16 | 1400 | ⊚ | ⊚⊚ | ⊚ | 61.5 |
| 18-17 (Invention) | 17-17 | 1400 | ⊚ | ⊚⊚ | o | 60.6 |

TABLE 34

| Sample No. | Sample No. used | Compression pressure (kg/cm²) | Fine powder occurrence due to vibration after storage | Fluctuation of supplying amount | Expansion due to moisture absorption | Hardness (kg) |
|---|---|---|---|---|---|---|
| 18-18 (Invention) | 17-9 | 300 | o | ⊚⊚ | o | 45.3 |
| 18-19 (Invention) | 17-9 | 400 | ⊚ | ⊚⊚ | ⊚⊚ | 50.2 |
| 18-20 (Invention) | 17-9 | 800 | ⊚ | ⊚⊚ | ⊚⊚ | 59.3 |
| 18-21 (Invention) | 17-9 | 1200 | ⊚ | ⊚⊚ | ⊚⊚ | 62.1 |
| 18-22 (Invention) | 17-9 | 1600 | ⊚ | ⊚⊚ | ⊚⊚ | 60.3 |
| 18-23 (Invention) | 17-9 | 2000 | ⊚ | ⊚⊚ | ⊚⊚ | 58.9 |
| 18-24 (Invention) | 17-9 | 2200 | ⊚ | ⊚⊚ | ⊚ | 61.5 |
| 18-25 (Invention) | 17-20 | 1400 | ⊚ | o | o | 50.2 |
| 18-26 (Invention) | 17-21 | 1400 | ⊚ | ⊚ | o | 48.7 |
| 18-27 (Invention) | 17-22 | 1400 | ⊚ | ⊚ | o | 46.9 |
| 18-28 (Invention) | 17-23 | 1400 | ⊚ | ⊚⊚ | ⊚ | 51.2 |
| 18-29 (Invention) | 17-24 | 1400 | ⊚ | ⊚⊚ | ⊚ | 49.9 |
| 18-30 (Invention) | 17-25 | 1400 | ⊚ | ⊚⊚ | ⊚ | 50.7 |
| 18-31 (Invention) | 17-26 | 1400 | ⊚ | ⊚⊚ | ⊚ | 52.1 |
| 18-32 (Invention) | 17-27 | 1400 | ⊚ | ⊚⊚ | o | 49.6 |

As is apparent from Tables 33 and 34, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of qualitative supply, and 0.5 to 2.0 mm screens show the above effects more markedly. Further, the addition of water of not more than 10 wt % reduces expansion due to moisture absorption. The compression pressure is preferably 400 to 2000 kg/cm² in view of tablet strength and expansion due to moisture absorption.

Example 19

Procedure (19-1)

| | |
|---|---|
| meta-Hydroxybenzaldehyde | 12,000 g |
| Lithium hydroxide monohydrate | 1,000 g |
| Disodium ethylenediaminetetraacetate | 1,000 g |
| β-Cyclodextrin | 500 g |

-continued

| | |
|---|---|
| Megafac F116 (produced by Dainihon Inki Co., Ltd.) | 1,500 g |

The above compounds were independently pulverized, mixed and granulated in the same manner as in Procedure (1-1). During granulating water of 1000 ml was sprayed and the temperature of drying air was controlled to be 40° to 60° C. The resulting granules were dressed according to methods shown in Table 35 using screens shown in Table 35. Thus, sample (19-1) was obtained.

Procedure (19-2)

| | |
|---|---|
| meta-Hydroxybenzaldehyde | 12,000 g |
| Lithium hydroxide monohydrate | 1,000 g |
| Disodium ethylenediaminetetraacetate | 1,000 g |
| β-Cyclodextrin | 500 g |
| Megafac F116 (produced by Dainihon Inki Co., Ltd.) | 1,500 g |

The above compounds were pulverized, mixed, and granulated in the same manner as in Procedure (8-2). The powders were granulated for 3 minutes while water was sprayed in an amount shown in Table 35 (based on the total weight of the compounds) at a rate of 750 ml/min. The resulting granules were dried in a fluid bed drier, while the temperature of drying air was controlled to be 40° to 60° C., and dressed according to methods shown in Table 35 using screens shown in Table 35. The resulting granules were dried to have a moisture content of 2 wt % or less. Thus, samples (19-2) through (19-18) were obtained.

Procedure (19-3)

| | |
|---|---|
| meta-Hydroxybenzaldehyde | 13,500 g |
| Disodium ethylenediaminetetraacetate | 1,500 g |

The above compound was pulverized, granulated, dried and dressed in the same manner as in Procedure (19-2). Thus, samples (19-19) through (19-26) were obtained.

same manner as in Example 1. The evaluation criteria were the same as Example 1. The results are shown in Tables 35 and 36.

Experiment (19-2)

One hundred grams of each of the above samples were placed and tightly sealed in an aluminium package, and stored at 55° C. for 20 days. The resulting samples were evaluated for coloration after storage. The results are shown in Tables 35 and 36. The evaluation criteria were as follows:

⊚⊚: No coloration
⊚: Partly colored, and 10% or less of the sample colored.
o: Partly colored, and 30% or less of the sample colored.
X: More than 59% of the sample colored.

TABLE 35

| Sample No. | Dressing during drying (Screen, mm) | Dressing after drying (Screen, mm) | Added amount of water (wt %) | Fine powder occurrence in vibration after storage | Fluctuation of supplying amount | Coloration after storage |
|---|---|---|---|---|---|---|
| 19-1 (Comparative) | No | Yes (1.5) | 6 | X | X | o |
| 19-2 (Comparative) | No | No | 3 | o | X | X |
| 19-3 (Invention) | Yes (1.5) | No | 3 | o | o | o |
| 19-4 (Invention) | No | Yes (1.5) | 3 | o | o | ⊚ |
| 19-5 (Invention) | Yes (4.0) | Yes (1.5) | 3 | o | o | ⊚⊚ |
| 19-6 (Invention) | Yes (3.0) | Yes (1.5) | 3 | o | ⊚ | ⊚⊚ |
| 19-7 (Invention) | Yes (2.5) | Yes (1.5) | 3 | o | ⊚ | ⊚⊚ |
| 19-8 (Invention) | Yes (2.0) | Yes (1.5) | 3 | o | ⊚⊚ | ⊚⊚ |
| 19-9 (Invention) | Yes (1.5) | Yes (1.5) | 3 | o | ⊚⊚ | ⊚⊚ |
| 19-10 (Invention) | Yes (1.0) | Yes (1.5) | 3 | o | ⊚⊚ | ⊚⊚ |
| 19-11 (Invention) | Yes (0.5) | Yes (1.5) | 3 | o | ⊚⊚ | ⊚⊚ |
| 19-12 (Invention) | Yes (0.3) | Yes (1.5) | 3 | o | ⊚⊚ | ⊚ |
| 19-13 (Invention) | Yes (1.5) | Yes (1.5) | 3 | o | ⊚⊚ | ⊚⊚ |
| 19-14 (Invention) | Yes (1.5) | Yes (1.5) | 4 | o | ⊚⊚ | ⊚⊚ |
| 19-15 (Invention) | Yes (1.5) | Yes (1.5) | 6 | o | ⊚⊚ | ⊚⊚ |
| 19-16 (Invention) | Yes (1.5) | Yes (1.5) | 8 | o | ⊚⊚ | ⊚ |
| 19-17 (Invention) | Yes (1.5) | Yes (1.5) | 10 | o | ⊚⊚ | ⊚ |
| 19-18 (Invention) | Yes (1.5) | Yes (1.5) | 12 | o | ⊚⊚ | o |

TABLE 36

| Sample No. | Dressing during drying (Screen, mm) | Dressing after drying (Screen, mm) | Added amount of water (wt %) | Fine powder occurrence in vibration after storage | Fluctuation of supplying amount | Coloration after storage |
|---|---|---|---|---|---|---|
| 19-19 (Invention) | Yes (4.0) | Yes (1.5) | 3 | o | o | ⊚ |
| 19-20 (Invention) | Yes (3.0) | Yes (1.5) | 3 | o | ⊚ | ⊚ |
| 19-21 (Invention) | Yes (2.5) | Yes (1.5) | 3 | o | ⊚ | ⊚ |
| 19-22 (Invention) | Yes (2.0) | Yes (1.5) | 3 | o | ⊚⊚ | ⊚ |
| 19-23 (Invention) | Yes (1.5) | Yes (1.5) | 3 | o | ⊚⊚ | ⊚ |
| 19-24 (Invention) | Yes (1.0) | Yes (1.5) | 3 | o | ⊚⊚ | ⊚ |
| 19-25 (Invention) | Yes (0.5) | Yes (1.5) | 3 | o | ⊚⊚ | ⊚ |
| 19-26 (Invention) | Yes (0.3) | Yes (1.5) | 3 | o | ⊚⊚ | o |

Experiment (19-1)

The above samples were evaluated for fine powder occurrence due to vibration after storage and the fluctuation in the As is apparent from Tables 35 and 36, it is possible to give a granular processing agent by granulating with stirring and then, dressing, which greatly reduces fine powder occurrence due to vibration and fluctuation of supplying amount. The dressing during drying reduces coloration after storage, and the addition of additives can greatly reduces coloration after storage. Use of 0.5 to 3.0 mm screens shows the effects of the invention markedly, and 0.5 to 2.0 mm screens more markedly. The addition of water not more than 10 wt % during granulation reduces coloration after storage, and not more than 6 wt % shows the effect markedly.

same manner as in Example 4. The evaluation criteria were the same as Example 4.

Experiment (20-3)

The samples were evaluated for slidability in the same manner as in Experiment (7-2). The evaluation criteria were the same as Example 7.

TABLE 37

| Sample No. | Sample No. used | Compression pressure (kg/cm²) | Fine powder occurrence due to vibration after storage | Fluctuation of supplying amount | Slidability after storage | Hardness (kg) |
|---|---|---|---|---|---|---|
| 20-1 (Comparative) | 19-1 | 1400 | o | X | o | 50.8 |
| 20-2 (Comparative) | 19-2 | 1400 | o | X | X | 40.1 |
| 20-3 (Invention) | 19-3 | 1400 | ⊙ | o | o | 75.6 |
| 20-4 (Invention) | 19-4 | 1400 | ⊙ | o | ⊙ | 77.7 |
| 20-5 (Invention) | 19-5 | 1400 | ⊙ | o | ⊙⊙ | 88.1 |
| 20-6 (Invention) | 19-6 | 1400 | ⊙ | ⊙ | ⊙⊙ | 90.3 |
| 20-7 (Invention) | 19-7 | 1400 | ⊙ | ⊙ | ⊙⊙ | 92.5 |
| 20-8 (Invention) | 19-8 | 1400 | ⊙ | ⊙⊙ | ⊙⊙ | 91.9 |
| 20-9 (Comparative) | 19-9 | 1400 | ⊙ | ⊙⊙ | ⊙⊙ | 89.4 |
| 20-10 (Invention) | 19-10 | 1400 | ⊙ | ⊙⊙ | ⊙⊙ | 87.8 |
| 20-11 (Invention) | 19-11 | 1400 | ⊙ | ⊙⊙ | ⊙⊙ | 93.3 |
| 20-12 (Invention) | 19-12 | 1400 | ⊙ | ⊙⊙ | ⊙ | 86.5 |
| 20-13 (Invention) | 19-13 | 1400 | ⊙ | ⊙⊙ | ⊙⊙ | 90.1 |
| 20-14 (Invention) | 19-14 | 1400 | ⊙ | ⊙⊙ | ⊙⊙ | 99.2 |
| 20-15 (Invention) | 19-15 | 1400 | ⊙ | ⊙⊙ | ⊙⊙ | 100.9 |
| 20-16 (Invention) | 14-16 | 1400 | ⊙ | ⊙⊙ | ⊙ | 88.8 |
| 20-17 (Invention) | 19-17 | 1400 | ⊙ | ⊙⊙ | ⊙ | 91.3 |
| 20-18 (Invention) | 19-18 | 1400 | ⊙ | ⊙⊙ | o | 91.8 |

TABLE 38

| Sample No. | Sample No. used | Compression pressure (kg/cm²) | Fine powder occurrence due to vibration after storage | Fluctuation of supplying amount | Slidability after storage | Hardness (kg) |
|---|---|---|---|---|---|---|
| 20-19 (Invention) | 19-9 | 300 | o | ⊙⊙ | ⊙⊙ | 74.1 |
| 20-20 (Invention) | 19-9 | 400 | ⊙ | ⊙⊙ | ⊙⊙ | 83.6 |
| 20-21 (Invention) | 19-9 | 800 | ⊙ | ⊙⊙ | ⊙⊙ | 92.2 |
| 20-22 (Invention) | 19-9 | 1200 | ⊙ | ⊙⊙ | ⊙⊙ | 91.4 |
| 20-23 (Invention) | 19-9 | 1600 | ⊙ | ⊙⊙ | ⊙⊙ | 89.5 |
| 20-24 (Invention) | 19-9 | 2000 | ⊙ | ⊙⊙ | ⊙⊙ | 89.4 |
| 20-25 (Invention) | 19-9 | 2200 | ⊙ | ⊙⊙ | ⊙ | 90.0 |
| 20-26 (Invention) | 19-19 | 1400 | ⊙ | o | ⊙ | 84.7 |
| 20-27 (Invention) | 19-20 | 1400 | ⊙ | ⊙ | ⊙ | 83.6 |
| 20-28 (Invention) | 19-21 | 1400 | ⊙ | ⊙ | ⊙ | 86.2 |
| 20-29 (Invention) | 19-22 | 1400 | ⊙ | ⊙⊙ | ⊙ | 85.5 |
| 20-30 (Invention) | 19-23 | 1400 | ⊙ | ⊙⊙ | ⊙ | 84.1 |
| 20-31 (Invention) | 19-24 | 1400 | ⊙ | ⊙⊙ | ⊙ | 85.3 |
| 20-32 (Invention) | 19-25 | 1400 | ⊙ | ⊙⊙ | ⊙ | 84.8 |
| 20-33 (Invention) | 19-26 | 1400 | ⊙ | ⊙⊙ | o | 86.7 |

Example 20

Procedure (20-1)

Samples prepared in Example 19 (shown in Tables 37 and 38) were tableted at a compression pressure shown in Tables 37 and 38 in the same manner as in Procedure (7-1). The resulting tablets weighed about 8.5 g and were in a cylindrical form having a diameter of 30 mm.

Experiment (20-2)

The samples were evaluated for fine powder occuerrence due to vibration after storage, fluctuation and hardness in the As is apparent from Tables 37 and 38, it is possible to give a tablet processing agent by compression molding granules prepared according to the invention, which greatly reduces fine powder occurrence and fluctuation of supplying amount. Hardness of tablets markedly increases by dressing. Use of 0.5 to 3.0 mm screens reduces fluctuation of qualitative supply, and 0.5 to 2.0 mm screens show the above effects more markedly. Further, the addition of water of not more than 10 wt % improves slidability after storage, and the addition of not more than 6 wt % markedly improves slidability after storage. The compression pressure is preferably 400 to 2000 kg/cm² in view of tablet strength and slidability after storage.

Example 21

Procedure (21-1)

The granular sample containing an alkali agent of Examples 1 through 3, the granular sample containing a p-phenylene diamine compound of Examples 5 and 6 and the granular sample containing a hydroxylamine or its derivatives of Examples 8 and 9 were mixed for 10 minutes in a cross-rotary mixer in an amount (based on the total weight) shown in Table 39, using samples shown in Table 39. Thus, samples (21-1) through (21-10) were obtained.

Experiment (21-1)

The samples were evaluated for fluctuation and coloration after storage in the same manner as in Example 5. The evaluation criteria were the same as Example 5.

Experiment (21-2)

One hundred grams of each of the above samples were placed and tightly sealed in a polyethylene package, and stored at 55° C. for 35 days. The resulting samples were dissolved in water to make a 2 liter, and evaluated for insoluble matter occurrence in the solution. The evaluation criteria were as follows:

⊚⊚: Quite transparent
⊚: Sufficiently transparent
o: Not so transparent, but no insoluble matter occurred
X: Insoluble matter occurred.

As is apparent from Table 39, it is possible to give a granular processing agent also by mixing the granules of the invention, which greatly prevents fluctuation of supplying amount, coloration after storege and further greatly prevents insoluble matter occurrence.

EXAMPLE 22

Procedure (22-1)

The samples shown in Table 40 were mixed for 10 minutes in a cross-rotary mixer in an amount shown in Table 40, and mixed with 0.5 wt % of sodium myristoyl-N-methyl-β-alanine (pulverized to 100 μm or less) for further 3 minutes. The resulting granules were tableted at a compression pressure of 1400 kg/cm² in the same manner as in Example 4 to obtain 1,000 tablets. Thus, samples (22-1) through (22-10) were obtained.

Experiment (22-1)

The samples were evaluated for fluctuation and expansion due to moisture absorption in the same manner as in Example 4. The evaluation criteria were the same as Example 4. The results are shown in Table 40.

Experiment (22-2)

Tableting property was evaluated during continuously tableting. The evaluation criteria were as follows:

⊚⊚: No problems
⊚: Creaky noise occurred during tableting, but no problems.
o: materials adhere to pestle during tableting, but no problems.
X: Creaky noise occurred and materials adhere to pestle throughout tableting.

TABLE 39

| Sample No. | Granules containing an alkali agent (Content, wt %) | Granules containing a p-phenylene diamine compound (Content, wt %) | Granules containing a hydroxylamine or its derivatives (Content, wt %) | Fluctuation of suppling amount | Coloration | Insoluble matter |
| --- | --- | --- | --- | --- | --- | --- |
| 21-1 (Comparative) | 1-2 (80) | 5-3 (13) | 8-2 (7) | X | X | X |
| 21-2 (Invention) | 1-4 (80) | 5-16 (13) | 8-5 (7) | ⊚⊚ | ⊚ | ⊚ |
| 21-3 (Invention) | 1-4 (75) | 5-26 (18) | 8-5 (7) | ⊚⊚ | ⊚⊚ | ⊚ |
| 21-4 (Invention) | 2-7 (83) | 5-26 (12) | 8-5 (5) | ⊚⊚ | ⊚⊚ | ⊚⊚ |
| 21-5 (Invention) | 2-7 (82) | 5-26 (12) | 8-26 (6) | ⊚⊚ | ⊚⊚ | ⊚⊚ |
| 21-6 (Comparative) | 1-2 (60) | 5-2 (26) | 8-13 (14) | X | X | X |
| 21-7 (Invention) | 1-4 (60) | 5-6 (26) | 8-16 (14) | ⊚⊚ | ⊚ | ⊚ |
| 21-8 (Invention) | 1-4 (54) | 5-36 (33) | 8-16 (13) | ⊚⊚ | ⊚⊚ | ⊚ |
| 21-9 (Invention) | 2-15 (70) | 5-36 (20) | 8-16 (10) | ⊚⊚ | ⊚⊚ | ⊚⊚ |
| 21-10 (Comparative) | 2-15 (60) | 5-36 (17) | 8-36 (23) | ⊚⊚ | ⊚⊚ | ⊚⊚ |

TABLE 40

| Sample No. | Granules containing an alkali agent (Content, wt %) | Granules containing a p-phenylene diamine compound (Content, wt %) | Granules containing a hydroxylamine or its derivatives (Content, wt %) | Fluctuation of suppling amount | Coloration | Insoluble matter |
|---|---|---|---|---|---|---|
| 22-1 (Comparative) | 1-2 (80) | 5-3 (13) | 8-2 (7) | X | X | X |
| 22-2 (Invention) | 1-4 (80) | 5-16 (13) | 8-5 (7) | ⊚⊙ | ⊙ | ⊙ |
| 22-3 (Invention) | 1-4 (75) | 5-26 (18) | 8-5 (7) | ⊚⊙ | ⊙ | ⊙⊙ |
| 22-4 (Invention) | 2-7 (83) | 5-26 (12) | 8-5 (5) | ⊚⊙ | ⊚⊙ | ⊚⊙ |
| 22-5 (Invention) | 2-7 (82) | 5-26 (12) | 8-26 (6) | ⊚⊙ | ⊚⊙ | ⊚⊙ |
| 22-6 (Comparative) | 1-2 (60) | 5-2 (26) | 8-13 (14) | X | X | X |
| 22-7 (Invention) | 1-4 (60) | 5-6 (26) | 8-16 (14) | ⊚⊙ | ⊙ | ⊚⊙ |
| 22-8 (Invention) | 1-4 (54) | 5-36 (33) | 8-16 (13) | ⊚⊙ | ⊙ | ⊚⊙ |
| 22-9 (Invention) | 2-15 (70) | 5-36 (20) | 8-16 (10) | ⊚⊙ | ⊚⊙ | ⊚⊙ |
| 22-10 (Invention) | 2-15 (60) | 5-36 (17) | 8-36 (23) | ⊚⊙ | ⊚⊙ | ⊚⊙ |

As is apparent from Table 40, it is possible to give a granular processing agent also by mixing the granules of the invention, which greatly prevents fluctuation of supplying amount, expansion due to moisture absorption and further greatly improves tableting property.

Example 23

Procedure (23-1)

The granular sample containing a ferric complex of an amino polycarboxylic acid of Examples 11 and the granular sample containing a thiosulfate of Examples 14 were mixed for 10 minutes in a cross-rotary mixer in an amount shown in Table 41, using samples shown in Table 41. Thus, samples (23-1) through (23-6) were obtained.

Experiment (23-1)

The samples were evaluated for fluctuation and coloration after storage in the same manner as in Example 11. The results are shown in Table 41. The evaluation criteria were the same as Example 5.

Experiment (23-2)

One hundred grams of each of the above samples were placed and tightly sealed in an aluminium package, and stored at 50° C. for 35 days. The resulting samples were dissolved in water to make a 1 liter, and evaluated for insoluble matter occurrence in the solution. The results are shown in Table 41. The evaluation criteria were as follows:

⊚⊙: Quite transparent
⊙: Sufficiently transparent
o: Not so transparent, but no insoluble matter occurred
X: Insoluble matter occurred.

TABLE 41

| Sample No. | Granules containing a ferric complex of an amino polycarboxylic acid (Content, wt %) | Granules containing a thiosulfate (Content, wt %) | Fluctuation of supplying amount | Coloration | Insoluble matter |
|---|---|---|---|---|---|
| 23-1 (Comparative) | 11-2 (45) | 14-2 (55) | X | X | X |
| 23-2 (Invention) | 11-5 (45) | 14-5 (55) | ⊚⊙ | ⊙ | ⊙ |
| 23-3 (Invention) | 11-5 (35) | 14-17 (65) | ⊚⊙ | ⊚⊙ | ⊙ |
| 23-4 (Invention) | 11-28 (35) | 14-17 (65) | ⊚⊙ | ⊚⊙ | ⊚⊙ |
| 23-5 (Invention) | 11-21 (35) | 14-5 (65) | ⊚⊙ | ⊚⊙ | ⊙ |
| 23-6 (Invention) | 11-21 (35) | 14-17 (65) | ⊚⊙ | ⊚⊙ | ⊚⊙ |

As is apparent from Table 41, it is possible to give a granular processing agent also by mixing the granules of the invention, which greatly prevents fluctuation of supplying amount, coloration after storege and further greatly prevents insoluble matter occurrence.

Example 24

The granular sample containing a ferric complex of an amino polycarboxylic acid of Examples 11 and the granular sample containing a thiosulfate of Examples 14 were mixed in an amount shown in Table 42, using samples shown in Table 42 and further mixed with 5 wt % of polyethylene glycol #4000 (produced by Nihon Yushi Co., Ltd.) for 10 minutes in a cross-rotary mixer. To the resulting mixture were added 0.5 wt % of sodium N-lauroylsarcosine (pulverized to 100 µm or less) and mixed for further 3 minutes. The resulting granules were tableted at a compression pressure of 1400 kg/cm² in the same manner as in Example 13 to obtain 1,000 tablets. Thus, samples (24-1) through (24-6) were obtained.

Experiment (24-1)

The samples were evaluated for fluctuation and slidability in the same manner as in Example 13. The results are shown in Table 42. The evaluation criteria were the same as Example 13.

Experiment (24-2)

Five samples of each of the above obtained tablets were prepared so that two tablets were superposed each other in close contact with the compression area. The above samples were stored at 35° C. and 45% RH for 90 minutes. Thereafter, adhesiveness between the tablets were checked. The results are shown in Table 42. The evaluation criteria were as follows:

⊚⊚: No adhesion
⊚: Tablets adhere, but separate on lifting.
○: Tablets adhere, but separate by vibration.
X: Tablets adhere, but do not separate by vibration.

TABLE 42

| Sample No. | Granules containing a ferric complex of an amino polycarboxylic acid (Content, wt %) | Granules containing a thiosulfate (Content, wt %) | Fluctuation of supplying amount | Sildability | Adhesiveness |
|---|---|---|---|---|---|
| 24-1 (Comparative) | 11-2 (45) | 14-2 (55) | X | X | X |
| 24-2 (Invention) | 11-5 (45) | 14-5 (55) | ⊚⊚ | ⊚ | ⊚ |
| 24-3 (Invention) | 11-5 (35) | 14-17 (65) | ⊚⊚ | ⊚⊚ | ⊚ |
| 24-4 (Invention) | 11-28 (35) | 14-17 (65) | ⊚⊚ | ⊚⊚ | ⊚⊚ |
| 24-5 (Invention) | 11-21 (35) | 14-5 (65) | ⊚⊚ | ⊚⊚ | ⊚ |
| 24-6 (Invention) | 11-21 (35) | 14-17 (65) | ⊚⊚ | ⊚⊚ | ⊚⊚ |

As is apparent from Table 42, it is possible to give a tablet processing agent by mixing the granules of the invention and then, tableting, which greatly improves fluctuation of supplying amount, slidability after storege and further greatly improves adhesiveness after storage.

What is claimed is:

1. A method of manufacture of a tablet solid processing composition for a silver halide photographic light-sensitive material, said method comprising granulating a granulatable composition comprising at least one photographic processing agent with stirring in the presence of a liquid to obtain granules having an average particle diameter of 150 to 3000 μm, said liquid not exceeding 10 weight % based on the weight of said granulatable composition after said granulating;

dressing said granules during and after drying with a dressing machine having a 0.5 to 3.0 mm screen so that at least 70 weight % of said granules after dressing have a particle diameter of 149 to 2,000 μm; and compression molding the dressed granules into a tablet under a compression pressure of 400 to 2000 kg/cm$^2$.

2. The method of claim 1, wherein said granulating is carried out to obtain granules having a moisture content of not more than 10 wt %, except for crystal water which said photographic processing agent may have.

3. The method of claim 1, wherein said photographic processing agent is selected from the group consisting of an alkali agent, a p-phenylenediamine compound, hydroxylamine or its derivatives, a ferric complex of an aminopolycarboxylic acid and a thiosulfate.

* * * * *